United States Patent [19]
Aoyama et al.

[11] Patent Number: 5,913,079
[45] Date of Patent: Jun. 15, 1999

[54] OPTICAL APPARATUS HAVING A LINE OF SIGHT DETECTION DEVICE

[75] Inventors: Keisuke Aoyama, Kawasaki; Akira Yamada; Akira Akashi, both of Yokohama, all of Japan

[73] Assignee: Canon Kabushiki Kaisha, Tokyo, Japan

[21] Appl. No.: 08/689,045

[22] Filed: Jul. 30, 1996

[30] Foreign Application Priority Data

Jul. 31, 1995 [JP] Japan .................................. 7-194991
Aug. 18, 1995 [JP] Japan .................................. 7-232120
Aug. 21, 1995 [JP] Japan .................................. 7-212095

[51] Int. Cl.$^6$ ............................ G03B 7/08; G03B 13/36; G03B 17/00
[52] U.S. Cl. ............................ 396/51; 396/121; 396/234
[58] Field of Search ............................ 396/51, 121, 233, 396/234

[56] References Cited

U.S. PATENT DOCUMENTS

| | | | |
|---|---|---|---|
| 5,012,267 | 4/1991 | Higashihara | 354/402 |
| 5,126,777 | 6/1992 | Akashi et al. | 354/402 |
| 5,189,465 | 2/1993 | Akashi et al. | 354/408 |
| 5,245,371 | 9/1993 | Nagano et al. | 396/51 |
| 5,280,312 | 1/1994 | Yamada et al. | 351/211 |
| 5,296,888 | 3/1994 | Yamada | 396/51 |
| 5,365,302 | 11/1994 | Kodama | 396/51 |
| 5,402,199 | 3/1995 | Akashi | 354/410 |
| 5,486,892 | 1/1996 | Suzuki et al. | 396/51 |
| 5,765,045 | 6/1998 | Takagi et al. | 396/51 |

*Primary Examiner*—W. B. Perkey
*Attorney, Agent, or Firm*—Fitzpatrick, Cella, Harper & Scinto

[57] ABSTRACT

An apparatus having a line of sight detection device, comprises a viewfinder for observing a target object, a line of sight detection means for detecting a position of line of sight in the viewfinder of a user, focus detection means being possible to select a first operation mode for performing a first focus detecting operation or a second operation mode for performing a second focus detecting operation, and being possible to perform a focus detection to each of a plurality of focus detecting areas arranged in the viewfinder, range setting means for setting a plurality of determination range including the focus detecting areas, and for changing a size of the determination range to be set in accordance with the selection of the operation mode of the focus detecting means, selecting means for determining which determination range includes the position of line of sight detected by the line of sight detecting means, and for selecting at least one focus detecting area among the plurality of focus detecting areas, and focus adjusting means for adjusting a focus of an optical system based on a focus detecting result of the selected focus detecting area.

30 Claims, 54 Drawing Sheets

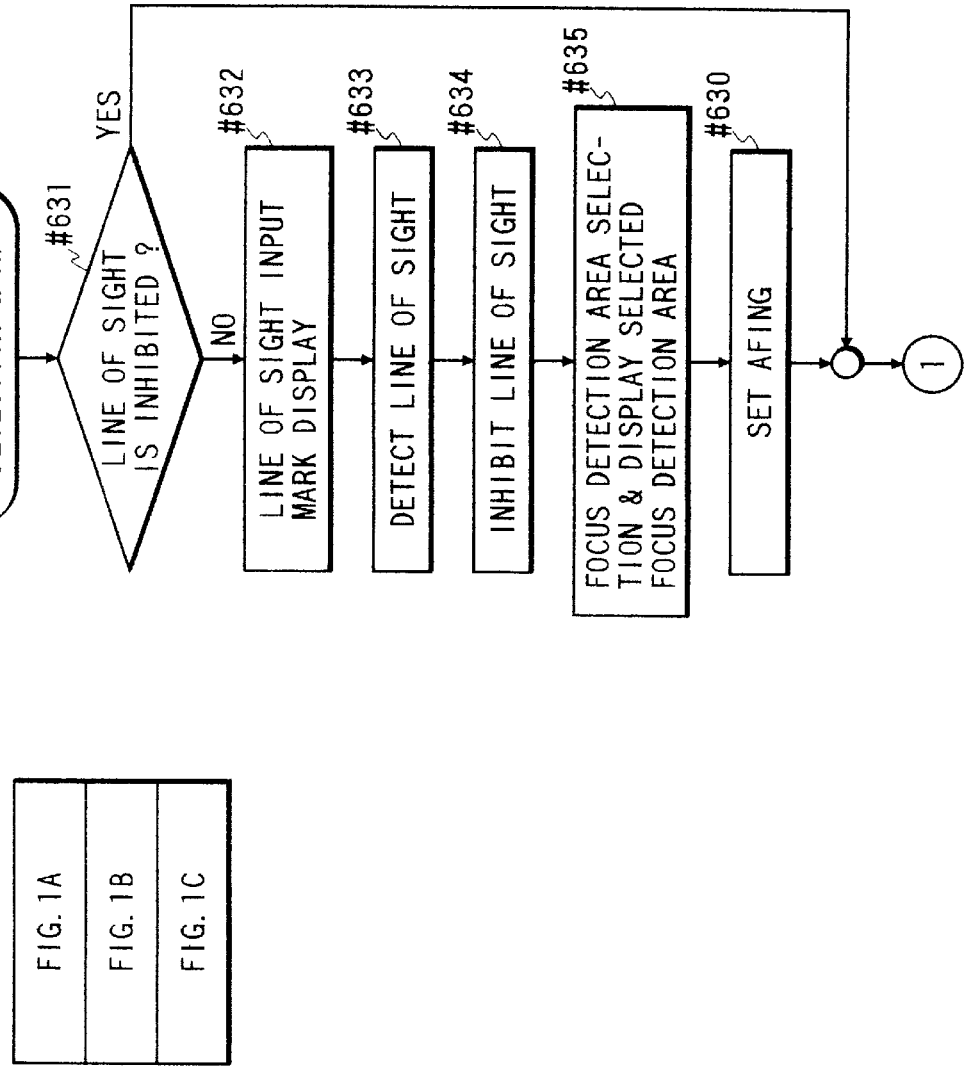

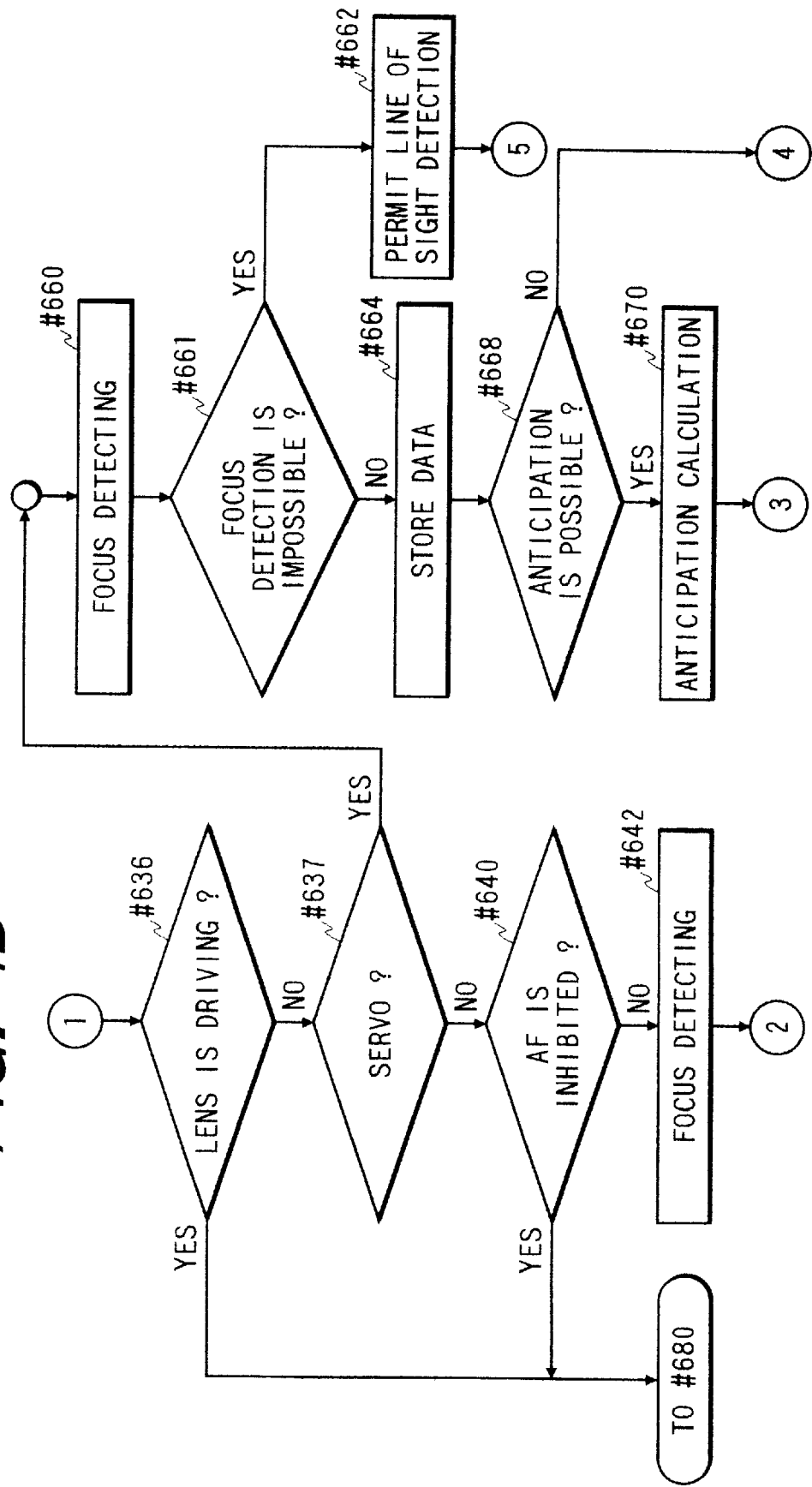

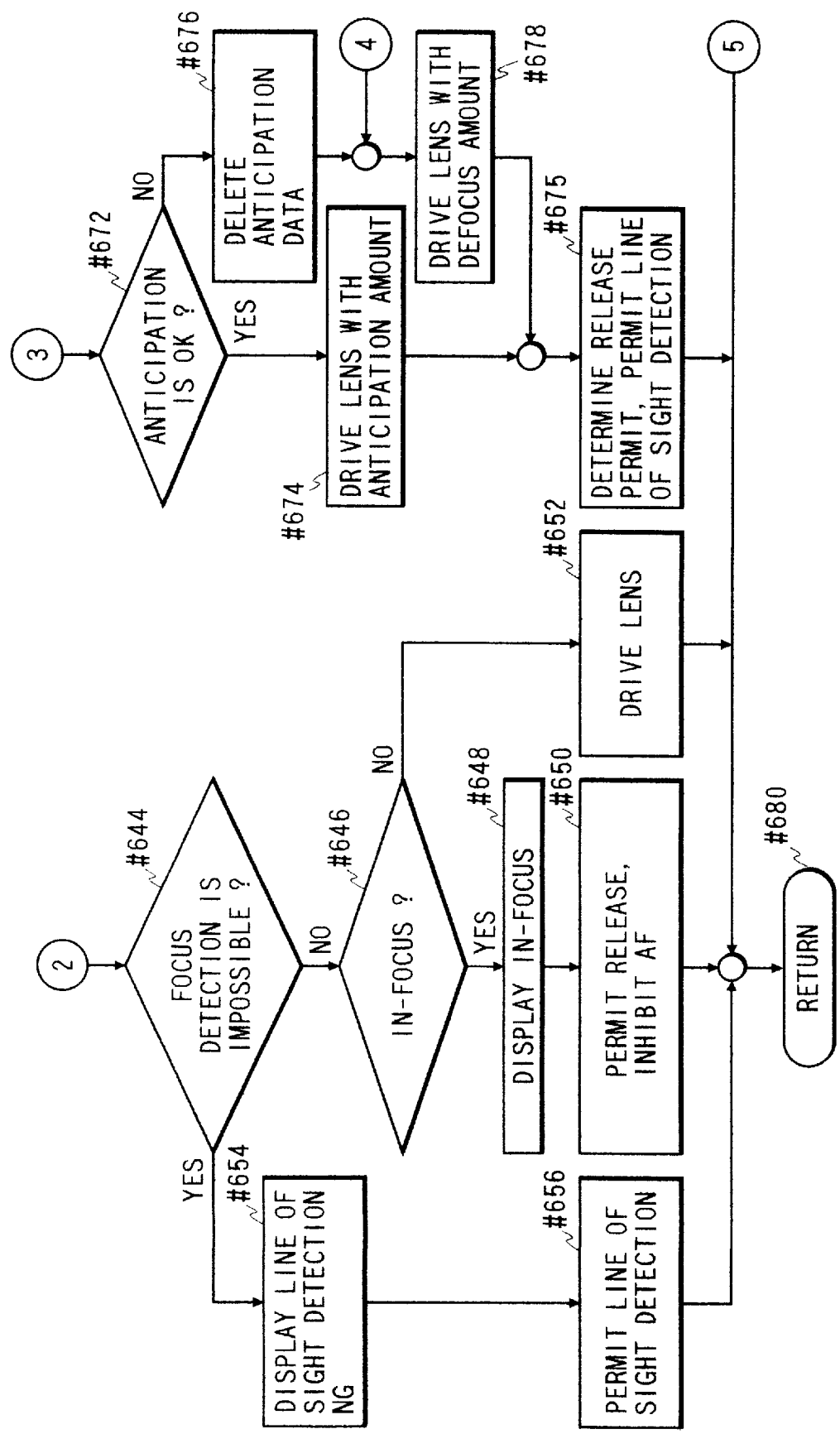

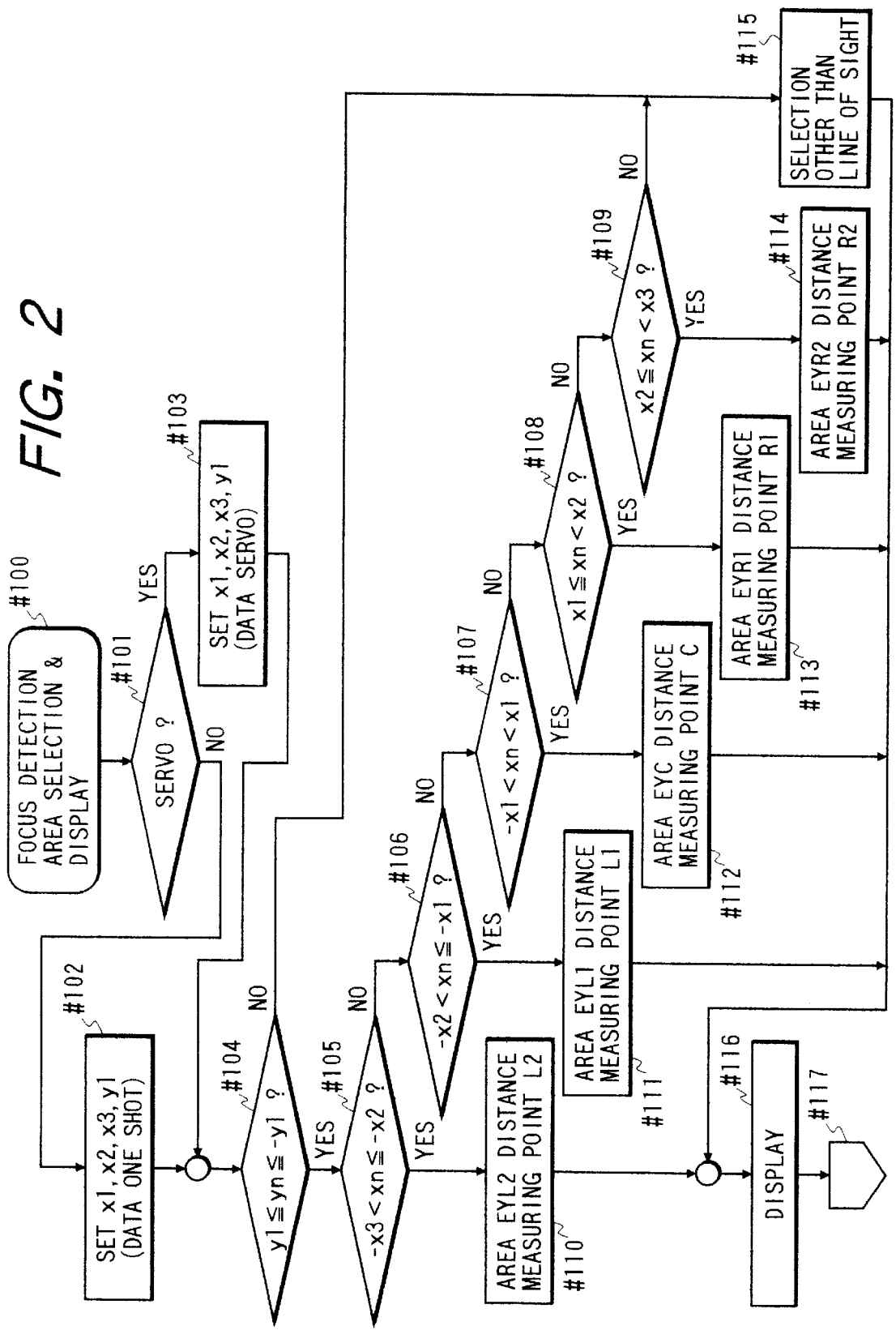

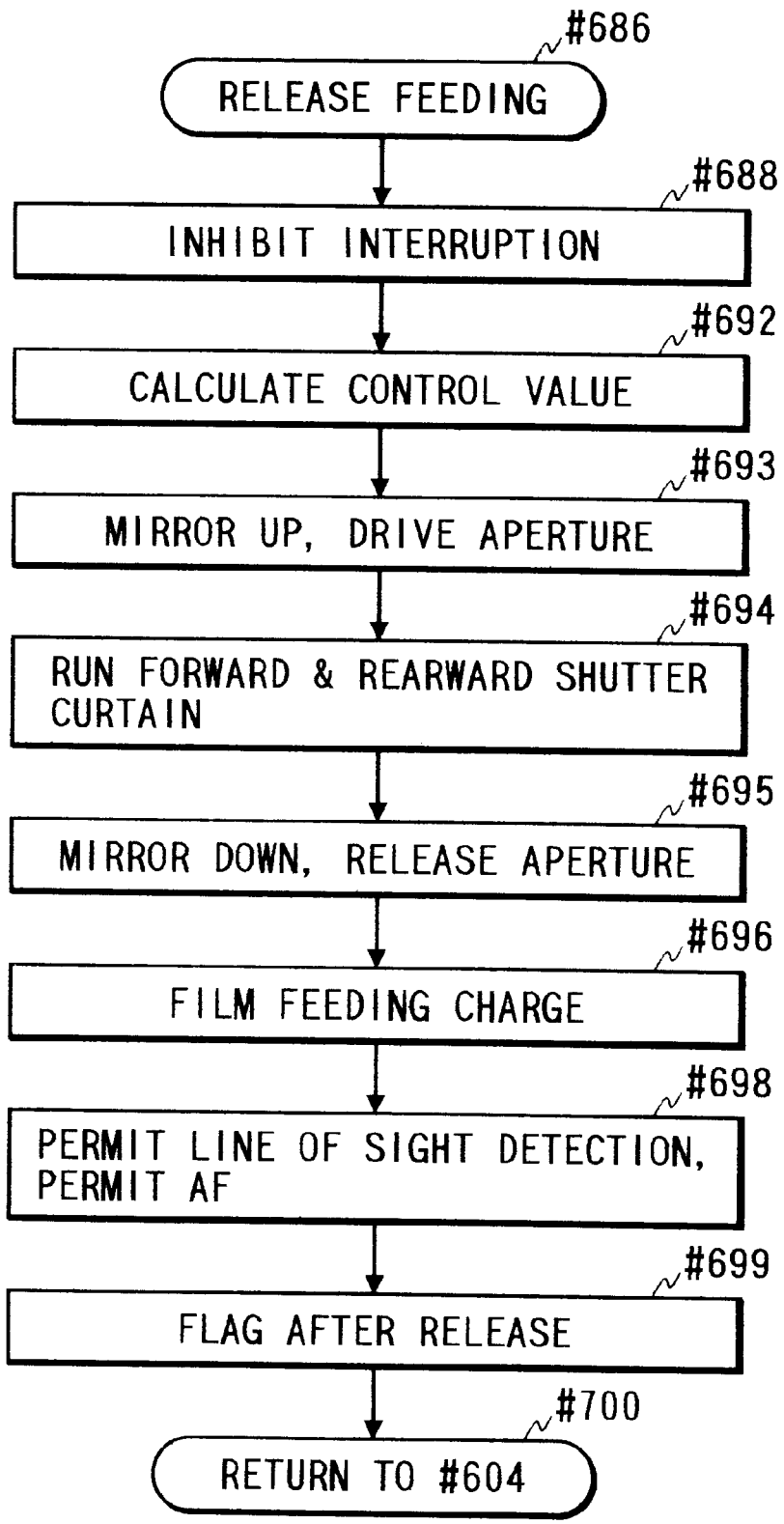

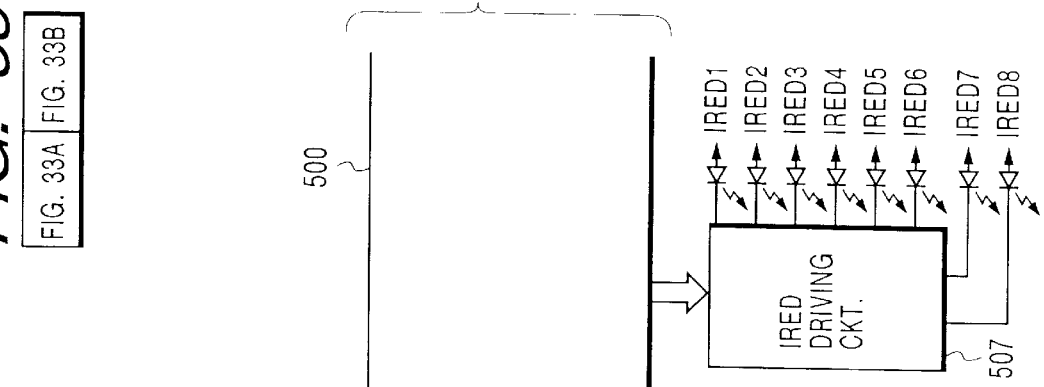
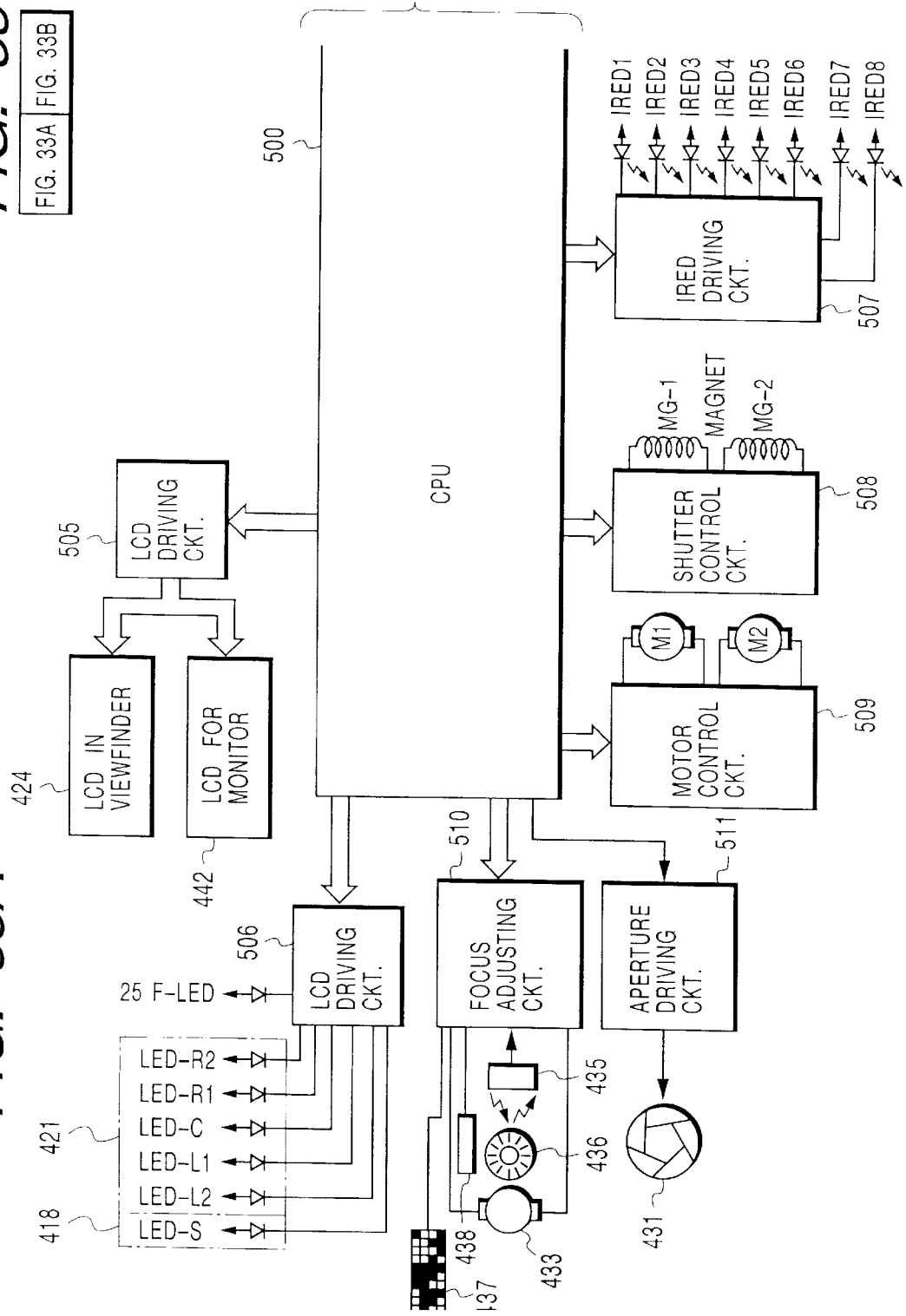

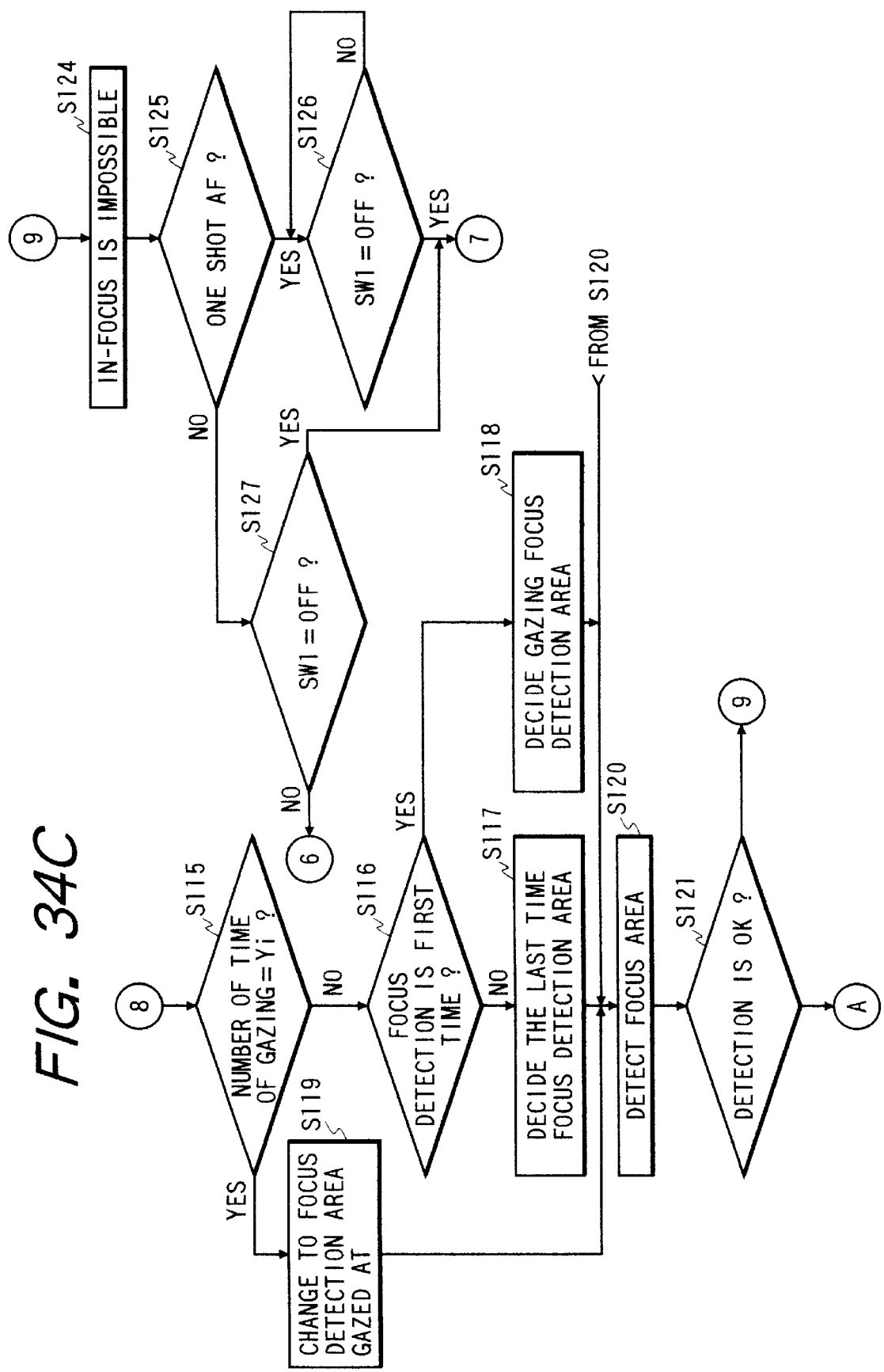

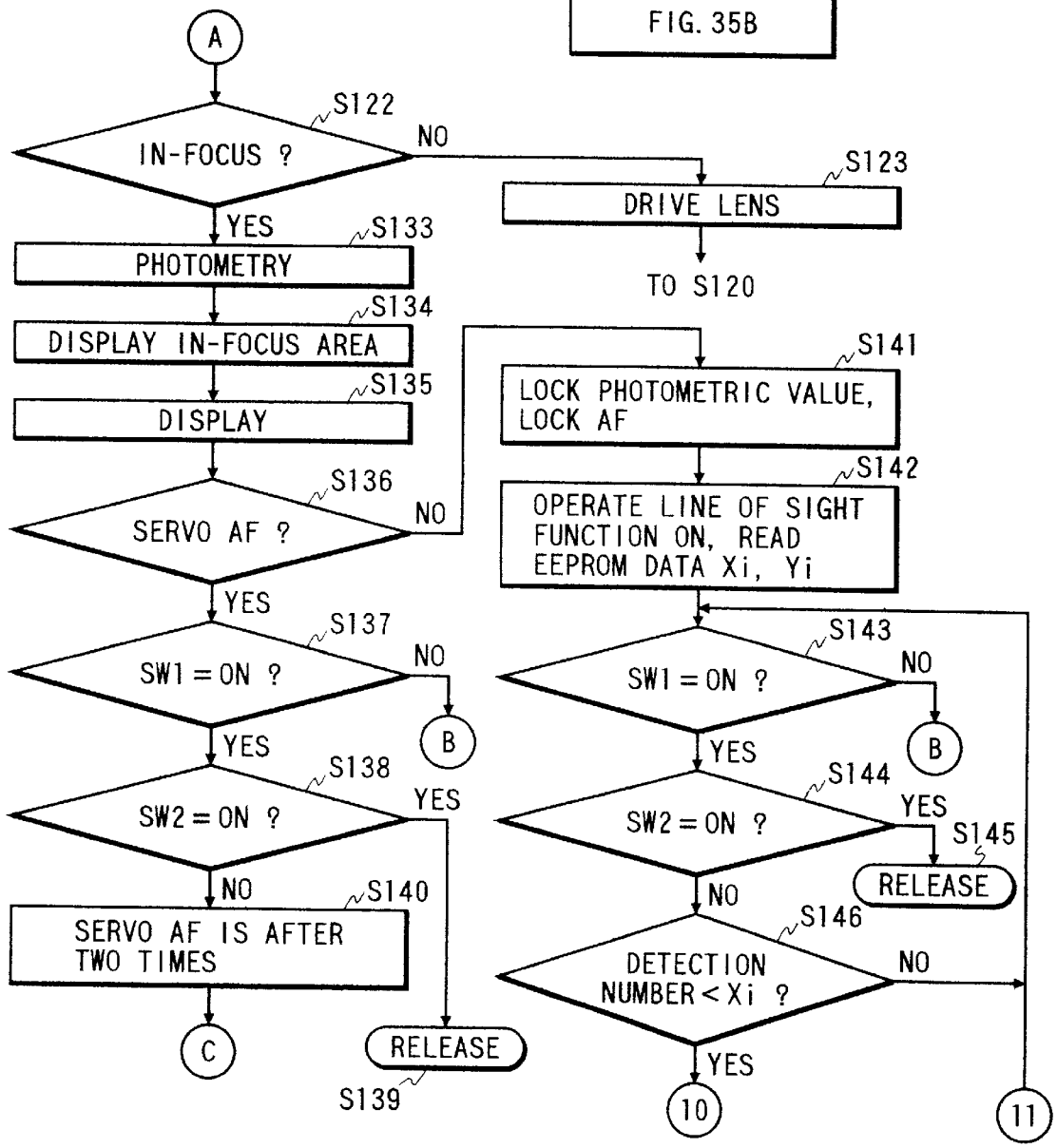

FIG. 37

| AF MODE | | NUMBER OF TIME OF LINE OF SIGHT DETECTION Xi | NUMBER OF TIME OF GAZING Yi |
|---|---|---|---|
| ONE SHOT MODE | | 2 | 1 |
| SERVO MODE | FIRST TIME | 2 | 1 |
| | AFTER SECOND TIME | 32768 | 4 |

FIG. 38

| LINE OF SIGHT INPUT FUNCTION (DEPTH OF FIELD CONFIRMATION) | NUMBER OF TIME OF LINE OF SIGHT DETECTION Xi | NUMBER OF TIME OF GAZING Yi |
|---|---|---|
| START OPERATION | 32768 | 2 |
| COMPLETE OPERATION | 64 | 3 |

FIG. 39

| MODE | SERVO MODE AFTER TWO TIMES | | LINE OF SIGHT INPUT FUNCTION (DEPTH OF FIELD CONFIRMATION) |
|---|---|---|---|
| PHOTOGRAPHING MODE | NUMBER OF TIME OF LINE OF SIGHT DETECTION Xi | NUMBER OF TIME OF GAZING Yi | NUMBER OF TIME OF LINE OF SIGHT DETECTION Xi |
| TV-PRIORITY MODE | 32768 | 3 | 0 |
| SPORTS MODE | 32768 | 2 | 0 |
| AV-PRIORITY MODE | 32768 | 6 | 32768 |
| MANUAL MODE | 32768 | 4 | 32768 |
| OTHER MODES | 32768 | 4 | 0 |

FIG. 40

| FEEDING MODE | NUMBER OF TIME OF LINE OF SIGHT DETECTION $X_i$ | NUMBER OF TIME OF GAZING $Y_i$ |
|---|---|---|
| ONE SHOT/ SELF MODE | 32768 | 5 |
| HIGH SPEED CONTINUOUS SHOT MODE | 32768 | 2 |
| LOW SPEED CONTINUOUS SHOT MODE | 32768 | 3 |

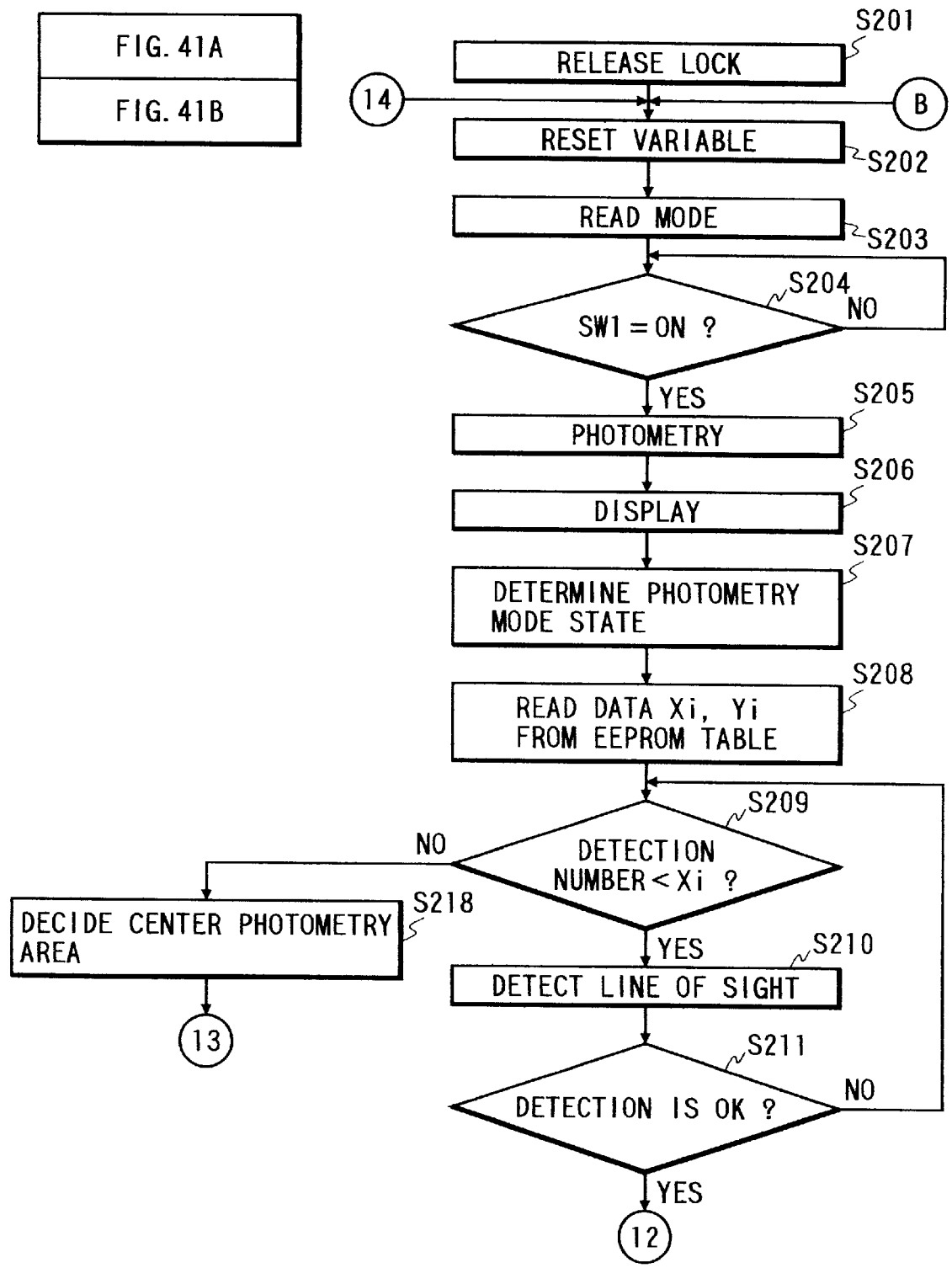

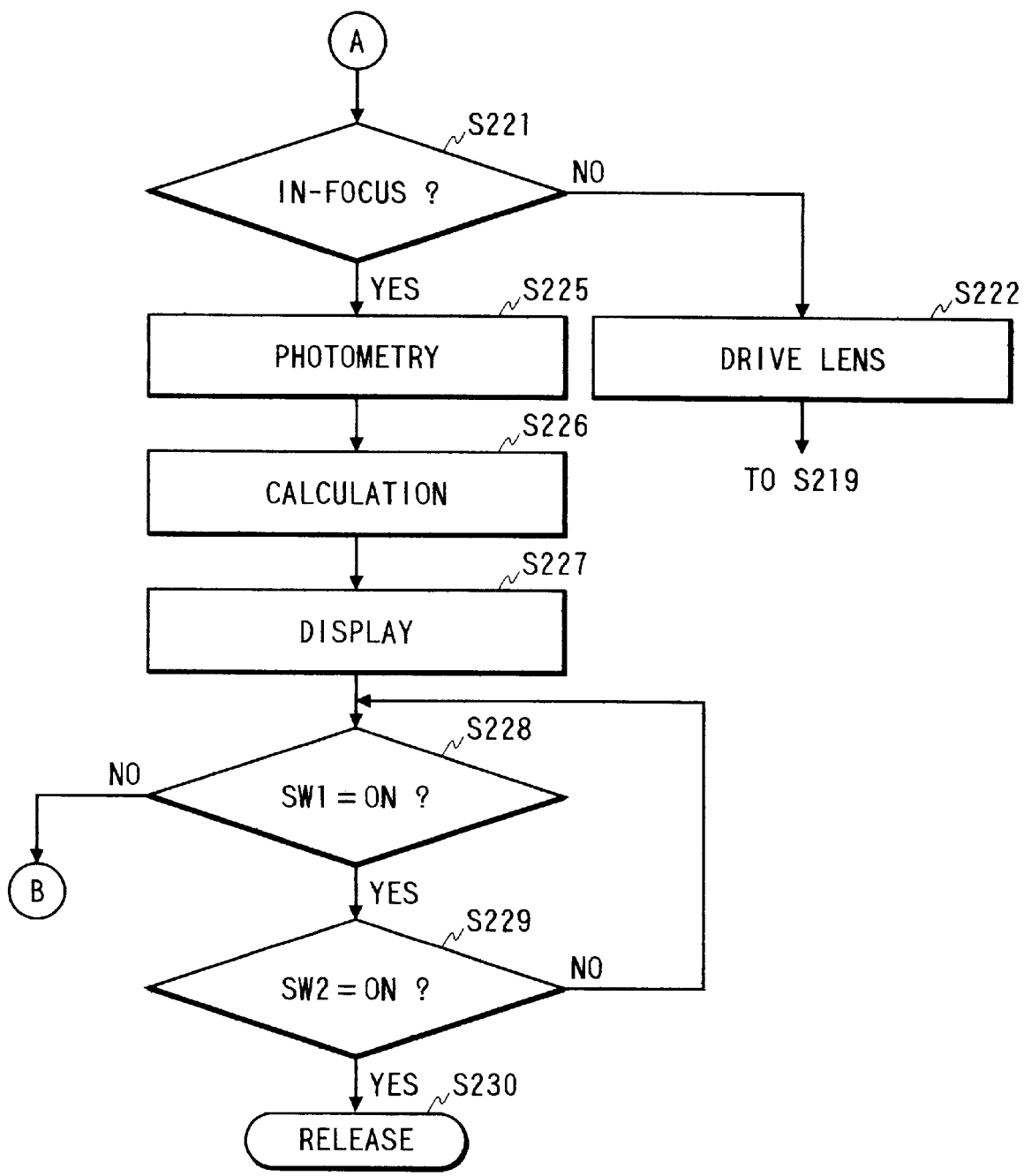

FIG. 43

| PHOTOMETRY MODE | NUMBER OF TIME OF LINE OF SIGHT DETECTION Xi | NUMBER OF TIME OF GAZING Yi |
|---|---|---|
| EVALUATION PHOTOMETRY MODE | 32768 | 4 |
| PARTIAL PHOTOMETRY MODE | 32768 | 2 |
| AVERAGE PHOTOMETRY MODE | 0 | 0 |

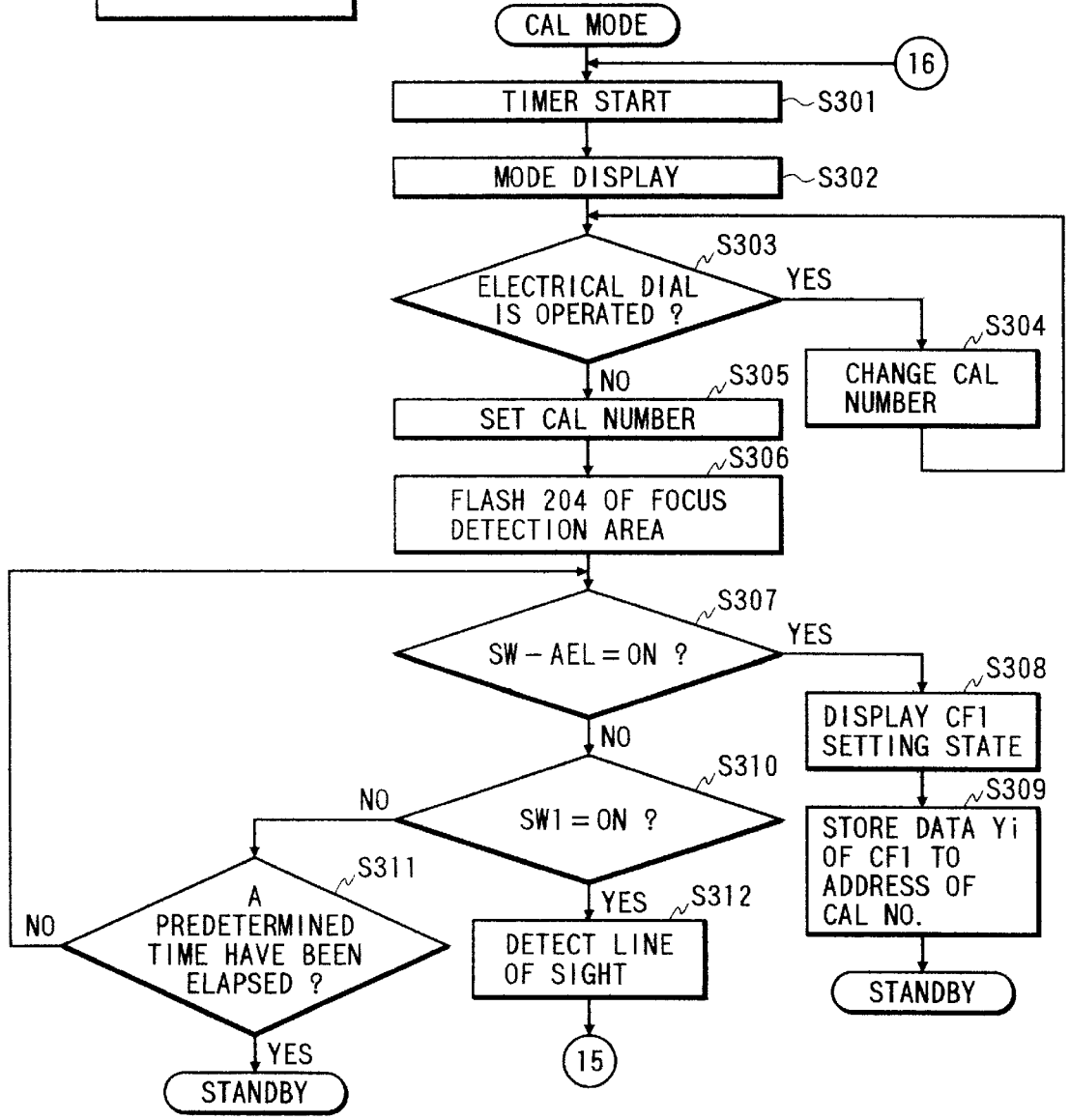

OPTICAL APPARATUS HAVING A LINE OF SIGHT DETECTION DEVICE

BACKGROUND OF THE INVENTION

1. Field of the Invention

The present invention relates to an optical apparatus having a line of sight detection device for performing a predetermined operation based on a detected line of sight of a user.

2. Related Background Art

Conventionally, there are provided various, so called, line of sight (visual axis) detection devices (for example, an eye camera) for detecting which position a photographer is observing on an observed surface. For example, in U.S. Pat. No. 5,486,892 issued on Jan. 23, 1996, a gazing point is calculated by using a cornea reflection image generated by reflected light from the cornea and an image-formed position on a pupil with projecting parallel flux from a light source on a front zone of an eyeball of the photographer. In addition, the publication discloses an example of adjusting the focus of a photo taking lens automatically by using gazing point information of a photographer by arranging a gazing point detection device in a single lens reflex camera.

FIG. 47 is a schematic diagram of a line of sight detection optical system arranged in a single lens reflex camera. This drawing shows a photo taking lens 1, a main mirror 2, a focusing plate 7, and a pentaprism 8. A photographer observes an object within a viewfinder by bringing his or her eye (an eyeball 15 of the photographer) close to an eyepiece lens 11. Each of light sources 13a and 13b, such as a light emitting diode emits an infrared light to which the photographer is not sensitive. A part of an illumination light reflected by the eyeball of the photographer is condensed on an image sensor 14 through a receptor lens 12.

FIG. 48A is a schematic diagram of an eyeball image which is projected on the image sensor 14. This drawing shows cornea reflection images 52a and 52b of the infrared light emitting diodes 13a and 13b, white 50 of an eyeball, pupil 51, and skin 53 surrounding the eye. FIG. 48B shows the intensity of an output signal from a line (section (E)–(E')) on the image sensor 14. The eyeball image is characterized by the highest luminance in the relatively smaller areas of the cornea reflection images 52a and 52b of the infrared light emitting diodes, and by the lowest luminance level in the relatively wide area of the pupil 51 due to its reflectance which is extremely low. A luminance level of the white 50 is between the levels of cornea reflection image and the pupil, and that of the skin 53 depends on outdoor daylight or illumination conditions.

FIG. 49 is a diagram describing the principle of a line of sight detection. This drawing shows an eyeball 15 of a photographer, a cornea 16, and an iris 17.

By using these drawings, a line of sight detection method is described below.

An infrared light emitted from the light source 13b irradiates the cornea 16 of the eyeball 15. A cornea reflection image d (a virtual image) formed by a part of the infrared light reflected on a surface of the cornea 16 is condensed by the receptor lens 12 to form an image at position d' on the image sensor 14. In the same manner, infrared light emitted from the light source 13a irradiates the cornea 16 of the eyeball 15. A cornea reflection image e formed by a part of the infrared light reflected on a surface of the cornea 16 is condensed by the receptor lens 12 to form an image at position e' on the image sensor 14.

Flux from edge portions a and b of the iris 17 forms an image of the edge portions a and b at positions a' and b' on the image sensor 14 via the receptor lens 12. If a rotation angle θ of an optical axis of the eyeball 15 to the optical axis on the receptor lens 12 is smaller, a coordinate xc of a center position c of the pupil 19 is expressed by the following:

$$xc \approx (xa+xb)/2$$

where the x coordinates of the edge portions a and b of the iris 17 are xa and xb, respectively.

An x coordinate of a middle point between the cornea reflection images d and e almost matches s coordinate xo of a center of curvature o of the cornea 16. Accordingly, a rotation angle θx of an optical axis 15a of the eyeball 15 almost satisfies the following relation:

$$OC \times SIN\theta x \approx (xd+xe)/2 - xc \tag{1}$$

where xd and xe denote the x coordinates of positions d and e at which the cornea reflection images are generated and OC denotes a standard distance between the center of curvature o of the cornea and the center c of the pupil 19. Therefore, as shown in FIG. 48A, the rotation angle θ of the optical axis 15a of the eyeball 15 can be obtained by detecting the positions of the characteristic points (the cornea reflection image and the center of the pupil) of the eyeball 15 projected on the image sensor 14.

The rotation angle of the optical axis 15a of the eyeball is calculated as follows based on the expression (1):

$$\beta \times OC \times SIN\theta x \approx \{(xpo - \delta x) - xic\} \times \text{pitch} \tag{2}$$

$$\beta \times OC \times SIN\theta y \approx \{(ypo - \delta y) - yic\} \times \text{pitch} \tag{3}$$

where θx denotes a rotation angle of an optical axis of the eyeball in a plane (z–x) and θy denotes a rotation angle of an optical axis of the eyeball in a plane (y–z). (xpo, ypo) are the coordinates of a middle point of two cornea reflection images on the image sensor 14 and (xic, yic) are the coordinates of a center of the pupil on the image sensor 14. The characters' "pitch" denotes a picture element pitch of the image sensor 14. Character β indicates an image formation scale factor which depends on a position of the eyeball 15 with respect to the receptor lens 12; it is calculated as a function of an interval between two cornea reflection images, practically.

Characters δx and δy denote correction terms for correcting the coordinates of the middle point of the cornea reflection images, including a correction term for correcting an error generated by projection on the eyeball of the photographer not with parallel flux but with divergent flux, and as to δy, a correction term for correcting offset components generated by projecting the eyeball of the photographer with divergent flux from a direction of a lower eyelid.

After the rotation angle (θx, θy) of the optical axis of the eyeball of the photographer is calculated, a gazing point (x, y) on an observed plane (focusing plate) of the photographer is expressed as follows, if a camera is set horizontally:

$$x = m^* (\theta x + \Delta) \tag{4a}$$

$$y = m^* \theta y \tag{5a}$$

where the x direction corresponds to a horizontal direction to the photographer if the camera is set horizontally and the y direction corresponds to a vertical direction to the photographer if the camera is set horizontally. Character m indicates a transformation coefficient for transforming the rotation angle of the eyeball to coordinates on the focusing plate, and character Δ indicates an angle formed by the optical axis 15a of the eyeball and the visual axis (gazing point). Generally, it is already known that the visual axis of an actual view of an observer is displaced relative to the rotation angle of the eyeball by approximately 5° horizontally to the observer, but it is not displaced almost at all relative to the rotation angle in a vertical direction.

An explanation will be provided about an operation of a focus detection means conventionally arranged in a camera. The focus detection means has a plurality of focus detection operation modes; generally, a focus detecting operation mode for a static object and a focus detecting operation mode for a dynamic object.

The focus detecting operation mode for a static object is characterized by omitting any focus detecting operation once an in-focus state is detected.

The focus detecting operation mode for a dynamic object is characterized by continuing the focus detecting operation also after an in-focus state is detected.

Now, the line of sight and focus detecting operations of a camera having the line of sight detection means are described below by the focus detecting operation modes.

1) Focus detecting operation mode for a static object

First, if a release button is kept pressed halfway (pressed by a first stroke), the line of sight detection means operates to calculate a gazing point within a visual field of a viewfinder of a photographer before detecting the focus. This point is represented by coordinates in the visual field of the viewfinder.

Based on the coordinates in the visual field of the viewfinder, the location of a focus detecting area corresponding to it is determined. For this obtained focus detecting area, a focus state is detected by a focus detection means and a photo taking lens is driven to an in-focus state based on the information.

After the focus detecting area is determined by the line of sight detection means as described above, a focusing operation is performed only once on the basis of the focus state of the focus detecting area.

2) Focus detecting operation mode for a dynamic object

If a release button is kept pressed halfway (pressed by a first stroke), the line of sight detection means operates to determine a focus detecting area. Afterwards, a lens driving operation is continued so as to keep an in-focus state based on only focus information of the focus detecting area.

As another aspect of the focus detecting operation mode for the above dynamic object, the focus detecting operation can be performed after determining a focus detecting area by detecting a line of sight every time before the focus detecting operation so that the focus detecting operation is linked with movement of the line of sight of a photographer due to movement of an object.

The position of line of sight of the photographer or conditions, however, are different at framing, for example, between a case of photographing a static object and a case of photographing a dynamic object. In other words, if a static object is photographed, a photographer may shift his or her line of sight to every detail of a scene to be photographed since he or she has a relatively long time. Therefore, the position of the line of sight sometimes exceeds a focus detecting area. In this case, if a focus detecting area is determined by ignoring the result of line of sight detection because the position of the line of sight deviates from the focus detecting area, the focus cannot be adjusted to the object intended by the photographer.

If a dynamic (moving) object is photographed, the line of sight of a photographer cannot follow the object and temporarily the position of the line of sight may deviate from the focus detecting area. It is, for example, a case that the photographer glances at another thing other than the object such as a background. In this case, if a focus detecting area is determined based on line of sight information, the result is contrary to the intention of the photographer because the lens is focused to the background.

In addition, also when a dynamic object is photographed, the line of sight of the photographer is different between a first line of sight detection and a second or later line of sight detection in repeating a line of sight detection and focus detection. In the first line of sight detection, the photographer shifts his or her line of sight to various places on a scene to be photographed since he or she has a relatively long time. In the second or later line of sight detection, he or she does not have enough time to see things other than the object. Accordingly, if the position of line of sight calculated by the line of sight detecting operation deviates significantly from the focus detecting area, it can be considered that the line of sight has shifted to the background by mistake.

In the same manner, the line of sight of the photographer changes in a different way between a case of one shot photographing and a case of continuous shot photographing.

Furthermore, it is also different between a case of a long distance to an object and a case of a short distance to an object. If the distance to the object is long, the gazing point is concentrated on a small range since an object image on the scene is relatively small. If it is short, however, the position of the line of sight shifts in a wide range since the object image on the scene is relatively large. Like this, if the conditions on photographing are different, the position of the line of sight of the photographer changes in a different manner during the taking of photos. Accordingly, if a focus detection area is selected always under the same conditions, a correct focus area cannot be determined.

In U.S. application Ser. No. 08/348,142 filed on Nov. 23, 1994, now U.S. Pat. No. 5,708,862, it is proposed that, based on information about a line of sight direction of an eyeball which is detected continuously, a gazing point within an observation range of a subject is calculated from a line of sight direction which is pointed for more than or equal to a predetermined time within a certain time or a line of sight direction pointed with more than or equal to a predetermined frequency.

In U.S. application Ser. No. 08/473,991 filed on Jun. 7, 1995, and refiled as Ser. No. 08/819,134 on Mar. 17, 1997, there is provided a single lens reflex camera having a line of sight input function of checking a depth-of-field by an aperture adjusting operation for a lens mounted on a camera when a photographer gazes at a line of sight input index arranged within a visual field of the viewfinder.

In the above conventional embodiments, however, the intention of a user sometimes cannot be reflected properly without an appropriate determination for some target objects observed in a viewfinder or scenes since determination standards on a gazing point are always identical in any conditions, though an automatic focus detection device of the camera is controlled with considering a part on which the line of sight resides for more than or equal to a predetermined time or with more than or equal to a predetermined frequency as a gazing point.

SUMMARY OF THE INVENTION

One aspect of this invention has a feature to determine whether or not a line of sight detection result is appropriate by using a judgment standard depending on each focus detection mode as a judgment standard for determining whether or not the line of sight detection result is appropriate in a device for detecting a focus by selecting a single focus detection mode out of a plurality of focus detection modes based on a user's line of sight position. It makes it possible to assume the state of the device in use from a selected focus detection mode, so that the reliability of the line of sight detection is enhanced. Another aspect of this invention has a feature to judge whether or not a line of sight detection result is appropriate by using a judgment standard depending on an operation state of a focus detecting operation as a judgment standard for determining whether or not the line of sight detection result is appropriate in a device for detecting a focus based on a user's line of sight position. It makes it possible to assume the state of the device in use from the operation state of the focus detecting operation, so that the reliability of the line of sight detection is enhanced.

BRIEF DESCRIPTION OF THE DRAWINGS

FIG. 1 is comprised of FIGS. 1A to 1C showing flowcharts of "Line of sight detection and AF" for describing an operation according to a first embodiment;

FIG. 2 is a flowchart of "Focus detection area selection and display" for describing the operation of the first embodiment;

FIGS. 6A and 6B are flowcharts for describing operations of a camera;

FIG. 37 is an EEPROM data table in an AF mode of the camera according to the fifth embodiment of this invention;

FIG. 38 is an EEPROM data table in a line of sight input function of the camera according to the fifth embodiment of this invention;

FIG. 39 is an EEPROM data table in a photographing mode of the camera according to the fifth embodiment of this invention;

FIG. 40 is an EEPROM data table in a feeding mode of the camera according to the fifth embodiment of this invention;

FIG. 42 is a flowchart illustrating an operation continued from the operation in FIGS. 41A and 41B;

FIG. 43 is an EEPROM data table in a photometry mode of the camera according to the sixth embodiment of this invention;

FIGS. 44A to 44F are diagrams illustrating display states of LCD for monitoring in a custom function selection mode of a camera according to a seventh embodiment of this invention;

DETAILED DESCRIPTION OF THE PREFERRED EMBODIMENTS

Figure 9:
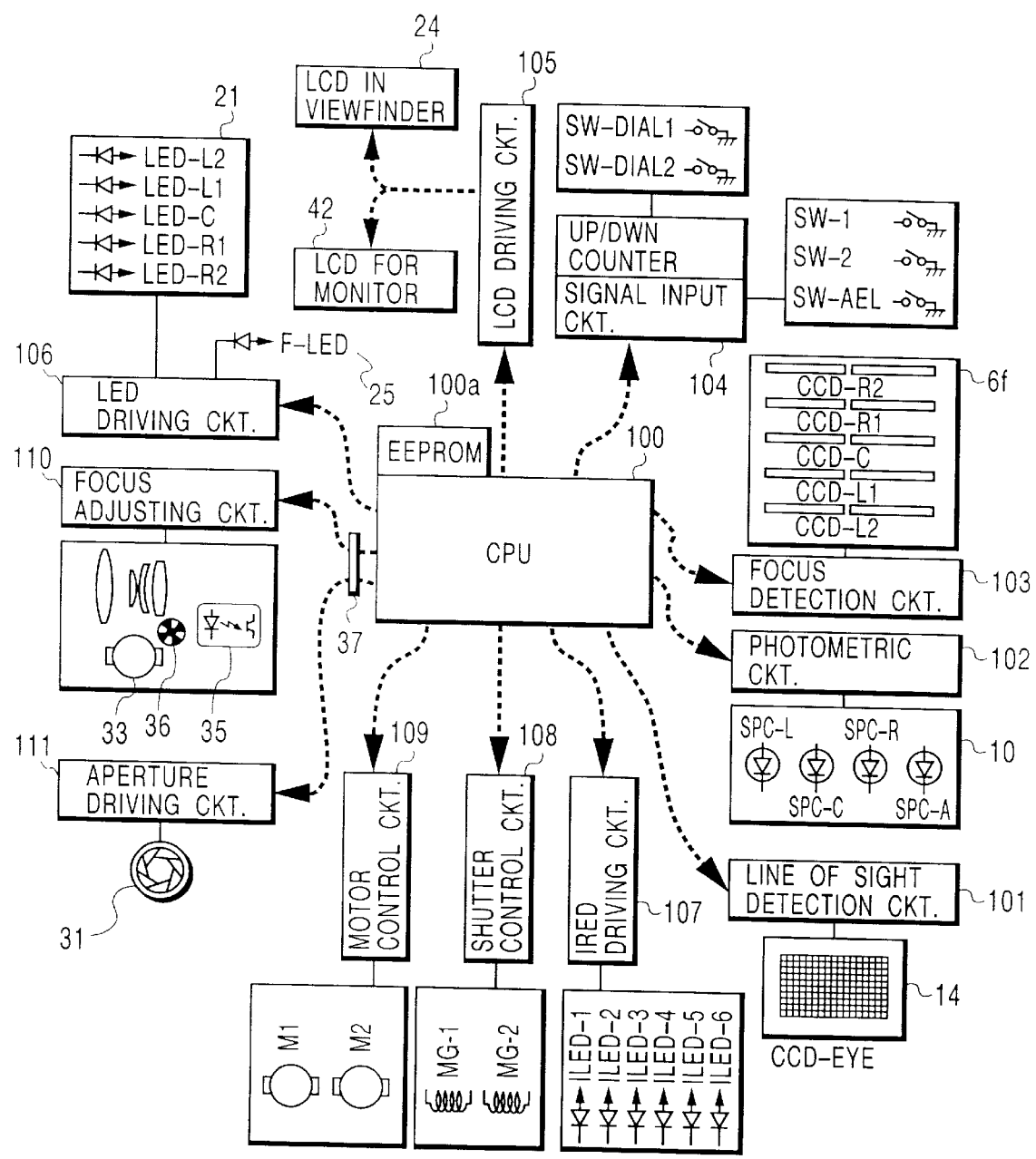
FIG. 9 is a schematic diagram of a line of sight detecting optical system in a block diagram of an electric circuit of a camera according to this invention.

FIG. 9 is a block diagram of a main portion of an electric circuit built in a camera according to this invention. A central processing unit (hereinafter, CPU) 100 of a microcomputer, which is a camera control means built in a camera body, is connected to a line of sight detection circuit 101, a photometric circuit 102, an automatic focus detection circuit 103, a signal input circuit 104, an LCD driving circuit 105, an LED driving circuit 106, an IRED driving circuit 107, a shutter control circuit 108, and a motor control circuit 109. In addition, signals are transmitted between the CPU and a focus adjusting circuit 110 or an aperture driving circuit 111 arranged in a photo taking lens via a mount contact 37.

A film counter or other photographing information can be stored in an EEPROM 100a which is a storing means attached to the CPU 100.

The line of sight detection circuit transmits an output of an eyeball image from an image sensor 14 (CCD-EYE) to the CPU 100. The CPU 100 performs A-D conversion for the eyeball image signal from the image sensor 14 by using an A-D conversion means in the CPU, extracts characteristic points of the eyeball image required for detecting a line of sight as image information following a predetermined algorithm as described later, and calculates a rotation angle of an eyeball of a photographer based on positions of the characteristic points. The photometric circuit 102 amplifies an output from a photometric sensor 10, and then logarithmically compresses it, and sends it as luminance information to the CPU 100. The photometric sensor 10 has a plurality of segments of a screen, each being formed by a plurality of photodiodes for outputting a photoelectric conversion output.

A line sensor 6f is a known CCD line sensor formed by five pairs of line sensors, CCD-L2, CCD-L1, CCD-C, CCD-R1, and CCD-R2 corresponding to five focus detection areas in the screen, respectively. The automatic focus detection circuit 103 transmits a voltage obtained from the line sensor 6f to the CPU 100, which performs A-D conversion for line sensor signals in order by using the built-in A-D converter.

SW-1, which is set on by a first stroke of a release button, indicates a photometric switch for starting photometry, AF, and a line of sight detecting operation, SW-2 indicates a release switch which is set on by a second stroke of the release button, and SW-DIAL1 and SW-DIAL2 are dial switches set in an electronic dial 45 with their states entered in an up/down counter of the signal input circuit to count a rotation click amount of the electronic dial 45.

A camera control means, which is a component of the camera of this invention, comprises the CPU 100 and the EEPROM 100a, the CPU 100 controlling the camera by transmitting signals to each functional member of the camera and processing signals received from various detection circuits.

In addition, a line of sight detection means comprises the CPU 100, the line of sight detection circuit 101, the IRED driving circuit 107, the CCD-EYE 14, and an eyeball rotation angle detection means.

Figure 6A:
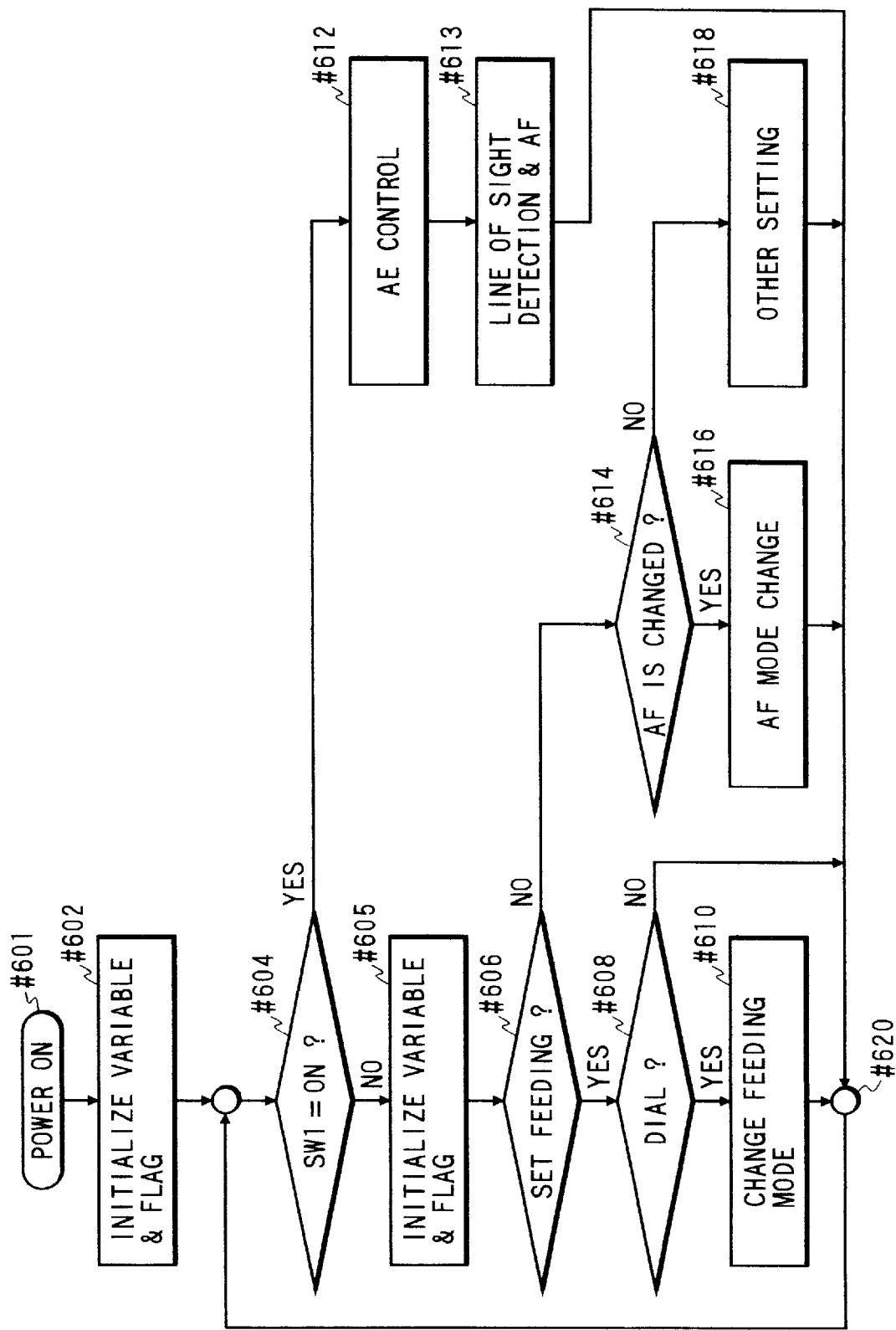
Figure 7:
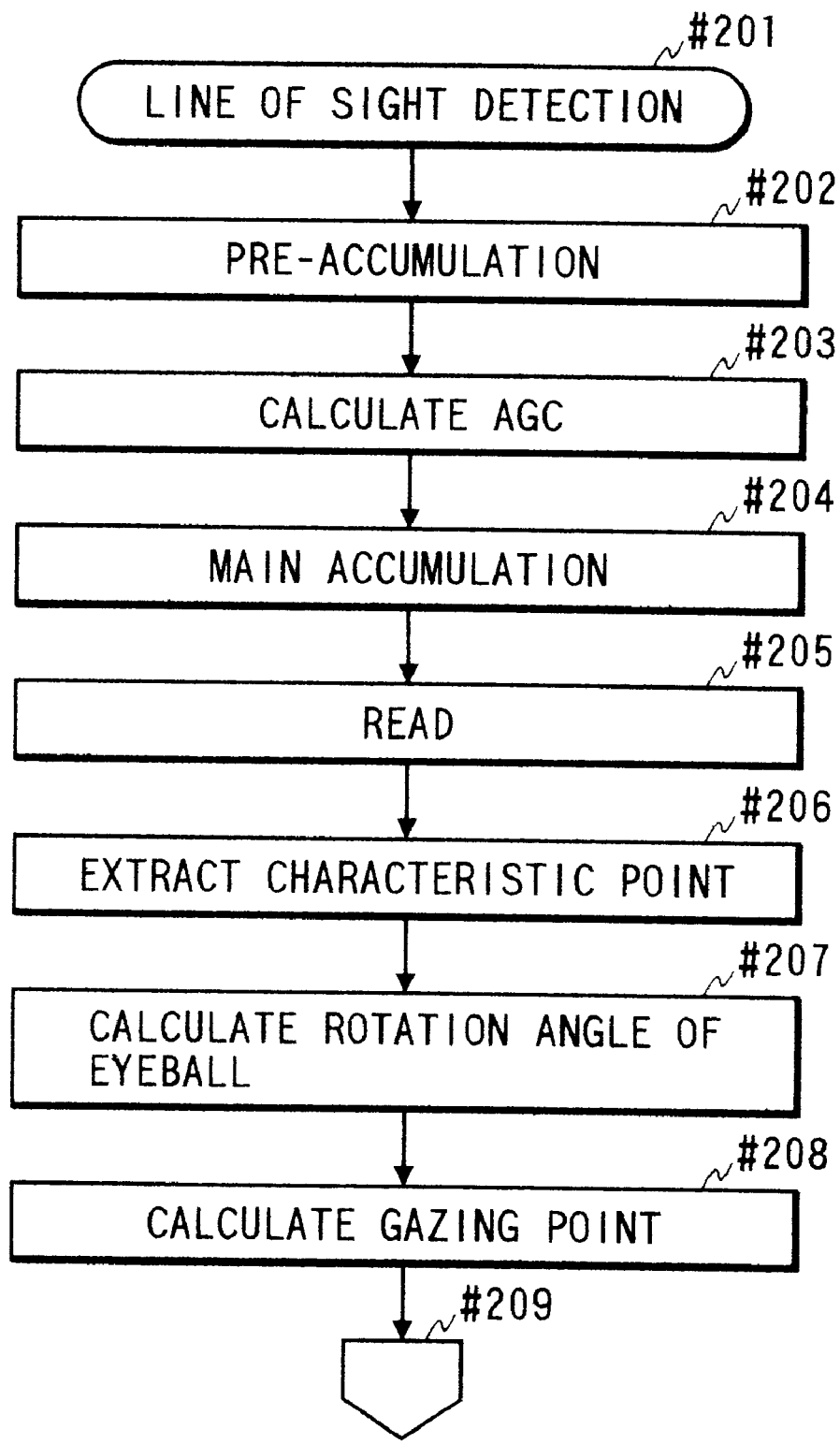
FIG. 7 is a flowchart for describing a line of sight detecting operation.

Then, by using FIGS. 6A, 6B and 7 illustrating operation flowcharts of the camera having the line of sight detection means, the operation is described below.

First, the operation of an entire sequence will be described by using a flowchart in FIG. 6A.

In this flowchart a normal sequence of the camera is explained, but not including special operations and how to cope with trouble caused by unexpected accidents.

In #601, the camera is powered on by rotating a mode dial, which is not shown, to set the camera in an inoperative state to a predetermined photographing mode.

In #602, all variables, flags, or the like are initialized.
The "Line of sight detection inhibition flag" is cleared.
The "AF inhibition flag" is cleared.
The "Release and feeding interruption" is inhibited.
The "Flag after release" is cleared.

As a result of detecting a state of the switch SW1 turned on by the first stroke of the release button in #604, processing proceeds to #605 if it is in the off state, or to #612 if it is in the on state.

In #605, variables, flags, or the like are initialized. In this step, the initialization is performed if the SW1 is pressed once for a predetermined operation and then the SW1 is released again. An anticipated counter AICNT described later is also cleared in this step (for clearing an AFING flag indicating that the SW1 has not been pressed).

The "Line of sight detection inhibition flag" is cleared to perform a line of sight detection, and the "AF inhibition flag" is cleared to perform AF. Furthermore, the "release and feeding interruption" is inhibited. The "Flag after release" is also cleared.

In #606, it is checked whether or not the current camera is in a feeding mode setting state. If it is in the feeding mode setting state, processing proceeds to step #608. Otherwise, it proceeds to step #614.

In #608, it is checked whether or not some dial change has occurred. If no dial change is detected, processing proceeds to step #620 without switching the feeding mode. If it is detected, processing proceeds to step #610.

In step #610, the feeding mode is changed every time the dial is changed. The feeding mode includes a "one shot mode" for photographing by only one piece when the release switch SW2 is pressed and a "continuous shot mode" for photographing continuously while the SW2 is pressed, between which an operation is switched whenever the dial changes. After the feeding mode is set, processing proceeds to step #620.

In step #614, it is determined whether or not the camera is in an AF mode change state. If it is in the AF mode change state, processing proceeds to step #616. Otherwise, it proceeds to step #618.

In step #616, the AF mode is changed. As described above, the AF mode includes a "mode for static object" and a "mode for dynamic object", between which an operation is switched so as to obtain an appropriate mode. After the AF mode is set, processing proceeds to step #620.

In step #618, settings other than the feeding mode and the AF mode are performed.

In step #612, an "AE control" subroutine is executed, such as for photometry or camera state display. The "AE control" subroutine calculates an AE control value based on an algorithm known to a photometric value by activating a photometric sensor. The calculated AE control value is displayed on an external liquid crystal display of the camera. Then, processing proceeds to step #613.

In step #613, a "line of sight detection and focus detection" subroutine is executed. This subroutine is executed repeatedly while the SW1 is pressed.

In step #620, processing returns to step #604 after a series of the operation is completed and the operation of the camera is repeated again.

Next, a release operation of this embodiment will be explained by using FIG. 6B. The release operation is executed by an interruption routine.

In step #686, if the SW2 is turned on by the release button being pressed up to the second stroke when an interruption is permitted, a "release and feeding" subroutine is called by an interruption processing.

In step #688, a "release feeding" interruption is inhibited.

In step #692, a control value of an aperture and a shutter speed are calculated. The aperture and shutter speed are calculated based on a predetermined algorithm from a photometric value or a setting value according to a photographing mode of the camera.

In step #693, a main mirror (2) and a sub mirror (3) of the camera are raised up for communication with the aperture driving circuit 111, and an aperture 31 in a lens is controlled to the value calculated in step #692.

Next, in step #694, by energizing a shutter magnet MG-1, a forward shutter curtain is run to start an exposure. Then, after an elapsed predetermined time calculated in step #692, a shutter magnet MG-2 is energized to run a rearward shutter curtain to terminate the exposure.

In step #695, the mirror is lowered to a predetermined position to have communication with the aperture driving circuit 111 and then the aperture is returned to a release state.

In step #696, a film is fed by a single frame and a shutter spring is charged. Processing proceeds to step #698 for performing operations in a continuous shot mode or to step #700 for a one shot mode.

In step #698, after photographing by a single frame, a "line of sight detection inhibition flag" is cleared to perform a line of sight detection when the "line of sight detection" subroutine is called. Then, processing proceeds to step #699.

In step #699, a "flag after release" is set indicating that a release has been performed.

In step #700, a "release feeding" interruption subroutine is terminated. The "release feeding" subroutine is not returned to a program in which an interruption occurs, but to step #604 in FIG. 6A.

Next, an operation of a "line of sight detection & AF" subroutine in step #613 is described by using a flowchart in FIGS. 1A to 1C.

If the "line of sight detection & AF" subroutine is called, it is executed from step #631.

In step #631, it is determined whether or not line of sight detection is permitted. An inhibition of line of sight detection can be checked by the "line of sight detection inhibition" flag. Since it is permitted initially, processing proceeds to step #632. If the line of sight detection is inhibited, processing proceeds to step #636 without performing the line of sight detecting operation.

In step #632, a line of sight input mark is indicated to express the fact that a line of sight input is being executed, prior to performing a line of sight detection. An LED (F-LED) 25 for illumination is turned on and a line of sight input mark of an LCD 24 in a viewfinder is turned on via the LCD driving circuit 105. Based on this indication, a photographer can confirm that the camera is performing a line of sight detecting operation.

Figure 48A:
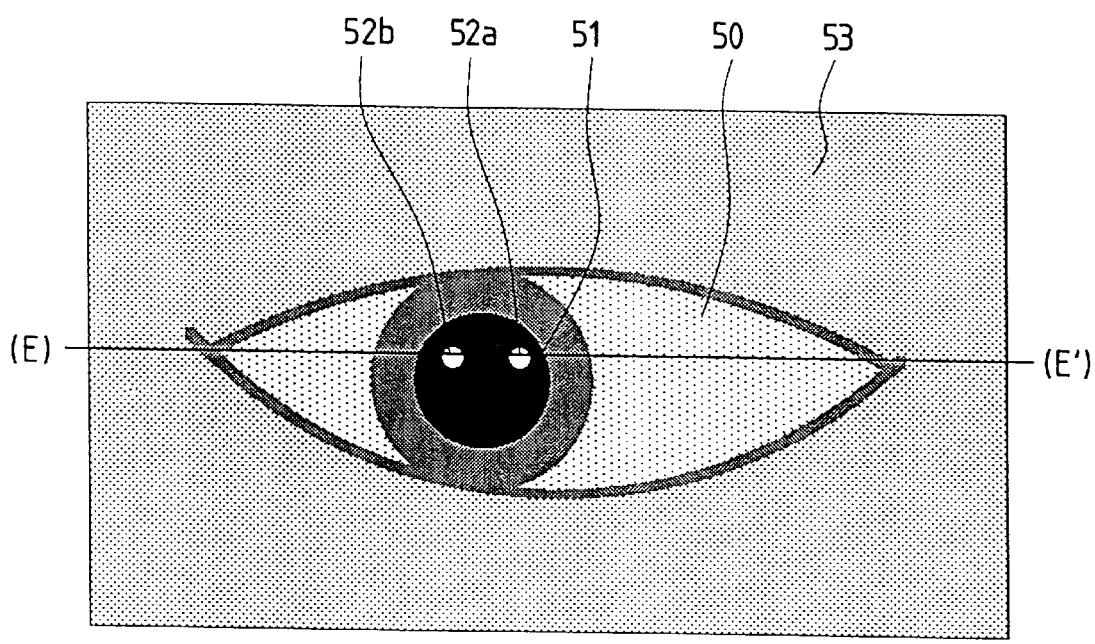
FIGS. 48A and 48B are schematic diagrams of an eyeball image and an output signal.
Figure 48B:
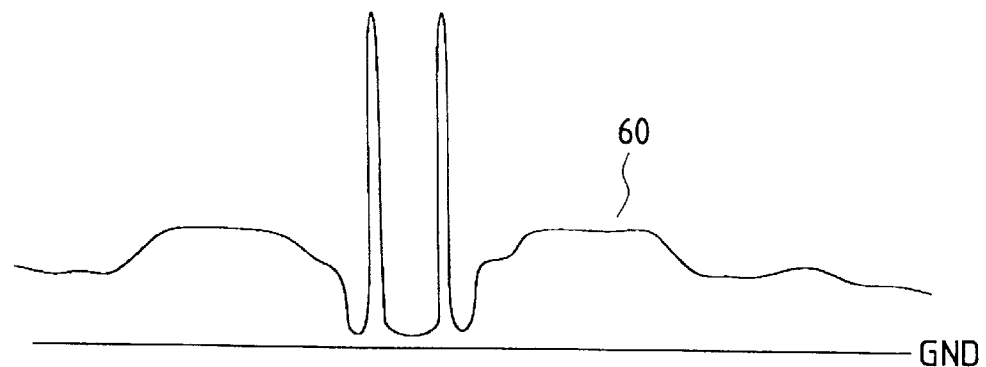
Figure 49:
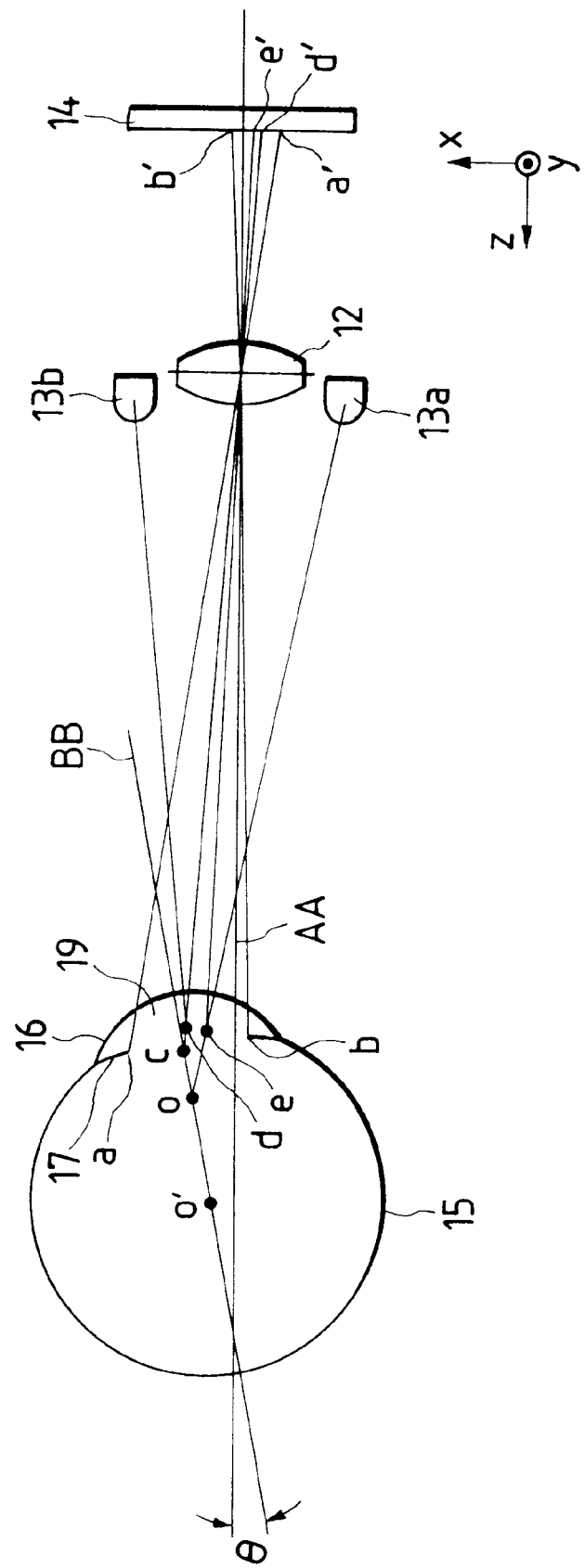
FIG. 49 is a description diagram of a principle of a line of sight detection method.

A line of sight detection is performed following a predetermined algorithm in step #633. First, the IRED driving circuit 107 is activated to turn on an IRED previously determined according to a position of the camera and the line of sight detection circuit 101 is activated to start an accumulating operation of a CCD-EYE 14. After the accumulation is terminated, accumulated electric charges are read out to the CPU 100 sequentially, an A-D conversion is performed, and processing is performed following a predetermined algorithm. Processing is performed for all picture elements of the CCD-EYE 14 to obtain the coordinates of cornea reflection images 52b and 52a of an eyeball illumination light source and central coordinates of a pupil 51 shown in FIGS. 48A and 48B. By calculation following this algorithm, coordinates of a gazing point of the photographer can be obtained.

In step #634, line of sight detection is inhibited so that the line of sight detection is not repeated any more once the detection is performed. The line of sight detection is inhibited by setting the "line of sight detection inhibition flag".

Figure 3A:
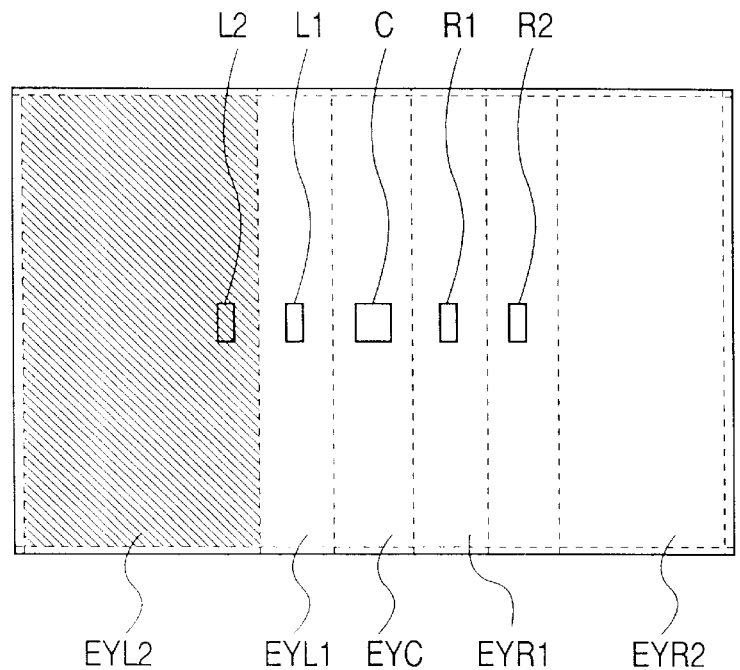
FIGS. 3A and 3B are description diagrams of a line of sight range.

In step #635, a focus detection area is selected based on the coordinates of the line of sight position obtained in a line of sight detection by a "focus detection area selection & display" subroutine. Then, by using FIGS. 3A and 3B, the coordinates of a line of sight position and a focus detection area are described. In FIG. 3A, L2, L1, C, R1, and R2, which correspond to CCD-L2, CCD-L1, CCD-C, CCD-R1, and CCD-R2 of a line sensor 6f, respectively, detect a focus in each place. If the coordinates of the line of sight position on the viewfinder are within a range of EYL2, it is determined that the photographer is gazing at L2 and a focus is detected by using the CCD-L2. In the same manner, if the line of sight position is within a range of EYL1, EYC, EYR1, or EYR2, a focus is detected by L1, C, R1, or R2, respectively. Next, an explanation is made for specific ranges of EYL2, EYL1, EYC, EYR1, and EYR2 by using FIG. 3B.

Characters x and y indicate coordinate axes for obtaining a line of sight position on the viewfinder and obtained coordinates of a line of sight position are indicated by ($x_n$, $y_n$).

The range of the EYL2 is $-x3<x_n\leq x2$ and $y1\leq y_n\leq -y1$

The range of the EYL1 is $-x2<x_n\leq x1$ and $y1\leq y_n\leq -y1$

The range of the EYC is $-x1<x_n\leq x1$ and $y1\leq y_n\leq -y1$

The range of the EYR1 is $x1<x_n\leq x2$ and $y1\leq y_n\leq -y1$

The range of the EYR2 is $x2<x_n\leq x3$ and $y1\leq y_n\leq -y1$

Figure 3B:
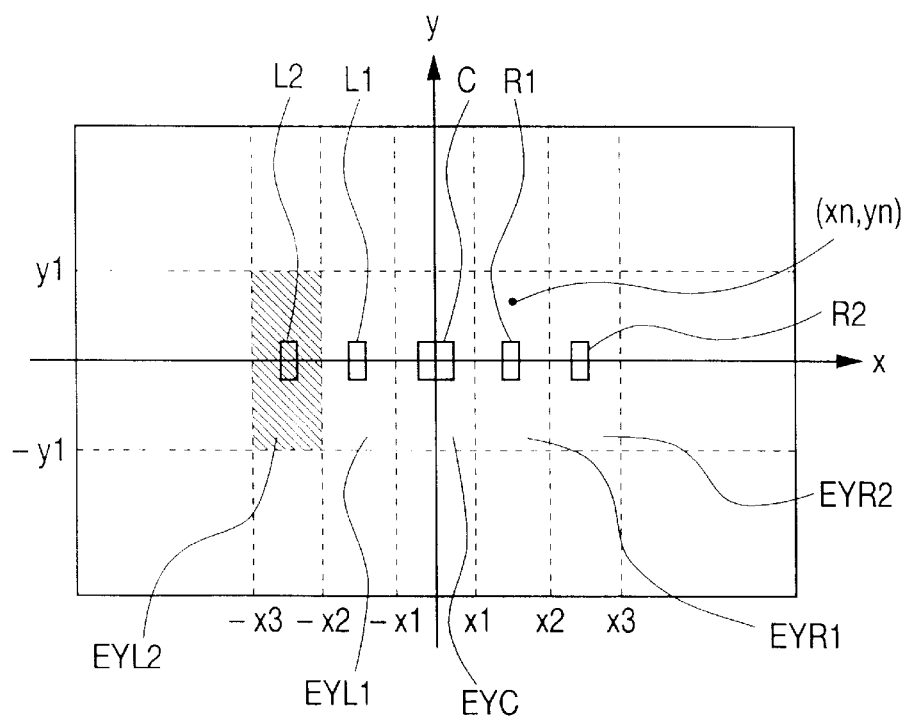

If the line of sight is placed at a position ($x_n$, $y_n$) in FIG. 3B, the range is EYR1 since $x1<x_n\leq x2$ and $y1\leq y_n\leq -y1$. If the line of sight is within the range EYR1, a focus detection area R1 is selected.

By using a flowchart in FIG. 2, the "focus detection area selection & display" subroutine is explained.

If the subroutine is called, the program is started to be executed from step #101.

In step #101, it is determined whether or not the focus detection mode of the camera is a mode for a static object (one shot mode) in which a focus detecting operation is not performed after the camera is focused or a mode for a dynamic object (servo mode) in which a focus detecting operation is continued also after it is in focused. If it is the servo mode, processing proceeds to step #103. If it is in the one shot mode, processing proceeds to step #102.

In step #102, is set a line of sight range parameter corresponding to each focus detecting area in the one shot mode. For example, x1, x2, x3, and y1 correspond to 2.3 mm, 6.1 mm, 18 mm, and 12 mm, respectively.

Figure 10A:
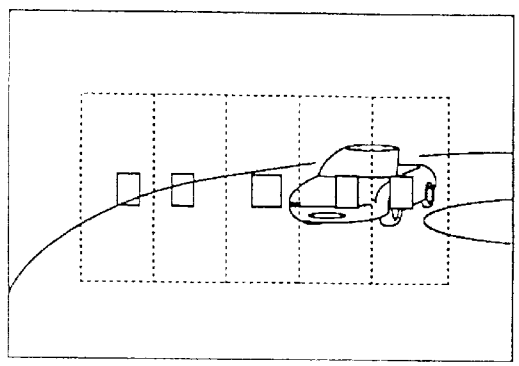
FIGS. 10A and 10B are description diagrams for the first embodiment.
Figure 10B:
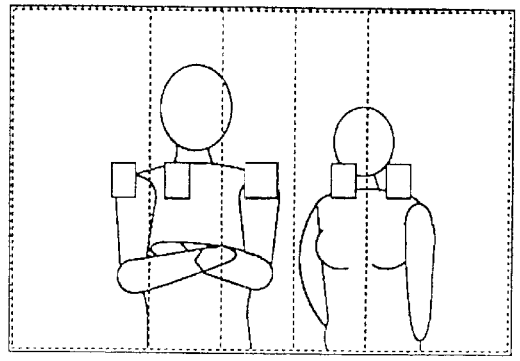

In step #103, is set a line of sight range parameter corresponding to each focus detecting area in the servo mode. For example, x1, x2, x3, and y1 correspond to 2.3 mm, 6.1 mm, 9.2 mm, and 9 mm, respectively. In this embodiment, the range in the one shot mode is larger than that in the servo mode. This is explained by using FIGS. 10A and 10B. For an object moving as shown in FIG. 10A, the line of sight range corresponding to each focus detecting area is relatively small, so that it is hard to select other focus detecting areas even if the line of sight deviates from the object temporarily and the line of sight can continue to follow the moving object with the focus detecting area almost fixed. If a static object is photographed as shown in FIG. 10B, the line of sight range corresponding to each focus detecting area is relatively wide.

In step #104, a y direction (vertical direction) is determined, first. If yn is in a range of y1≦yn≦-y1, processing proceeds to step #105. Otherwise, it proceeds to step #115.

In step #105, if the y direction (vertical direction) is within the range in its determination, an x direction is determined, next. If xn satisfies -x3<xn≦-x2, processing proceeds to step #110. It is the case that the line of sight position (xn, yn) is within the range EYL2. Otherwise, processing proceeds to step #106.

In step #106, unless xn satisfies -x3<xn≦-x2, it is determined whether or not it satisfies -x2<xn≦-x1. If xn satisfies it, processing proceeds to step #111. It is the case that the line of sight (xn, yn) is within the range EYL2. Otherwise, processing proceeds to step #107.

In step #107, unless xn satisfies -x2<xn≦-x1, it is determined whether or not it satisfies -x1<xn<x1. If xn satisfies it, processing proceeds to step #112. It is the case that the line of sight (xn, yn) is within the range EYC. Otherwise, processing proceeds to step #108.

In step #108, unless xn satisfies -x1<xn<x1, it is determined whether or not it satisfies x1≦xn<x2. If xn satisfies it, processing proceeds to step #113. It is the case that the line of sight (xn, yn) is within the range EYR1. Otherwise, processing proceeds to step #109.

In step #109, unless xn satisfies x1≦xn<x2, it is determined whether or not it satisfies x2≦xn<x3. If xn satisfies it, processing proceeds to step #114. It is the case that the line of sight (xn, yn) is within the range EYR2. Otherwise, processing proceeds to step #115, since it does not belong to any range.

In step #110, the line of sight position (xn, yn) is within the area EYL2, and a focus detection area L2 is selected.

In step #111, the line of sight position (xn, yn) is within the area EYL1, and a focus detection area L1 is selected.

In step #112, the line of sight position (xn, yn) is within the area EYC, and a focus detection area C is selected.

In step #113, the line of sight position (xn, yn) is within the area EYR1, and a focus detection area R1 is selected.

In step #114, the line of sight position (xn, yn) is within the area EYR2, and a focus detection area R2 is selected.

In step #115, if the line of sight position is not located in any area, a focus detection area is selected independently of a result of the line of sight detection. In this case, either a center focus detection area can be previously selected, or a focus detection area selected as the last time result can be selected again. It is also possible to select a focus detection area later based on a focus detection result without selecting a focus detection area in this subroutine intentionally.

If a focus detection area is selected in steps #110 to #115, a focus detecting area is displayed.

In step #116, a signal is transmitted to the LED driving circuit 106 to display the above focus detecting area with blinking (or with lighting) by using an LED for superimposing 21.

In step #117, the subroutine returns.

After returning to the "focus detection area selection & display" subroutine, processing proceeds to step #630.

In step #630, AFING is set to 1. Afterward, it is determined whether or not an operation is the first "line of sight detection & AF" since the SW1 button is pressed according to this flag.

In step #636, it is determined whether or not a lens is being driven by communicating with the lens driving circuit 110. If the "line of sight detection & AF" subroutine is executed at the last time and lens driving is performed, processing proceeds to step #680 unless the lens driving is terminated. If the lens driving is not performed yet or it is already terminated, processing proceeds to step #637.

In step #637, processing proceeds to step #640 in a one shot mode in which it is determined whether an AF mode is the mode for a static object (one shot mode) or the mode for a dynamic object (servo mode), or to step #660 in a servo mode.

In step #640, it is determined whether or not a focus detection is permitted by using an "AF inhibition flag". If an in-focus state is made and the SW1 is kept to be held as it is, the "AF inhibition flag" is being set, and therefore, processing proceeds to step #680 in this case.

In step #642, a focus detection operation is performed. A focus is detected for a focus detecting area selected by a line of sight detection out of a plurality of focus detecting areas.

In step #644, it is determined whether or not the focus cannot be detected in the focus detecting area in the step #642. If the focus cannot be detected, processing proceeds to step #654. Otherwise, it proceeds to step #646.

In step #646, it is determined whether or not a focus detection result is an in-focus state. If a defocus amount obtained by the focus detection is within a predetermined amount, the focus state is considered to be in-focus. If it is in-focus, processing proceeds to step #650. Otherwise, it proceeds to step #652.

In step #648, an in-focus display is performed to notify a photographer that the focus detection result is an in-focus state. The illumination LED (F-LED) 25 is turned on, and an in-focus mark of an LCD in a viewfinder 24 is turned on via the LCD driving circuit 105.

In step #650, a "release feeding" interruption is permitted due to an in-focus state so that a release operation is performed with an interruption when the SW2 is pressed. In addition, the "AF inhibition flag" is set so that a focus detection operation will not be performed again.

In step #652, lens driving is performed unless the result is an in-focus state in the step #646. A lens driving amount is calculated from the defocus amount in the focus detection in the step #642, and it is reported to the lens driving circuit 110. The lens driving circuit 110 drives a lens driving amount lens to which the amount is reported by driving a lens driving motor 33 with monitoring a pulse plate 36. The CPU 100 need not monitor the lens driving amount after reporting data to the lens driving circuit 110, and therefore, another operation can be performed while driving the lens. Accordingly, after the communication with the lens driving circuit is terminated, processing proceeds to step #680.

In step #654, a disabled AF is displayed to notify the photographer that the focus detection result is disabled. The disabled AF display is performed by the blinking of the in-focus mark of the LCD in the viewfinder 24.

In step #656, the "line of sight detection inhibition flag" is cleared to perform a line of sight detection again. By this operation, a line of sight detection and a focus detection are performed if the "line of sight detection & AF" subroutine is called next.

In step #660, a focus detection operation is performed. A focus is detected for a focus detecting area selected out of a plurality of focus detecting areas by the line of sight detection. The distance to an object whose focus is detected is stored at this time. If a focus is detected in a method of detecting a defocus amount, the distance is calculated from absolute distance information of the lens at the detection and the detected defocus amount. If the lens does not have the absolute distance information, the distance can be obtained by driving the lens to an initial position (for example, an infinite position) when the lens is mounted on the camera to clear a counter in the lens.

In step #661, it is determined whether or not the focus detection in the step #660 is disabled. If the focus detection is disabled, the control branches to step #662.

In step #662, the "line of sight detection inhibition flag" is cleared to perform a line of sight detection again. By this operation, a line of sight detection and a focus detection are performed if the "line of sight detection & AF" subroutine is called next.

In step #664, defocus data and timing when a focus is detected or the like are stored and updated to anticipate the movement of the object. Counter AICNT of anticipation data is incremented.

In step #668, the movement of the object is anticipated by calculation from past focus detection data of a plurality of times based on a predetermined algorithm. Accordingly, it is determined whether or not the past data is sufficient by using the AICNT counter. If the data is enough to anticipate the movement of the object, processing proceeds to step #670. Otherwise, the control branches to step #678. To perform calculation for the anticipation with a linear function, the movement can be anticipated by a value of 2 or greater of the AICNT counter, and with a quadratic function, it can be anticipated by a value of 3 or greater of the AICNT counter.

In step #670, a defocus position of the object at actual shutter curtain running after the release switch is pressed, is calculated from a currently detected defocus amount, a defocus amount stored in the past, a lens driving amount, a focus detection interval, and a release time lag following the predetermined algorithm.

In step #672, it is determined whether or not the anticipated defocus amount which has been calculated is appropriate. If the anticipated defocus amount is greater than a certain threshold or a direction is inverted, processing proceeds to step #676 since the anticipated result is not appropriate.

In addition, if a lens driving amount is zero by a plurality of times, processing proceeds to step #676 since the object is not moving. If the anticipated result is appropriate, it proceeds to step #674.

In step #674, the anticipated defocus amount is converted to a lens driving amount and the value is reported to the lens driving circuit 110 to perform lens driving.

In step #675, a release permission is determined. If conditions for release permission are satisfied, "release feeding interruption" is permitted. If the lens is driven with an anticipation amount, a lens stop is awaited in this routine, and the "release feeding interruption" is permitted after the lens driving is terminated. If the lens is driven with a defocus amount, the "release feeding interruption" is permitted if a lens driving amount is small or it is zero. In the "mode for a dynamic object", the "line of sight detection inhibition flag" is cleared to perform a line of sight detection again in the next time. By this operation, if the "line of sight detection & AF" subroutine is called next, a line of sight detection and a focus detection are performed.

In step #676, anticipated data is deleted to initialize the anticipation if the anticipation is not appropriate in the step #672. If the anticipation is not appropriate, the data stored in the past or the current defocus amount is incorrect, and therefore, the data must be deleted to store new anticipated data. At this point, the anticipation counter AICNT is also cleared.

In step #678, the lens is driven with the detected defocus amount if the anticipation is disabled. If the lens driving amount is smaller than a predetermined value, lens driving is not performed to prevent the lens from jerking.

In step #680, the "line of sight detection & AF" subroutine is terminated and processing returns.

FIG. 7 is a flowchart of a line of sight detection.

(#201) The CPU 100 transmits signal to the line of sight detection circuit to start an execution of a line of sight detection in the step #633 in FIGS. 1A to 1C.

(#202) To determine the accumulated time and a read amplification rate of an image sensor to obtain an eyeball image of the photographer, electric charges are accumulated in a predetermined accumulation time for the image sensor 14. This operation is called pre-accumulation.

(#203) Next, the CPU 100 transmits a signal to the line of sight detection circuit 10 to read out the accumulated electric charges, which are pre-accumulated and performs an A-D conversion sequentially to determine the accumulation time, amplification characteristics in the main accumulation, and the output gain (AGC calculation).

(#204) Then, the main accumulation is performed. First, the CPU 100 turns on the infrared light emitting diodes (IRED) 13a and 13b to illuminate an eye of the photographer and obtains an output of the sensor by controlling the accumulation and gain with the accumulation time and the output amplification rate determined by the AGC calculation in the step #203. When the accumulation is terminated, the IREDs are also turned off.

(#205) The CPU 100 reads out an eyeball image of the photographer from the image sensor 14 for which the accumulation is terminated.

(#206) Then, characteristics extracting processing is performed for a P image and a pupil section of the read sensor image. This characteristics extraction can be performed sequentially with reading processing in the step #205. Since the processing is described concretely in detail in U.S. application Ser. No. 08/387,614 filed on Feb. 13, 1995 by this applicant, a detailed explanation is omitted here. Since the P image is a cornea reflection image of the IREDs for illuminating an eyeball, it appears as a bright point with high light intension in an image signal, and therefore, a pair of the P images can be detected on the basis of the characteristics and their positions (xd', yd') and (xe', ye') can be obtained. The reflection rate of the pupil is extremely low and the pupil can be detected as a part having a feature that it satisfies a certain standard on the image, though the luminance is low. In this manner, a center of the pupil (xc', yc') and a pupil diameter (rc) are detected.

(#207) If the position of the P image and the pupil are detected from the eyeball image of the photographer, a rotation angle of an eyeball light axis of the photographer ($\theta x$, $\theta y$) can be calculated.

(#208) After the rotation angle of the eyeball is calculated, coordinates of a gazing point on the viewfinder can be obtained by a predetermined calculation with the above expressions (4a) and (5a). Individual data of each photographer is previously obtained for the predetermined number of calculations of the coordinates of a gazing point from an eyeball rotation angle m and Δ. The individual data is obtained by a calibration operation performed before the line of sight detection operation. The calibration operation, however, is not explained here.

(#209) The line of sight detection is terminated.

As described above, by changing a line of sight range corresponding to each focus detecting area between the mode for a dynamic object and the mode for a static object, a focus detecting area can be determined, coping with the problem that conditions under which the line of sight position of the photographer moves are different between photographing a static object and a dynamic object.

Although the first embodiment shows an example of changing the range of a line of sight corresponding to each focus detecting area between the mode for a dynamic object and the mode for a static object, this section describes photographing a dynamic object. Since the description for other than the "focus detection area selection & display" subroutine is the same as for the first embodiment, only the "focus detection area selection & display" subroutine is explained here.

Figure 4:
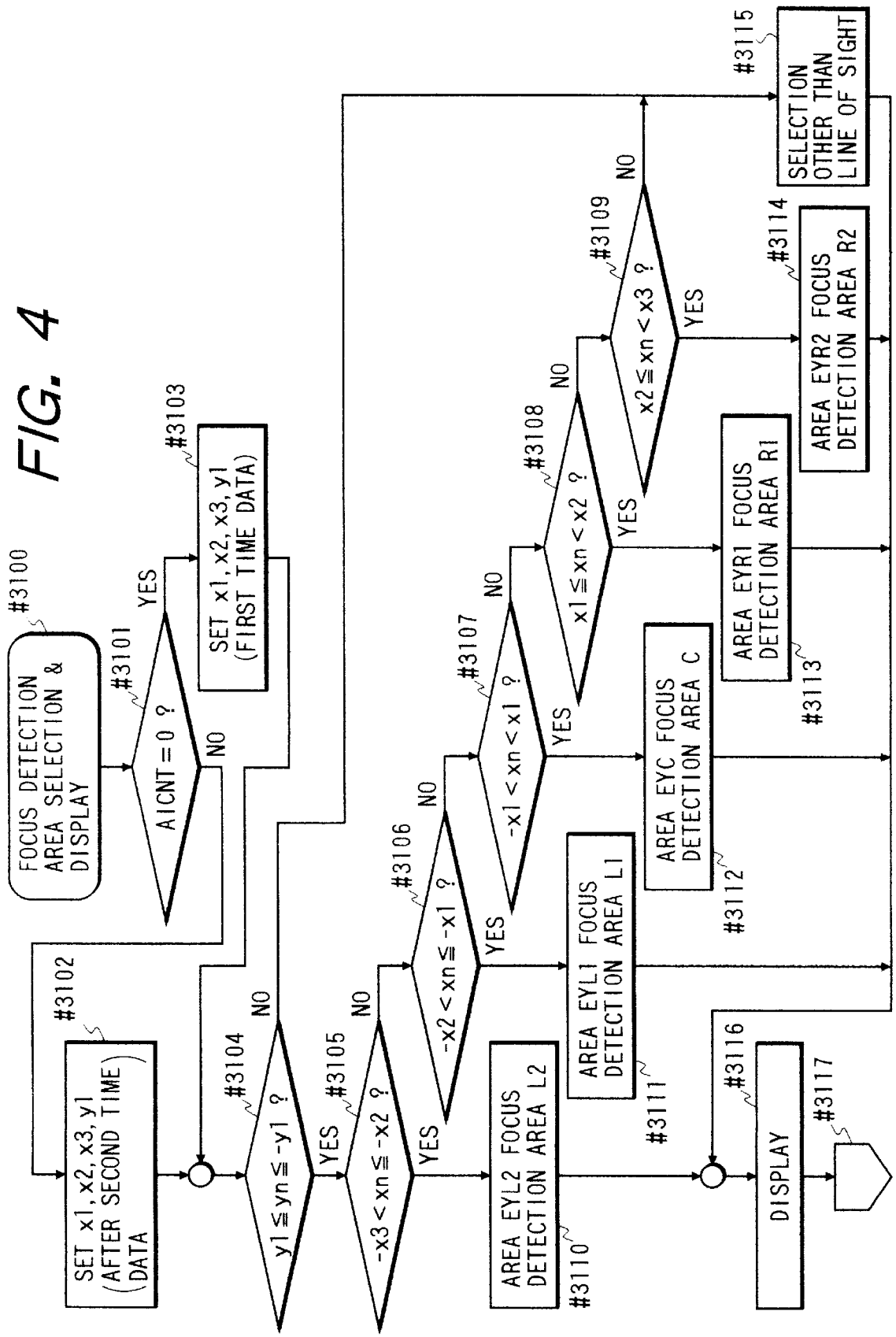
FIG. 4 is a flowchart for describing an operation according to a second embodiment.

By using a flowchart in FIG. 4, the "focus detection area selection & display" subroutine will be explained.

If the subroutine is called, the program is started to be executed from step #3101.

In the step #3101, it is determined whether or not an anticipation calculation is being executed by using the anticipation counter AICNT. If an anticipation is being executed (during anticipation operation), processing proceeds to step #3102. If an anticipation is not started yet (AICNT=0), it proceeds to step #3103.

If this determination is performed by using the anticipation counter AICNT, the line of sight range corresponding to each focus detecting area is relatively large when an anticipation is cleared halfway, and it is relatively small during anticipation.

For example, if the determination is performed in the same manner by using AFING instead of AICNT, it is also possible to have a large line of sight range corresponding to each focus detecting area only for the first time by pressing the SW1 and have a small line of sight range corresponding each focus detecting area for the second time and times thereafter.

In step #3102, is set a line of sight range parameter corresponding to each focus detecting area before starting the anticipation. For example, x1, x2, x3, and y1 correspond to 2.3 mm, 6.1 mm, 12 mm, and 10 mm, respectively.

In step #103, is set a line of sight range parameter corresponding to each focus detecting area during anticipation. For example, x1, x2, x3, and y1 correspond to 2.3 mm, 6.1 mm, 9.2 mm, and 9 mm, respectively.

Figure 11A:
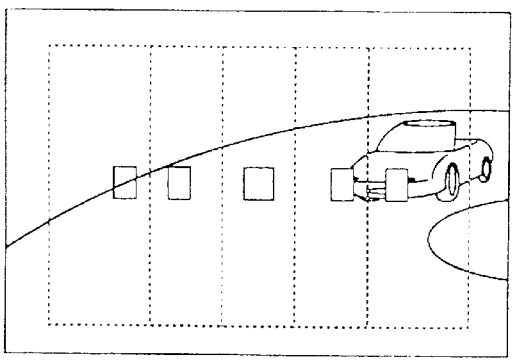
FIGS. 11A and 11B are description diagrams for the second embodiment.
Figure 11B:
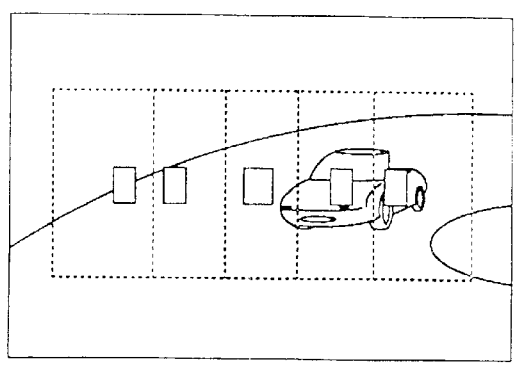

In this embodiment, the range before starting an anticipation is larger than the range during anticipation. It is effective to catch an object easily since a line of sight range is extended before the anticipation is started (at the first line of sight detection) for a dynamic object as shown in FIG. 11A. If the anticipation calculation is started (at the second or after line of sight detection), the calculation is not interrupted even if a line of sight moves to a background by mistake, by reducing the line of sight range as shown in FIG. 1B. Then, processing proceeds to step #3104.

In step #3104, a y direction (vertical direction) is determined, first. If yn is within a range of $y1 \leq yn \leq -y1$, processing proceeds to step #3105. Otherwise, it proceeds to step #3115.

In step #3105, an x direction is determined if yn is within the range in the determination of the y direction (vertical direction). If xn satisfies $-x3<xn \leq -x2$, processing proceeds to step #3110. It is a case that the line of sight position (xn, yn) is within the EYL2 range. If it does not satisfy the condition, processing proceeds to step #3106.

In step #3106, it is determined whether or not xn satisfies $-x2<xn \leq -x1$ unless xn satisfies $-x3<xn \leq -x2$. If it satisfies the condition, processing proceeds to step #3111. It is a case that the line of sight position (xn, yn) is within the EYL2 range. Otherwise, it proceeds to step #3107.

In step #3107, it is determined whether or not xn satisfies $-x1<xn<x1$ unless xn satisfies $-x2<xn \leq -x1$. If it satisfies the condition, processing proceeds to step #3112. It is a case that the line of sight position (xn, yn) is within the EYC range. Otherwise, it proceeds to step #3108.

In step #3108, it is determined whether or not xn satisfies $x1 \leq xn<x2$ unless xn satisfies $-x1<xn<x1$. If it satisfies the condition, processing proceeds to step #3113. It is a case that the line of sight position (xn, yn) is within the EYR1 range. Otherwise, it proceeds to step #3109.

In step #3109, it is determined whether or not xn satisfies $x2 \leq xn<x3$ unless xn satisfies $x1 \leq xn<x2$. If it satisfies the condition, processing proceeds to step #3114. It is a case that the line of sight position (xn, yn) is within the EYR2 range. Otherwise, it proceeds to step #3115, since xn does not belong to any range.

In step #3110, a focus detection area L2 is selected since the line of sight position (xn, yn) is within the area EYL2.

In step #3111, a focus detection area L1 is selected since the line of sight position (xn, yn) is within the area EYL1.

In step #3112, a focus detection area C is selected since the line of sight position (xn, yn) is within the area EYC.

In step #3113, a focus detection area R1 is selected since the line of sight position (xn, yn) is within the area EYR1.

In step #3114, a focus detection area R2 is selected since the line of sight position (xn, yn) is within the area EYR2.

In step #3115, a focus detection area is selected independently of a result of the line of sight detection if the line of sight position is not located in any area. In this case, it is also possible to select the focus detection area again which is selected as a result of the last time determination or to select a result of a focus detection out of a result of an anticipation calculation later without selecting a focus detection area in this subroutine intentionally.

If a focus detection area is selected in steps #3110 to #3115, it is displayed next.

In step #3116, a signal is transmitted to the LED driving circuit 106 to display the above focus detecting area with blinking (or with lighting) by using an LED for superimposing 21.

In step #3117, the subroutine is returned.

After returning the "focus detection area selection & display" subroutine, processing proceeds to step #630.

The subsequent operation is the same as for the first embodiment.

As described above, only for photographing a dynamic object, a focus detecting area can be selected precisely with the line of sight by changing a line of sight range between the first line of sight detection and focus detection and the second or after line of sight detection and focus detection.

A third embodiment shows an example that a line of sight range is changed according to the distance to an object.

The third embodiment is the same as for the first embodiment except the "focus detection area selection & display" subroutine, therefore, this section describes only the "focus detection area selection & display" subroutine.

Figure 8:
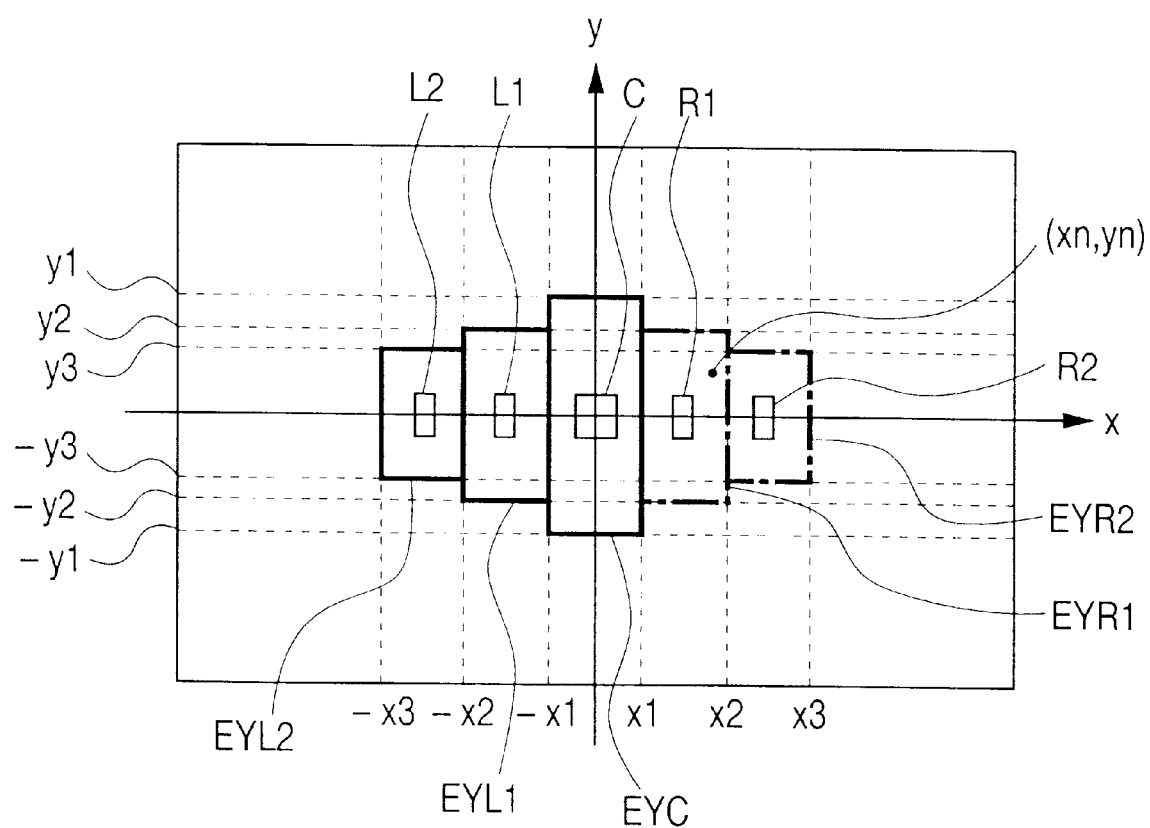
FIG. 8 is a description diagram of the line of sight range according to the third embodiment.

A focus detecting area is selected based on coordinates of the line of sight position obtained by the "focus detection area selection & display" subroutine. Then, by using FIG. 8, an explanation is avoided for the coordinates of the line of sight position and focus detecting areas. In FIG. 8, L2, L1, C, R1, and R2, which correspond to CCD-L2, CCD-L1, CCD-C, CCD-R1, and CCD-R2 of the line sensor 6f, respectively, detect a focus in each position. If the coordinates of the line of sight position on the viewfinder are located within the EYL2 range, it is determined that the photographer is gazing at the L2 and a focus is detected by using the CCD-L2. In the same manner, if the line of sight is located within the EYL1, EYC, EYR1, or EYR2 range, a focus is detected by L1, C, R1, or R2, respectively. Then, specific ranges are explained for EYL2, EYL1, EYC, EYR1, and EYR2. Characters x and y are coordinate axes for calculating a line of sight position on the viewfinder, and the calculated coordinates of the line of sight position is assumed to be (xn, yn).

A range of the EYL2 is $-x3<xn\leq-x2$ and $y3\leq yn\leq-y3$

A range of the EYL1 is $-x2<xn\leq-x1$ and $y2\leq yn\leq-y2$

A range of the EYC is $-x1<xn<x1$ and $y1\leq yn\leq-y1$

A range of the EYR1 is $x1\leq xn<x2$ and $y2\leq yn\leq-y2$

A range of the EYR2 is $x2\leq xn<x3$ and $y3\leq yn\leq-y3$

If a line of sight is put at a position (xn, yn) in FIG. 8, the range is EYR1 since $x1\leq xn<x2$ and $y2\leq yn\leq-y2$. If the line of sight is within the range EYR1, a focus detection area R1 is selected.

Figure 5:
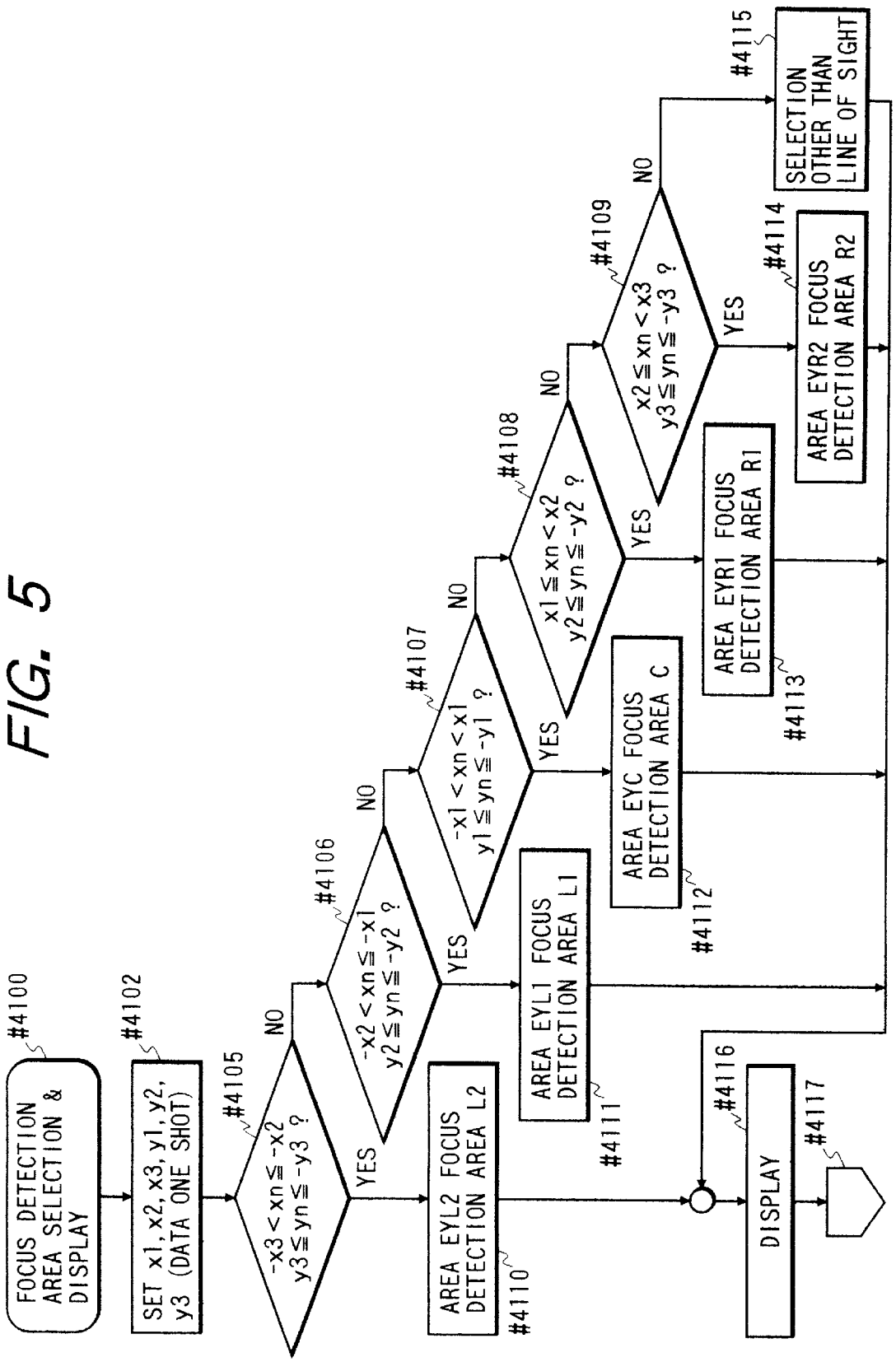
FIG. 5 is a flowchart for describing an operation according to a third embodiment.

By using a flowchart in FIG. 5, the "focus detection area selection & display" subroutine is explained below.

If the subroutine is called, the program is started to be executed from step #4102.

In step #4102, values of parameters x1, x2, x3, y1, y2, and y3 are determined from the distance to an object measured at the last time.

Figure 12A:
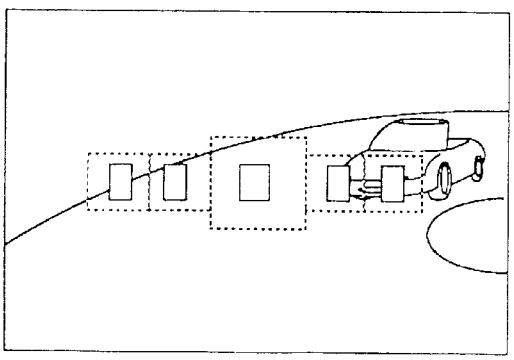
FIGS. 12A and 12B are description diagrams for the third embodiment.
Figure 12B:
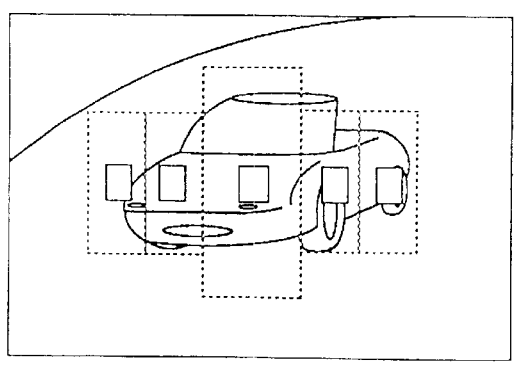

If there are no last time distances because of a first line of sight detection, they are set to predetermined values (for example, the same values as for the one shot mode in the first embodiment: x1=2.3 mm, x2=6.1 mm, x3=18 mm, y1=y2=y3=12 mm). Generally, the longer a distance between a photographer and an object is, the smaller the object on a viewfinder becomes (FIG. 12A), and therefore, the line of sight range is set relatively small and enlarged as the photographer approaches the object (FIG. 12B). The relationship between the distance and the size of the line of sight range is changed according to a focus distance of the photo taking lens. Next, processing proceeds to step #4105.

In step #4150, if xn satisfies $-x3<xn\leq-x2$ and $y3\leq yn\leq-y3$, processing proceeds to step #4110. It is a case that the line of sight position (xn, yn) is within the EYL2 range. Otherwise, processing proceeds to step #4106.

In step #4106, it is determined whether or not xn satisfies $-x2<xn\leq-x$ and $y2\leq yn\leq-y2$. If it satisfies, processing proceeds to step #4111. It is a case that the line of sight position (xn, yn) is within the EYL2 range. Otherwise, processing proceeds to step #4107.

In step #4107, it is determined whether or not xn satisfies $-x1<xn\leq x1$ and $y1\leq yn\leq-y1$. If it satisfies, processing proceeds to step #4112. It is a case that the line of sight position (xn, yn) is within the EYC range. Otherwise, processing proceeds to step #4108.

In step #4108, it is determined whether or not xn satisfies $x1\leq xn<x2$ and $y2\leq yn\leq-y2$. If it satisfies, processing proceeds to step #4113.

In step #4109, it is determined whether or not xn satisfies $x2\leq xn<x3$ and $y3\leq yn\leq-y3$. If it satisfies, processing proceeds to step #4114. It is a case that the line of sight position (xn, yn) is within the EYR2 range. Otherwise, processing proceeds to step #4115, since it is not located in any range.

In step #4110, a focus detection area L2 is selected since the line of sight position (xn, yn) is within the area EYL2.

In step #4111, a focus detection area L1 is selected since the line of sight position (xn, yn) is within the area EYL1.

In step #4112, a focus detection area C is selected since the line of sight position (xn, yn) is within the area EYC.

In step #4113, a focus detection area R2 is selected since the line of sight position (xn, yn) is within the area RYR1.

In step #4114, a focus detection area R2 is selected since the line of sight position (xn, yn) is within the area EYR2.

In step #4115, if the line of sight position is not located in any area, a focus detection area is selected independently of a result of the line of sight detection. In this case, either a center focus detection area can be previously selected, or a focus detection area selected as the last time result can be selected again. It is also possible to select a focus detection area later based on a focus detection result without selecting a focus detection area in this subroutine intentionally.

If a focus detection area is selected in steps #4110 to #4115, a focus detecting area is displayed.

In step #4116, a signal is transmitted to the LED driving circuit 106 to display the above focus detecting area with blinking (or with lighting) by using an LED for superimposing 21.

In step #117, the subroutine is returned.

After returning the "focus detection area selection & display" subroutine, processing proceeds to step #630.

In addition, it is also possible to switch the line of sight range corresponding to each focus detecting area according to the feeding mode of the camera. A required change is only that a feeding mode branches according to the difference between a continuous shot mode and a one shot mode at the step #101 in the flowchart in FIG. 2 and the determination in the step #3101 in FIG. 4. The range is set relatively large in the one shot mode, and it is set relatively small in the continuous shot mode.

Figure 14:
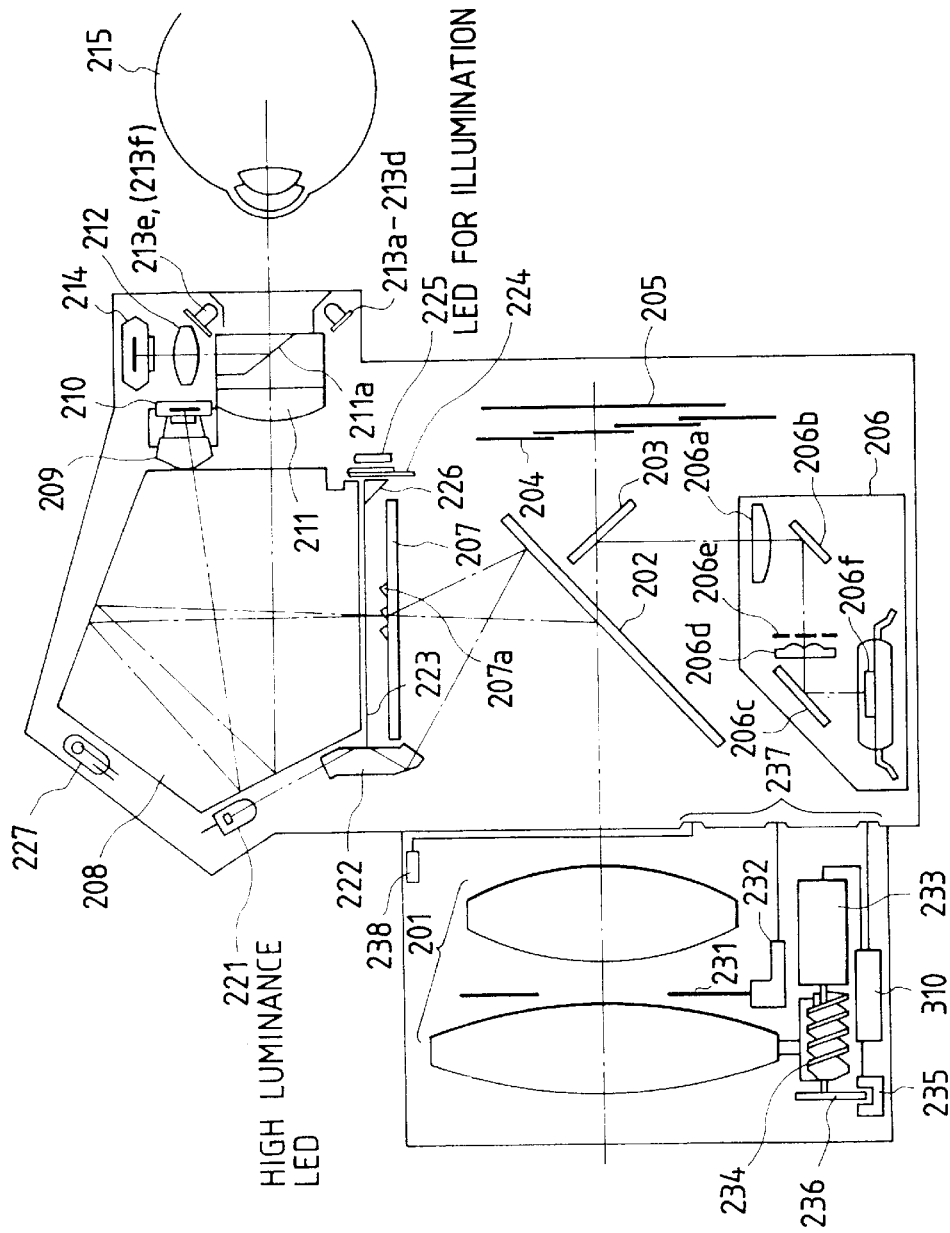
FIG. 14 is a schematic diagram of a main portion of the camera according to the fourth embodiment of this invention.

A fourth embodiment is explained based on drawings. FIG. 14 is a schematic diagram of a main portion of a single lens reflex camera according to an embodiment of this invention. In this drawing, photo taking lens 201 is illustrated by using two pieces of lens for convenience, though it actually comprises more pieces. A main mirror 202 is used to switch a state of an object image through a viewfinder system between an observed state and a photographed state by being in contact slantingly with a photographing optical path or being withdrawn from it. A submirror 203 is used to reflect a part of a flux transmitted through the main mirror 202 back into a focus detection unit 206 at the bottom of the camera body. There are provided a shutter 204 and a photosensitive member 205; besides silver halide, a CCD- or MOS-typed solid camera component or a camera tube such as a vidicon can be used. A focus detection unit 206 comprises a field lens 206a arranged nearby an image formation plate, reflection mirrors 206b and 206c, a secondary optical system 206d, an aperture 206e, and a line sensor 206f. A focus detection device of this embodiment, which uses a known phase difference detection method, can detect focus states in three different areas in the screen.

Figure 15:
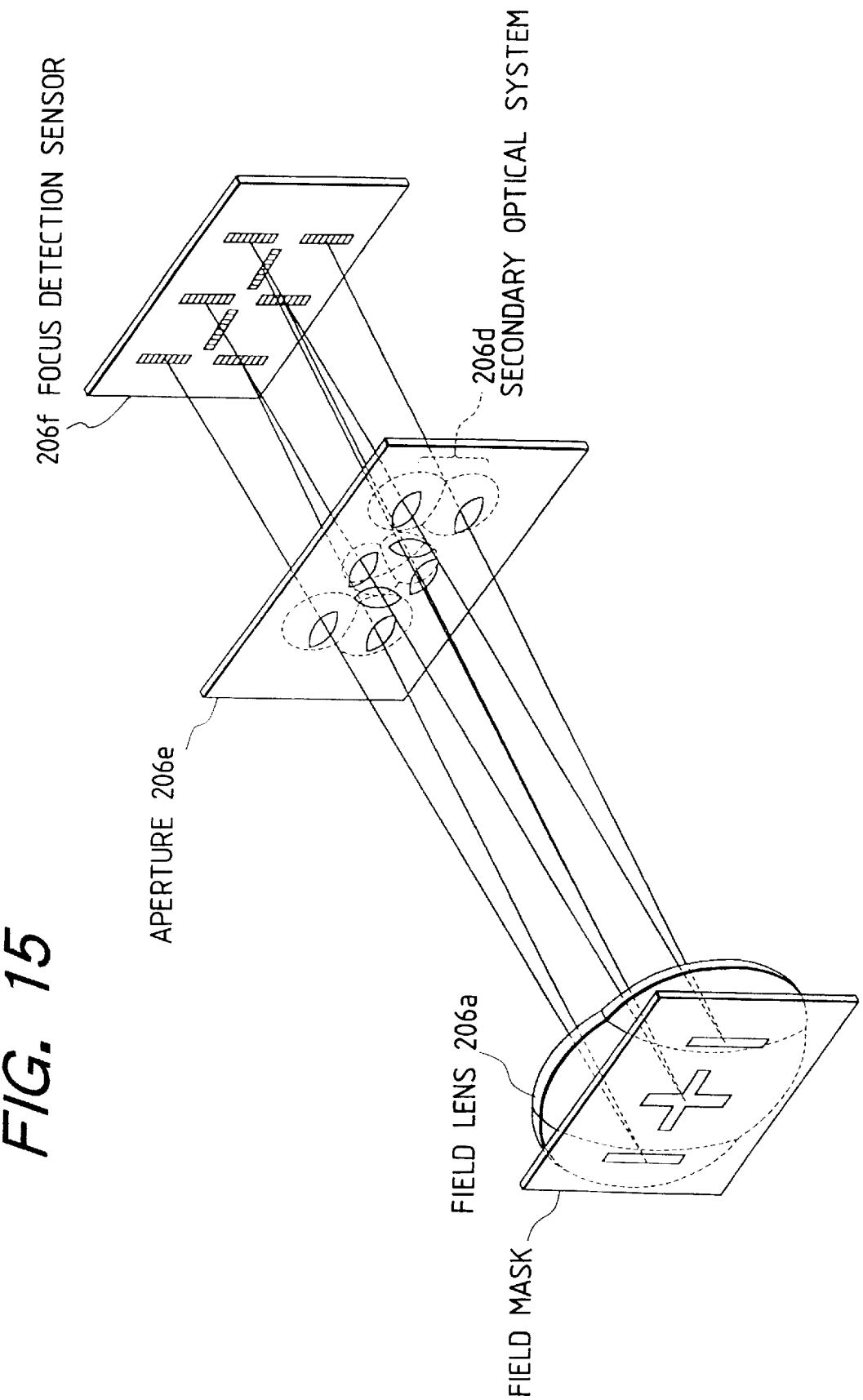
FIG. 15 is a description diagram of a focus detection system of the camera in FIGS. 13 and 14.

The configuration of the focus detection unit 206 is shown in FIG. 15. The flux from the object reflected on the submirror 203 forms images nearby a field mask in FIG. 15.

The field mask is a shield member for selecting a focus detection area in the screen, with a cross opening at a center and two longitudinal openings in its both sides. Three pieces of lens constituting a field lens 206a correspond to three openings on the field mask, respectively.

An aperture 206e is arranged backward of the field lens 206a, with four openings formed by one pair each in vertical and horizontal directions at a central portion and four openings formed by one pair each in left and right sides in a peripheral portion. The field lens 206a has an effect of forming an image of the openings on the aperture 206e around an exit pupil of the photo taking lens 201.

A secondary optical system 206d is arranged backward of the aperture 206e, with eight pieces of lens formed by four pairs. Each piece of the lens corresponds to each opening on the aperture 206e. Each flux passing through the field mask, the field lens 206a, the aperture 206e, and the secondary optical system 206d forms an image on four pairs of (eight) sensor lines on a focus detection sensor 206f. By optical/electrical conversion of the images on each pair of the sensor lines to detect relative position displacements of signals for the four pairs of the images, each focus state can be detected in three areas in total; one area in horizontal and vertical directions at the center on the screen and two areas in the peripheral portion.

In this invention, hereinafter in some cases, the center area is called a center focus detection area, each of the peripheral two areas is called a right focus detection area or a left focus detection area, and the the peripheral area including the both areas is called peripheral focus detection area. For the center focus detection area, a detection result having higher reliability is used as its proper result out of two detection results in the vertical and horizontal directions. The details of the focus detection system are described in, for example, U.S. Pat. No. 5,189,465 issued on Feb. 23, 1993 by this applicant, therefore, further explanation is omitted here.

Returning to FIG. 14, a focusing plate 207 and a pentaprism 208 are already known, and an image formation lens 209 and a photometric sensor 210 are used to measure the luminance of the object in the observed screen. The image formation lens 209 associates the focusing plate 207 with the photometric sensor 210 in conjugation via a reflection optical path in the pentaprism 208.

Next, an eyepiece lens 211 having an optical divider 211a is arranged backward of an exit plane of the pentaprism 208, to be used for observation of the focusing plate 207. The optical divider 211a is formed by, for example, a dichroic mirror which transmits the visible light and reflects infrared light. In addition, there are receptor lens 212 and an area sensor 213 in which CCD or other photoelectric elements are arranged two dimensionally; the receptor lens 212 is arranged so that it is associated with the neighborhood of a pupil of a user's eye 215 at a predetermined position in conjugation. Six IREDs 213a to 213f are light sources for illumination. The eyepiece lens 211, the receptor lens 212, the IREDs 213a to 213f, and an area sensor 214 are components of a line of sight detection means of this embodiment.

Light emitted from an LED for viewfinder superimposing 221 reflects on the main mirror 202 via a prism for projection 222 and is bent at a microprism group 207a set in a display portion of the focusing plate 207 perpendicularly, then it reaches the user's eye 215 passing through the pentaprism 208 and the eyepiece lens 211. Therefore, the microprism group 207a is formed in frames at a position corresponding to a plurality of focus detecting areas on the focusing plate 207, and they are illuminated by three LEDs 221 for superimposing corresponding to each.

This lights three focus detection area marks described later in the viewfinder field, so that a focus detecting area (a focus detection area) can be displayed. A mask 223 is used to form the viewfinder field area. A viewfinder bottom LCD 224 is used to display photographing information outside the viewfinder field and it is illuminated from the back by an LED for illumination 225. Light transmitted through the LCD 224 is led into the viewfinder field by a triangular prism 226 and displayed at the bottom of the viewfinder field as shown by 224 in FIG. 16, so that the user can obtain the photographing information.

Figure 16:
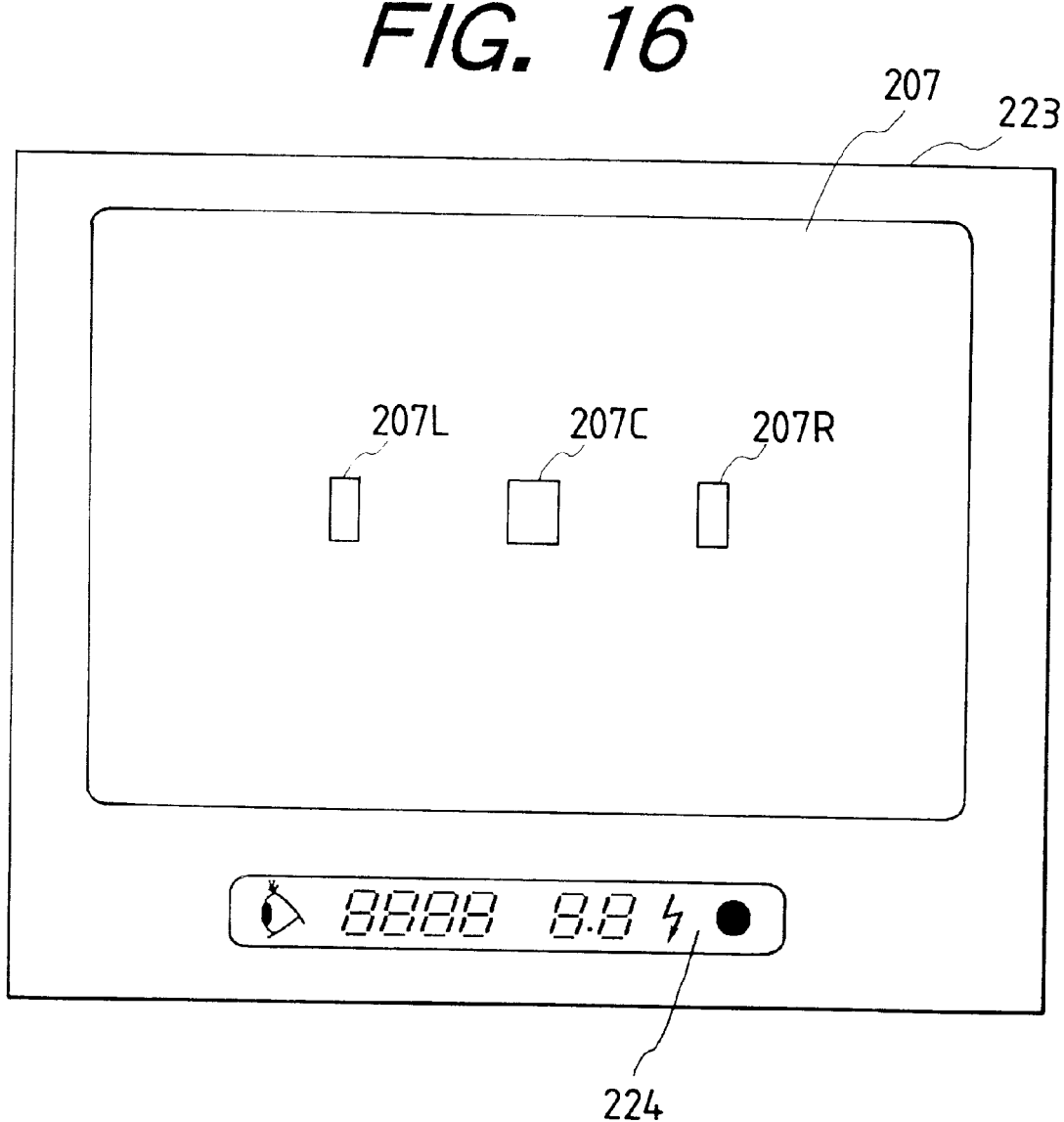
FIG. 16 is a viewfinder of the camera in FIGS. 13 and 14.

The viewfinder field is shown in FIG. 16. In a photographing field 207 on the focusing plate limited by a viewfinder field mask 223, there are focus detecting area (focus detection area) mark 207C, 207R, and 207L as indices indicating three focus detecting areas. These focus detection area marks are microprisms formed on the focusing plate as described above, and illuminated by the LED for superimposing. The liquid crystal display (LCD) 224 is set at the bottom of the viewfinder, with an in-focus display of a focus detection device of the camera, a charging completion display for an electric flash, and a shutter (Tv) value, an aperture (Av) value, and a line of sight mark formed by a 7-segment display.

Figure 13:
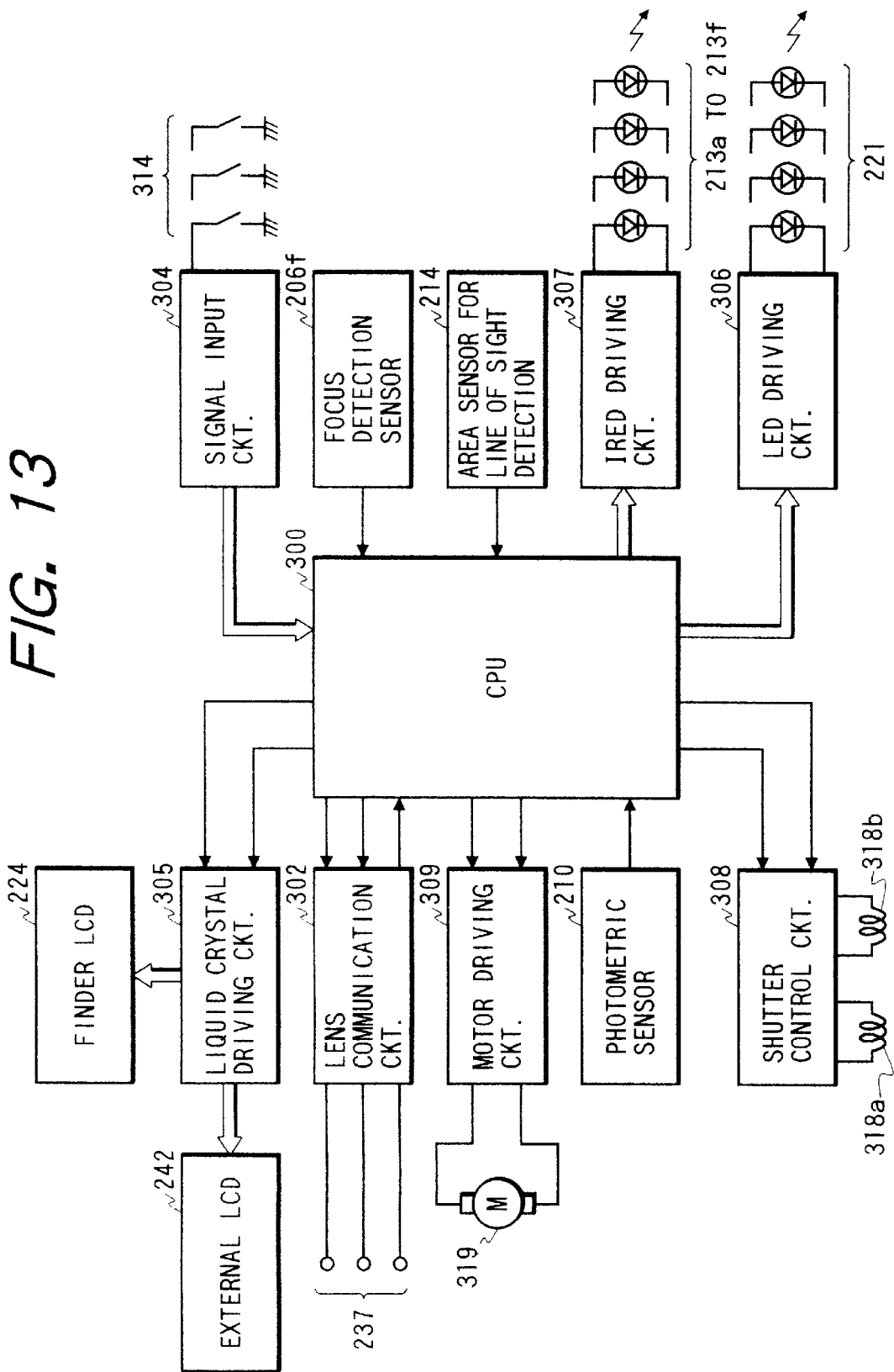
FIG. 13 is a diagram illustrating an electric circuit of a camera according to a fourth embodiment of this invention.

Returning to FIG. 14 again, it shows an aperture 231 set in the photo taking lens, an aperture driving device 232, a motor for driving lens 233, a lens driving member 234 formed by a driving gear, and a photo interrupter 235, which detects the rotation of the pulse plate 236 linked with the lens driving member 234 and conveys it to a focus optical system driving circuit 240. The focus optical system driving circuit 240 drives the lens-driving motor by a predetermined amount on the basis of this information and lens driving amount information sent from the camera to move the photo taking lens 201 to an in-focus position. A mount contact 237 serves as an interface between a known camera and lens. FIG. 13 shows an electric circuit diagram of the camera according to the embodiment of this invention. In this drawing, the same reference characters designate corresponding elements as in FIG. 14.

The microcomputer (hereinafter, CPU) 300 is connected to a line of sight detection area sensor 214, a photometric sensor 210, a focus detection sensor 206f, a signal input circuit 304, an LCD driving circuit 305, an LED driving circuit 306, an IRED driving circuit 307, a shutter control circuit 308, and a motor driving circuit 309.

The line of sight detection means comprises the CPU 300, the line of sight detection area sensor 214, and the IRED driving circuit 307, and the focus detection means comprises the CPU 300 and the focus detection sensor 206f. Communication with the photo taking lens is made through a lens communication circuit 302 and via the mount contact 237 in FIG. 14 with transmitting signals, such as those representing focus adjusting information and aperture control information. Since details of the photometric sensor 210, the shutter control circuit 308, the motor driving circuit 309, and the lens communication circuit 302 are not directly related to this invention, further explanation thereof is omitted here.

The CPU 300 contains a ROM containing a program for controlling camera operations, a RAM for storing variables, and an EEPROM (electrically erasable and programmable read only memory) for storing various parameters, and it serves as a determination range setting means and a selecting means. The line of sight detection area sensor 214 photoelectrically converts a user's eyeball image formed on the sensor plane by a line of sight detection optical system (an eyepiece lens 211 and a receptor lens 212 in FIG. 14) and transmits the electrical signals to the CPU 300. The CPU 300 converts the transmitted electric signals in an A-D conversion and stores their image data in the RAM. The CPU 300 performs signal processing for the image data following a predetermined algorithm stored in the ROM to calculate the user's line of sight.

A signal input circuit 304 is used to report states of various switches 314 on the camera to the camera. The switches 314 includes switches set by the first and second strokes of a release button, which is not shown, and switches for setting various states of the camera. The LED driving circuit 306 controls the above LED for superimposing 221 and the LED for viewfinder illumination 225. The IRED driving circuit 307 controls the IREDs 213a to 213f for line of sight detection. The LCD driving circuit 305 can display an aperture value, a shutter second time, or set photographing mode in an external LCD 242 (not shown) arranged outside the camera and the viewfinder bottom LCD 224 arranged at the bottom of the viewfinder, following instructions from the CPU 300.

Figure 21:
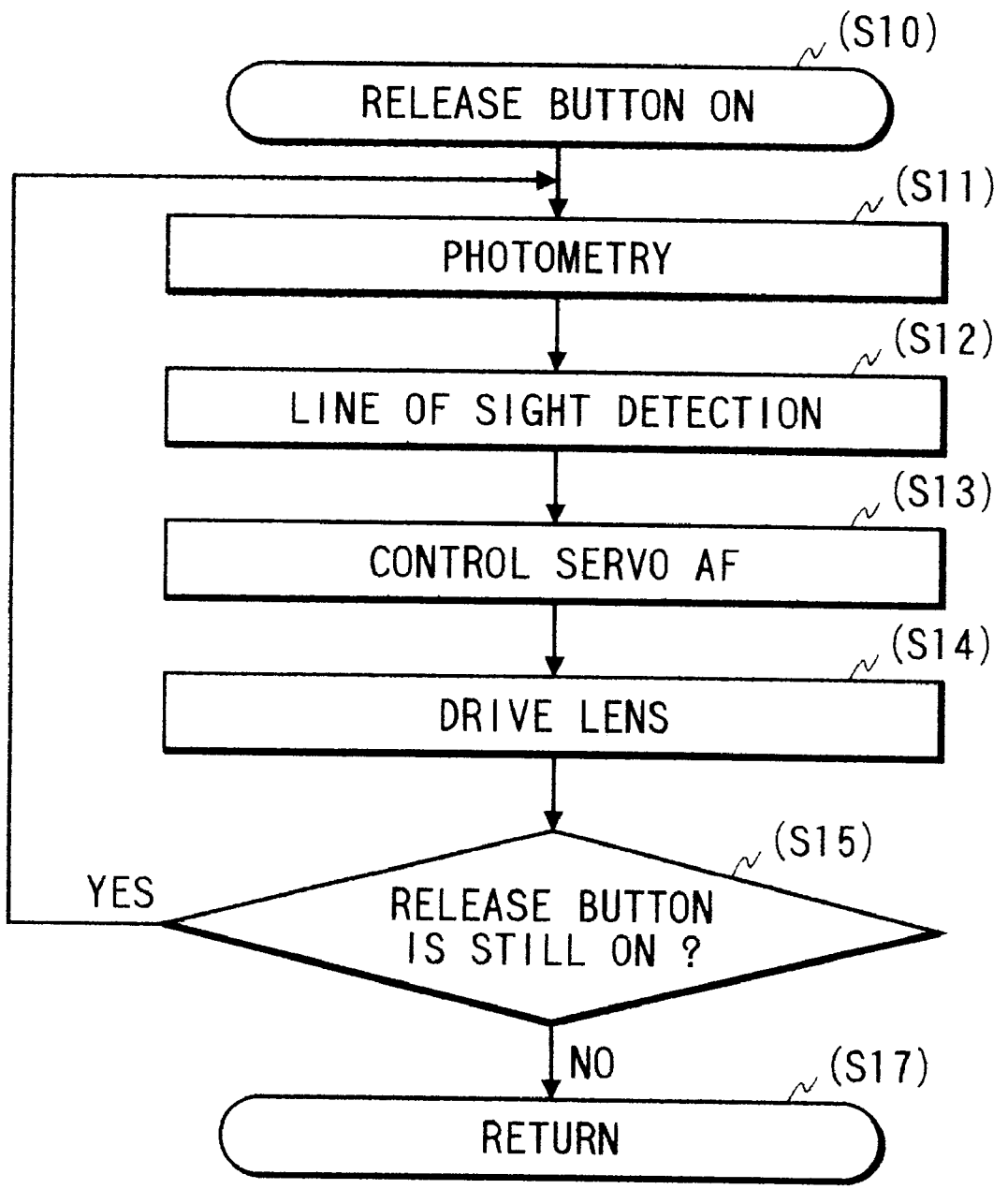
FIG. 21 is a flowchart of the camera in FIGS. 13 and 14.

The operations of the camera comprising the above device according to this embodiment are described below based on flowcharts in FIG. 21 and subsequent drawings.

By turning on the release button, the camera starts a series of operations. After step S10 in FIG. 21, the camera executes a photometric operation in step S11, first.

Then, in step S1, a line of sight detecting operation is executed to detect a user's line of sight. Since a concrete line of sight detecting operation is disclosed in the U.S. application Ser. No. 08/442,570 filed on May 16, 1995 and U.S. Pat. No. 5,402,199 issued on Mar. 28, 1995 by this applicant in detail, a detailed description thereof is omitted, though the operation is roughly performed as described below. A user's eyeball is illuminated by turning on an appropriate IRED out of the IREDs 213a to 213f by using the IRED driving circuit 307. In this state, an accumulation is made for the line of sight detection area sensor 214 for a predetermined time. After the accumulation, the IRED is turned off, and the CPU 300 sequentially receives eyeball image signals from the sensor 214, performs A-D conversion for the signals, and stores them in the RAM. After that, the eyeball image signals stored in the RAM are processed in a known method to detect a user's eyeball rotation angle. By using the detected eyeball rotation angle and individual difference correction data stored in the storing means EEPROM, individual differences are corrected, and then a user's line of sight, in other words, line of sight coordinates on the viewfinder are calculated.

After the line of sight information is obtained or even if a line of sight detection results in failure, a "servo AF control" subroutine for controlling a servo AF is executed by selecting one focus detection area out of a plurality of focus detection areas of a multi-point AF in the next step, S13. If a driving amount of a photo taking lens is selected in the "servo AF control" subroutine, the lens driving is executed in the next step, S14, though the "servo AF control" subroutine is described in detail later.

In the next step, S15, a state of the release button of the camera is detected. If it is still on, the control branches to the step S11 to repeat the operation from the step S11 again. If it is already changed to an off state, a servo AF operation is terminated in step S17.

Figure 22:
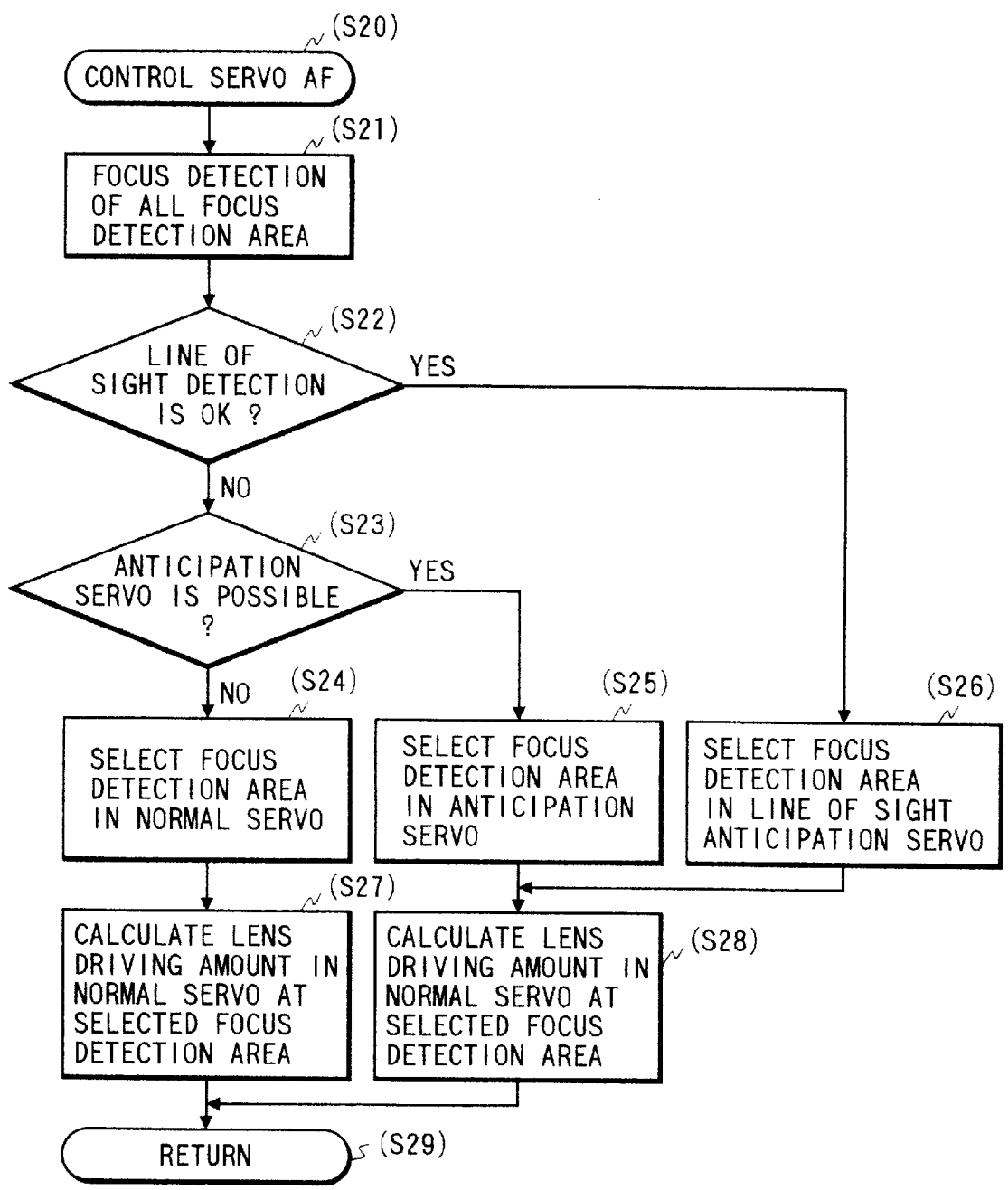
FIG. 22 is a flowchart of the camera in FIGS. 13 and 14.

FIG. 22 is a flowchart of the "servo AF operation" subroutine for controlling the servo AF operation. If this subroutine is called in step S13 in FIG. 21, focus detection of three focus detection areas of this invention is executed in step S21 through step S20. A concrete method of focus detection is disclosed in U.S. Pat. No. 5,189,465 issued on Feb. 23, 1993 or U.S. Pat. No. 5,126,777 issued on Jun. 30, 1992 in further detail by this applicant, therefore, a detailed explanation is omitted here. In the next step, S22, it is determined whether or not the line of sight detection in the step S12 has succeeded. If the line of sight detection results in failure, it is determined whether or not an anticipation servo control is possible in step S23.

Figure 19:
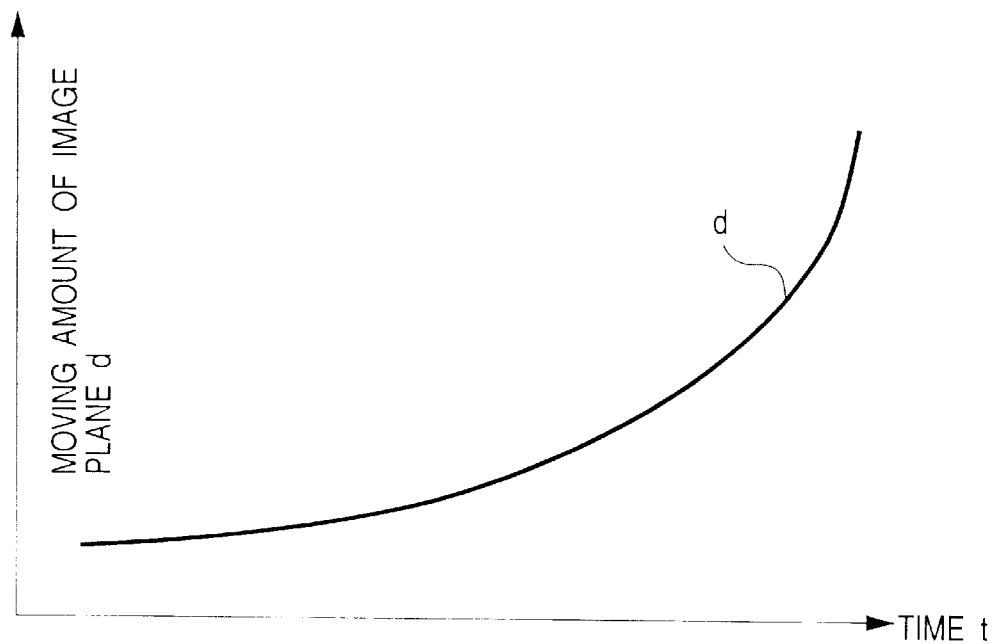
FIG. 19 is a description diagram of a moving amount of an image plane of an object.

As described in U.S. Pat. No. 5,012,267 issued on Apr. 30, 1991, an anticipation servo AF of this invention is a method of driving a lens by anticipating a future moving amount of an image plane of an object on the basis of continuous focus states at a plurality of times in the past. For example, a moving amount of an image plane of an approaching object is represented by a curve d as shown in FIG. 19. Accordingly, in a case of the first focus detection after setting the release button or of focus detection disabled in the past, information is not enough to anticipate future changes of the moving amount of image plane, and an anticipation servo cannot be executed. Its determination is performed in step S23. Then, if it is determined that the anticipation servo cannot be executed in the step S23, processing proceeds to step S24 to execute a "focus detection area selection in normal mode" subroutine. If it is determined that the anticipation servo can be executed, processing proceeds to step S25 to execute a "focus detection area selection in anticipation mode" subroutine.

If the line of sight detection succeeds in the step S22 so that a user's line of sight can be obtained, a "focus detection area selection in line of sight anticipation mode" subroutine is executed to execute a servo AF by using the line of sight information. A further explanation will be made later for the subroutines for selecting a focus detection area in the servo AF, "focus detection area selection in normal mode", "focus detection area selection in anticipation mode", and "distance measuring point selection in line of sight anticipation mode", except the following. If a focus detection area is selected in each subroutine, a driving amount of the photo taking lens is calculated on the basis of the focus information of the focus detection area selected the steps S27 or S28. Particularly, in an anticipation servo in the step S28, it is required to calculate a lens driving amount by anticipating a future movement of the object based on focus information at a plurality of times in the past. The specific contents of this calculation are described in U.S. Pat. No. 5,012,267 issued on Apr. 30, 1991 in detail.

Figure 23:
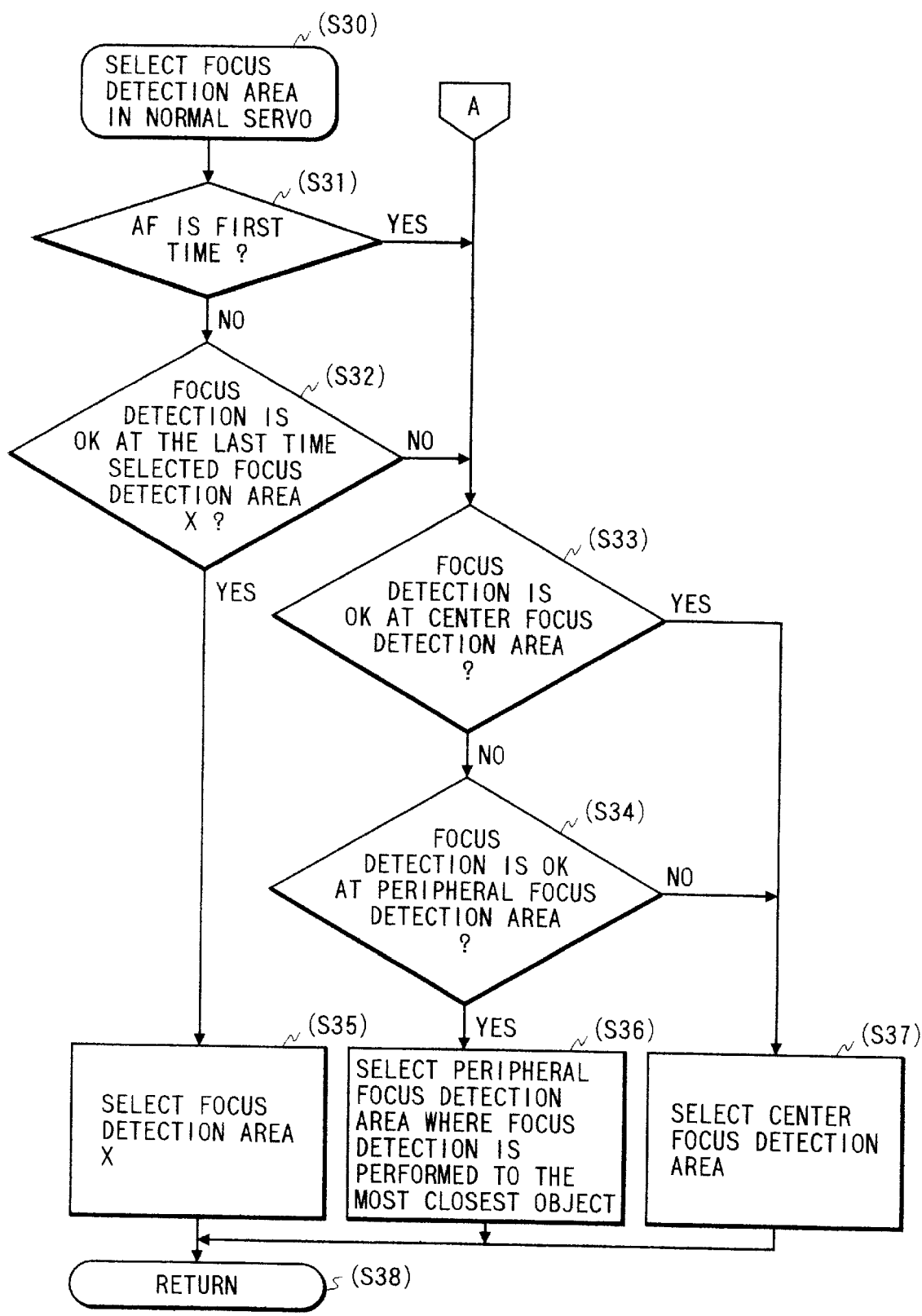
FIG. 23 is a flowchart of the camera in FIGS. 13 and 14.

When the calculation of a lens driving amount is terminated in the step S27 or S28, the "servo AF control" subroutine is terminated in step S29. FIG. 23 shows a flowchart of the "focus detection area selection in normal mode" subroutine. After processing in step S30, it is determined whether or not the AF is the first time operation in step S31. If it is not the first time operation, it is determined whether or not the current focus detection is OK (focus detection possible) at the selected focus detection area X at the last time in step S32. This determination is performed on the basis of contrast of a image signals or a correlation amount obtained in a correlative calculation process in a phase difference detection method. If the focus detection is OK at the focus detection area X at this time, the selected focus detection area at this time is selected as focus detection area X.

If it is determined that the AF is the first operation in the step S31 or that the current focus detection is not OK at the focus detection area X at the last time in the step S32, there is no source for selecting a focus detection area at this time, and therefore, the most appropriate focus detection area is selected as a servo AF in the flow from step S33. In other words, if focus detection is OK at the center focus detection area in step S33, processing proceeds to step S37 to select the center focus detection area. If a focus cannot be detected at the center focus detection area, it is determined whether or not focus detection is OK at two peripheral focus detection areas other than the center focus detection area in step S34. If a focus cannot be detected also at the peripheral focus detection areas, the center focus detection area is selected in the step S37 since there is no other selecting method. If focus detection is OK at the peripheral focus detection areas, processing proceeds to step S36 to select a focus detection area where the focus detection is performed to the closest object out of the peripheral distance measuring points at which the focus detection is OK as a selected focus detection area. To select it, select a focus detection area whose detected defocus amount is at the hindmost pin out of the focus detection areas.

The above focus detection area selection in the normal mode can be summarized briefly as follows:

(1) If the current focus detection is OK at the focus detection area selected at the last time, the focus detection area is selected also at this time.
(2) If the focus detection area selected at the last time cannot be selected at this time, a center focus detection area having the highest probability that the main object exists is selected.
(3) If the center focus detection area cannot be selected, a focus detection area where the closest object exists is selected.
(4) If a focus cannot be detected at no focus detection area at this time, a center focus detection area is selected.

Figure 24:
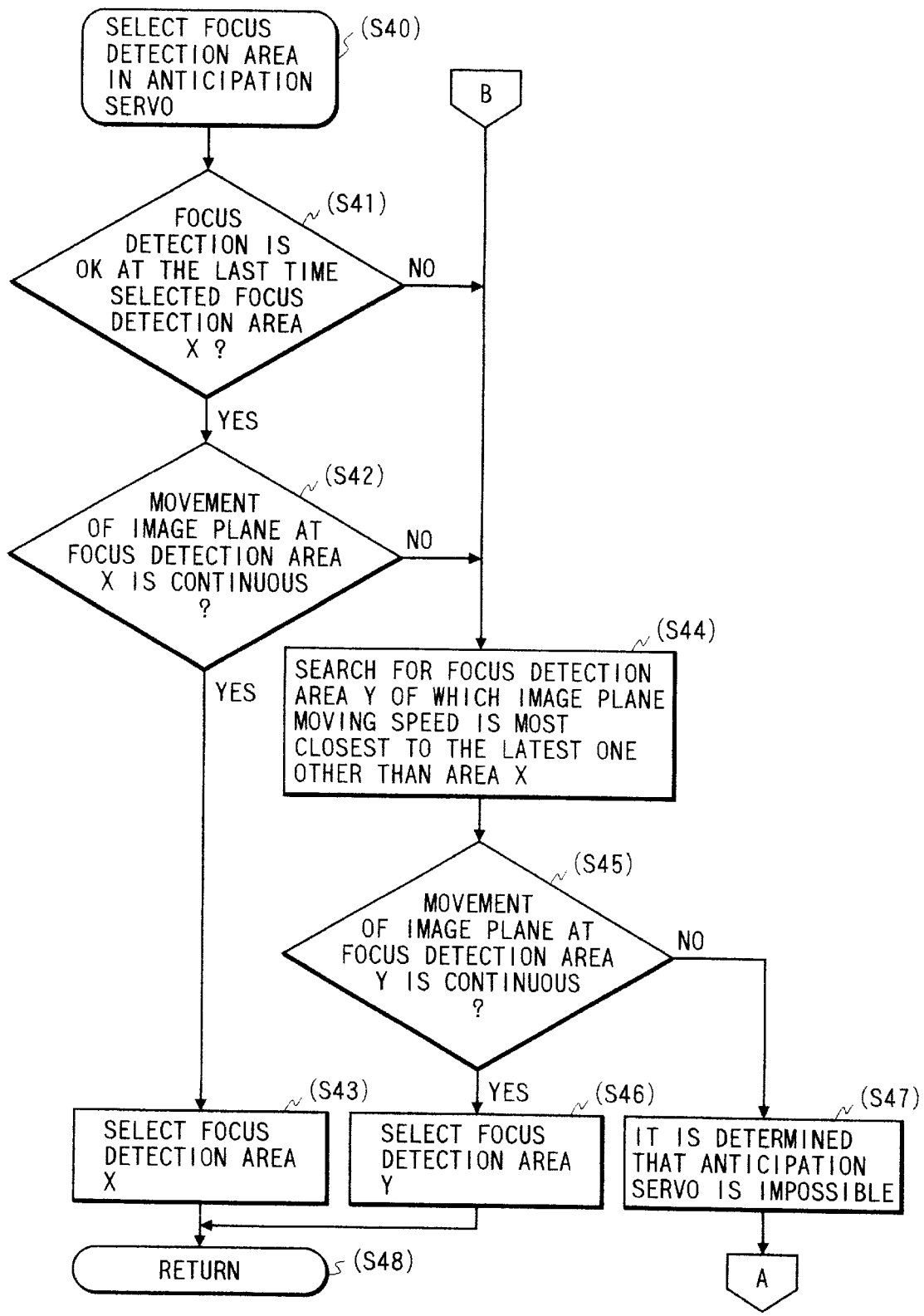
FIG. 24 is a flowchart of the camera in FIGS. 13 and 14.

Next, the "focus detection area selection in anticipation mode" subroutine is described by using a flowchart in FIG. 24. After processing in step S40, the current focus detection state of the focus detection area X selected at the last time is determined in the same manner as for the "focus detection area selection in the normal mode" in step S41. If the current focus detection is OK at a peripheral focus detection area X, the continuity of a moving amount of an image plane at the focus detection area X is determined in the next step, S42. The continuity of the moving amount of an image plane will be described below. For a dynamic object, its moving amount of an image plane changes smoothly as shown by curve d in FIG. 19. The moving speed of an image plane is a moving amount per unit time, in other words, the inclination of this curve. If the same object is kept at a single focus detection area in the focus detection, the moving amount of an image plane observed at the focus detection area draws a smooth curve like the curve d in FIG. 19.

Figure 18A:
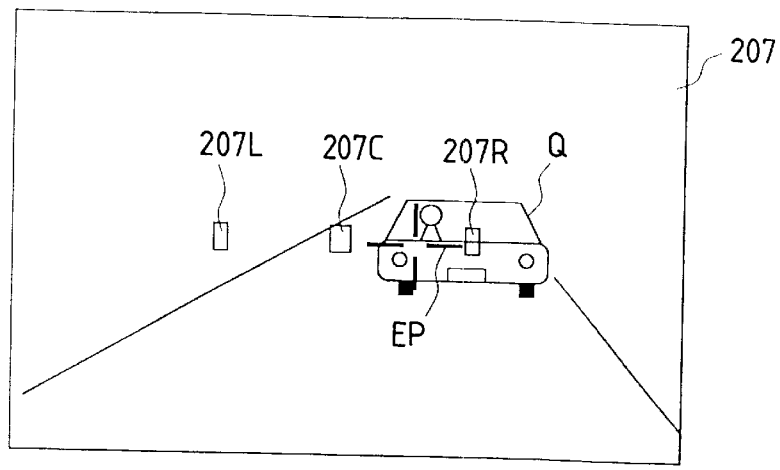
FIGS. 18A to 18C illustrate sample visual fields of a viewfinder.
Figure 18B:
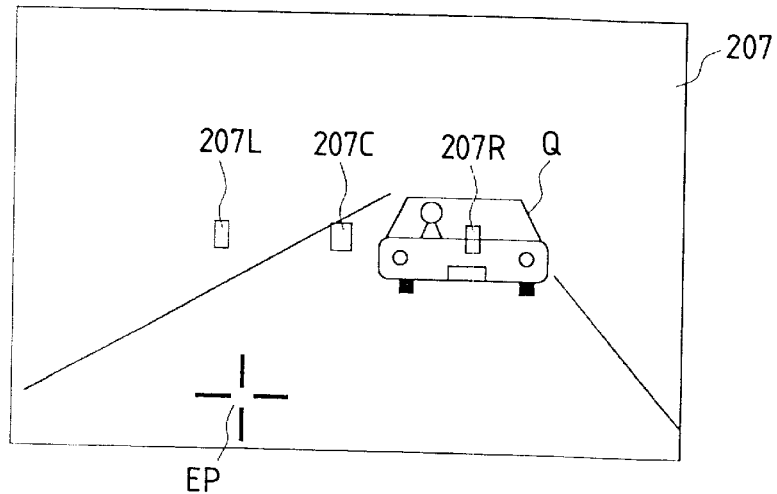
Figure 20:
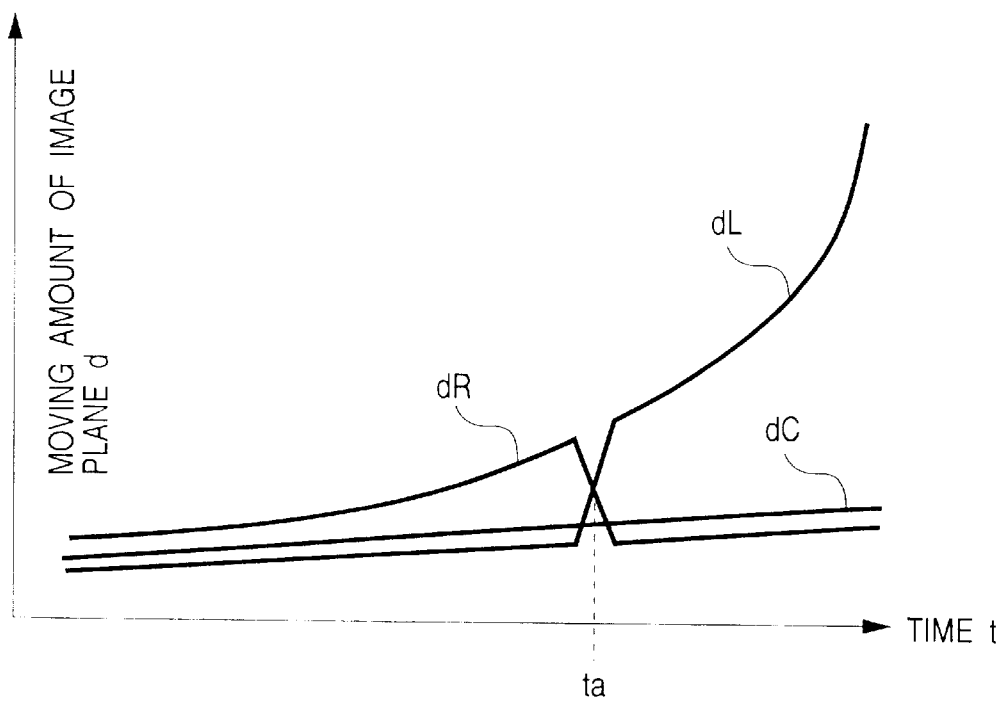
FIG. 20 is a description diagram of a moving amount of an image plane of an object.

If the same object moves between a plurality of focus detection areas, the moving amount of an image plane draws a discontinuous curve. The condition is typically shown in FIGS. 18A and 18B. FIG. 18A shows a condition that an object Q (for example, a car) is caught at a right focus detection area 207R in a viewfinder and a background is caught at a center focus detection area 207C and a left focus detection area 207L. Then, it is assumed that the position of the object Q shifts from the right focus detection area 207R to the left focus detection area 207L at time ta as shown in FIG. 18B after continuing AF in the above state. A change of the moving amount of an image plane observed at each focus detection area in this condition is shown in FIG. 20. Curves dR, dC, and dL represent moving amounts of an image plane observed at the right, center, and left focus detection areas, respectively. Until time ta, only the curve dR shows a smooth increase monotonically, since the object Q is caught at only the right focus detection area. The moving amounts of an image plane dC and dL are not changed almost at all since a background, such as a road, is caught at the center and left focus detection areas.

When the object Q shifts from the right focus detection area to the left focus detection area at time ta, the moving amounts of an image plane dR and dL are changed as shown in FIG. 20 from the time ta, and the moving amount of an image plane of the object Q is exchanged from dR before the time ta to dL after the time ta. In step S42, the continuity of the moving amount of an image plane is determined. Concretely, the moving speed of an image plane at the last time focus detection area which is selected is compared with the moving speed of an image plane at a focus detection area which is a candidate at this time, and it is determined that there is the continuity if they are not so much changed. Since the focus detecting operation is executed at predetermined time intervals actually, the moving speed of an image plane $v(i)$ at time $t(i)$ is as follows, where $d(i)$ is a moving amount of an image plane at discrete time $t(i)$:

$$v(i)=[d(i)-d(i-1)]/[t(i)-t(i-1)]$$

As for a determination of a change on the continuity, it is determined that there is the continuity if the following is satisfied, paying attention to a difference of the speed:

$$|v(i)-v(i-1)|<vth$$

Or paying attention to ratio of the speed, if the following satisfied, it can be also determined that there is the continuity.

$$vthr1<v(i)/v(i-1)<vthr2$$

In either case, it is assumed that the object to be observed is dynamic, and therefore, it is desirable to pay attention to the moving speed rather than the moving amount of an image plane itself.

In FIG. 20, before time ta, the last time focus detection area which is selected is a right focus detection area with its moving amount of an image plane, dR, and a focus detection area which is a candidate at this time is the right focus detection area in the same manner as for the last time, and therefore, the last time moving speed of an image plane is not so much changed up to the current moving speed of the image plane and it is determined that there is the continuity. When the continuity is determined around the time ta, however, the last time focus detection area which is selected is a right focus detection area with its moving amount of an image plane, dR, and a focus detection area which is a candidate at this time is the left focus detection area, and therefore, the moving amount of the image plane is significantly changed and it is determined that there is no continuity in this case.

Returning to FIG. 23, if it is determined that there is the continuity at the focus detection area X (the right focus detection area in FIG. 20), for example, like the condition before the time ta in FIG. 20, the focus detection area X is selected as the currently selected focus detection area step S43. If it is determined that a focus cannot be detected at the focus detection area X in step S41 or that there is no continuity at the focus detection area X in step S42, the focus detection area X cannot be currently selected and therefore processing proceeds to step S44 to search for a focus detection area that the last time focus detection area which is selected and the current moving speed are closest to the above determination standard of the continuity from a viewpoint of the continuity of the moving amount of the image plane. Concretely, a focus detection area Y is searched for satisfying conditions that $|vY(i)-vX(i-1)|$ is the smallest or that $vY(i)/vX(i-1)$ is closest to 1 out of the focus detection areas other than the focus detection area X, where $vX(i-1)$ indicates the last time moving speed of the image plane of the last time focus detection area X and $vY(i)$ indicates the current moving speed of the image plane of a focus detection area Y.

In the example in FIG. 20, although the moving amount of the image plane dR at the right focus detection area is discontinuous at the time ta, the moving amount of the image plane dL at the left focus detection area is continuous from dR after the time ta. In step S44, the focus detection area can be searched for. The continuity is determined for the focus detection area Y searched for as described above in step S45 in the same manner as for the step S42. A difference between this step and the step S42 is that a different focus detection area is used for comparison. It is determined that there is the continuity if the following expression is satisfied:

$$|vY(i)-vX(i-1)|<vth$$

or the following expression is satisfied:

$$vthr1<vY(i)/vX(i-1)<vthr2$$

If it is determined that there is continuity at the focus detection area Y in the step S45, the current focus detection area is selected in step S46. If the current focus detection area is selected in the step S43 or the step S46, the "focus detection area selection in the anticipation mode" subroutine is terminated in step S48. If a new focus detection area cannot be detected from the viewpoint of the continuity of the moving amount of the image plane in the step S45, the anticipation servo is determined to be disabled in step S47, the control branches to the step S33 in the flowchart of the "focus detection area selection in the normal mode" subroutine in FIG. 24 after passing through terminal A to select a focus detection area in a mode other than the anticipation mode. The above focus detection area selection in the anticipation mode can be summarized briefly as follows:

(1) If the current focus detection is OK at the focus detection area selected at the last time and the moving amount of the image plane has the continuity, the focus detection area is selected at this time, too.

(2) If the focus detection area selected at the last time cannot be selected at this time, a focus detection area having the continuity of the moving amount of the image plane is selected.

(3) If a focus detection area having the continuity of the moving amount of the image plane cannot be detected at this time, the anticipation mode is determined to be disabled and an appropriate focus detection area is selected in the normal mode.

Actually, however, some continuity of the moving amount of an image plane is observed in some cases at focus detection areas other than the focus detection area where the main object exists, and therefore, the focus cannot be changed to the most suitable focus detection area only with changes of the moving speed of an image plane always conveniently. In these cases, it is effective to support the focus detection area selection based on the line of sight information.

Figure 17A:
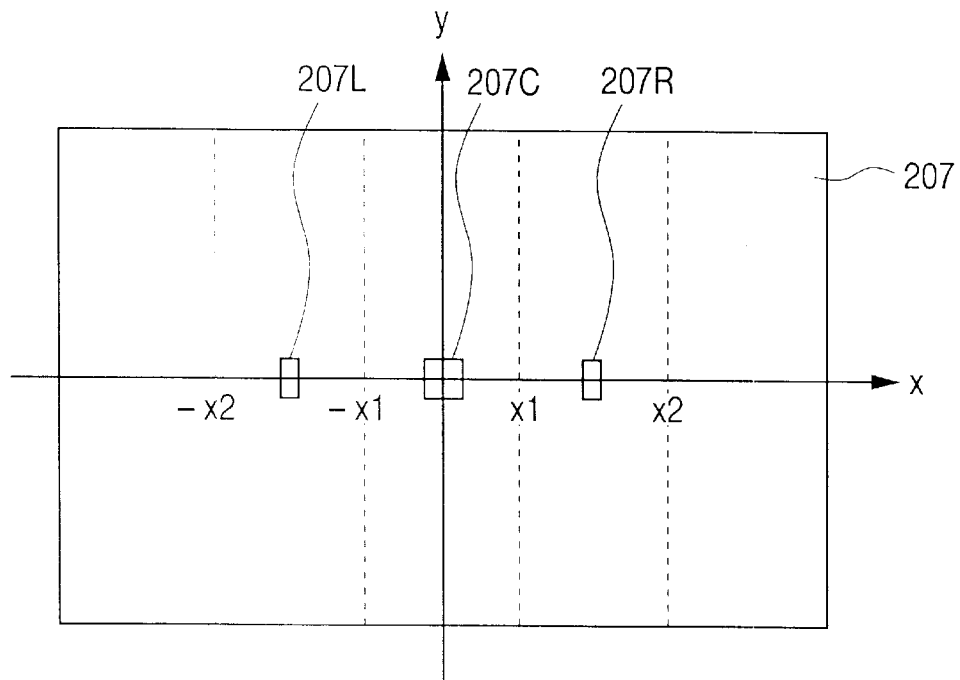
FIGS. 17A and 17B are description diagrams for a relationship between a focus detection area and line of sight coordinates.
Figure 25:
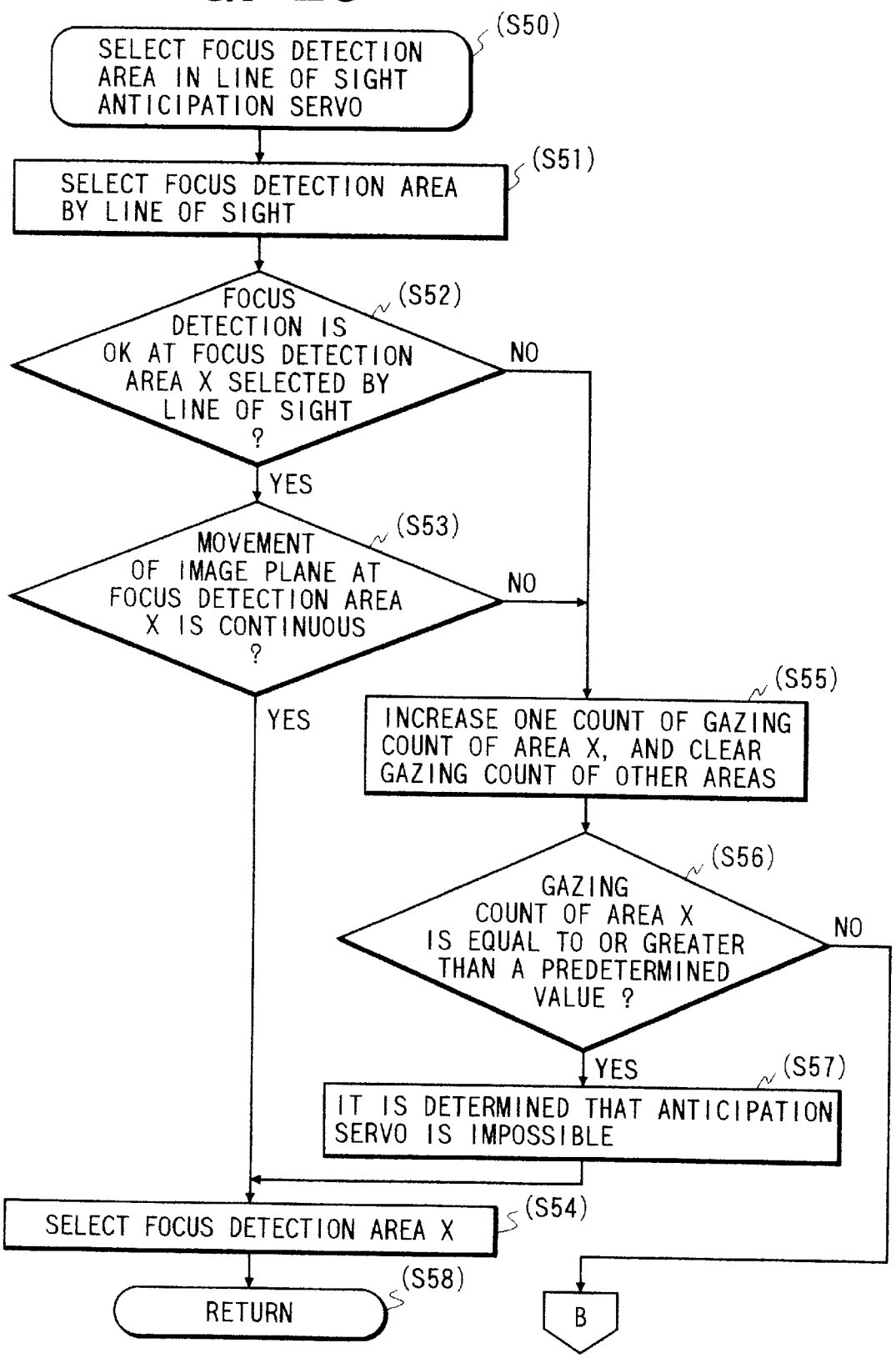
FIG. 25 is a flowchart of the camera in FIGS. 13 and 14.

The "focus detection area selection in the line of sight anticipation mode" subroutine is described by using a flowchart in FIG. 25. After processing in step S50, the "focus detection area selection by a line of sight" subroutine is executed in step S51. Although a focus detection area is selected based on coordinates of a line of sight position in this subroutine, a selection method is not identical between the first line of sight detection and the second or after line of sight detection in this invention. By using FIGS. 17A and 17B, the difference is described below. FIG. 17A shows the correspondence between the coordinates of the line of sight position on the viewfinder at the first line of sight detection and a focus detection area selected based on the coordinates. Three focus detection areas 207L, 207C, and 207R are arranged at predetermined intervals on the viewfinder. The focus detection area is selected as follows. Assuming that (x, y) is coordinates of the detected line of sight on the viewfinder:

If $-x1 \leq x \leq x1$ is satisfied, the center focus detection area 207C is selected.

If $-x2 \leq x \leq -x1$ is satisfied, the left focus detection area 207L is selected.

If $x1 \leq x \leq x2$ is satisfied, the right focus detection area 207R is selected. For this selection, only an x-axis coordinate in the horizontal direction of the line of sight is used. At the first selection, a focus detection area must be selected based on the line of sight and the focus detection areas are arranged in the horizontal direction, and therefore, it is selected by using only the x-axis coordinate of the coordinates of the line of sight position. Coordinates x1 and x2 are set so as to divide intervals between three focus detection areas equally. In addition, the range exceeding x2 or -x2 in the x coordinate is considered as a range where any focus detection area cannot be selected. On the other hand, if there is no range where any focus detection area cannot be selected without considering x2 in the x coordinate, the focus detection areas are set as follows:

If $-x1 \leq x \leq x1$ is satisfied, the center focus detection area 207C is selected.

If $x \leq -x1$ is satisfied, the left focus detection area 207L is selected.

If $x1 \leq x$ is satisfied, the right focus detection area 207R is selected.

Figure 17B:
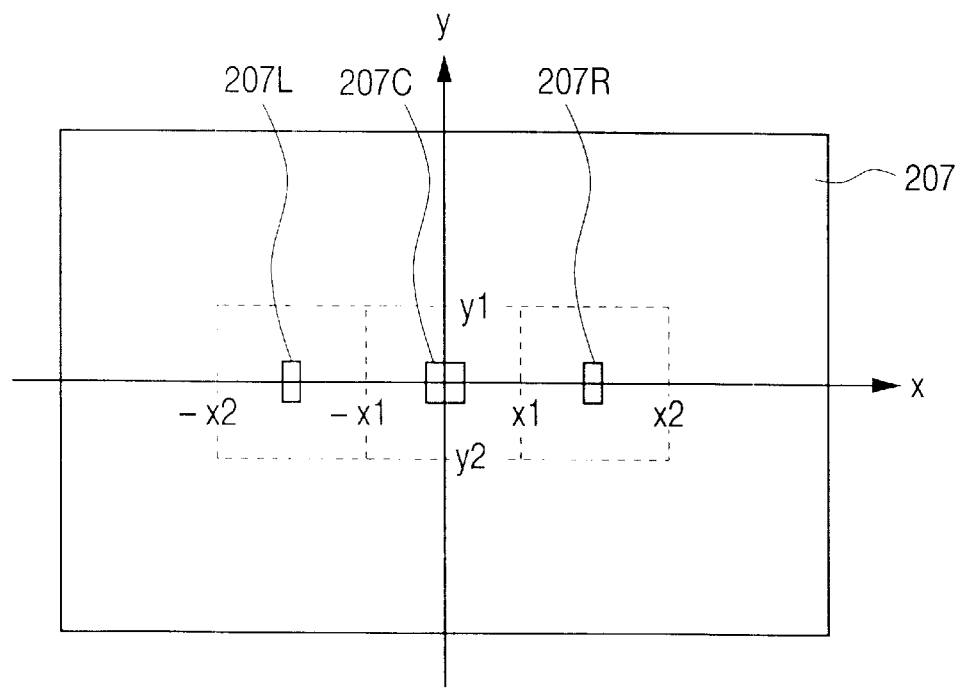

Next a selection method of the second or after line of sight detection is described below. FIG. 17B shows the correspondence between coordinates of the line of sight position on the viewfinder of the second or after line of sight detection and a focus detection area selected based on the coordinates. For the second or after line of sight detection, a focus detection area is selected as follows:

If $-x1 \leq x \leq x1$ and $-y1 \leq y \leq y1$ are satisfied, the center focus detection area 207C is selected.

If $-x2 \leq x \leq -x1$ and $-y1 \leq y \leq y1$ are satisfied, the left focus detection area 207L is selected.

If $x1 \leq x \leq x2$ and $-y1 \leq y \leq y1$ are satisfied, the right focus detection area 207R is selected.

In other words, if an absolute value of coordinate y in the vertical direction exceeds y1, it is considered that the user is not gazing at a focus detection area and a selection of a focus detection area by a line of sight is not performed.

Figure 26:
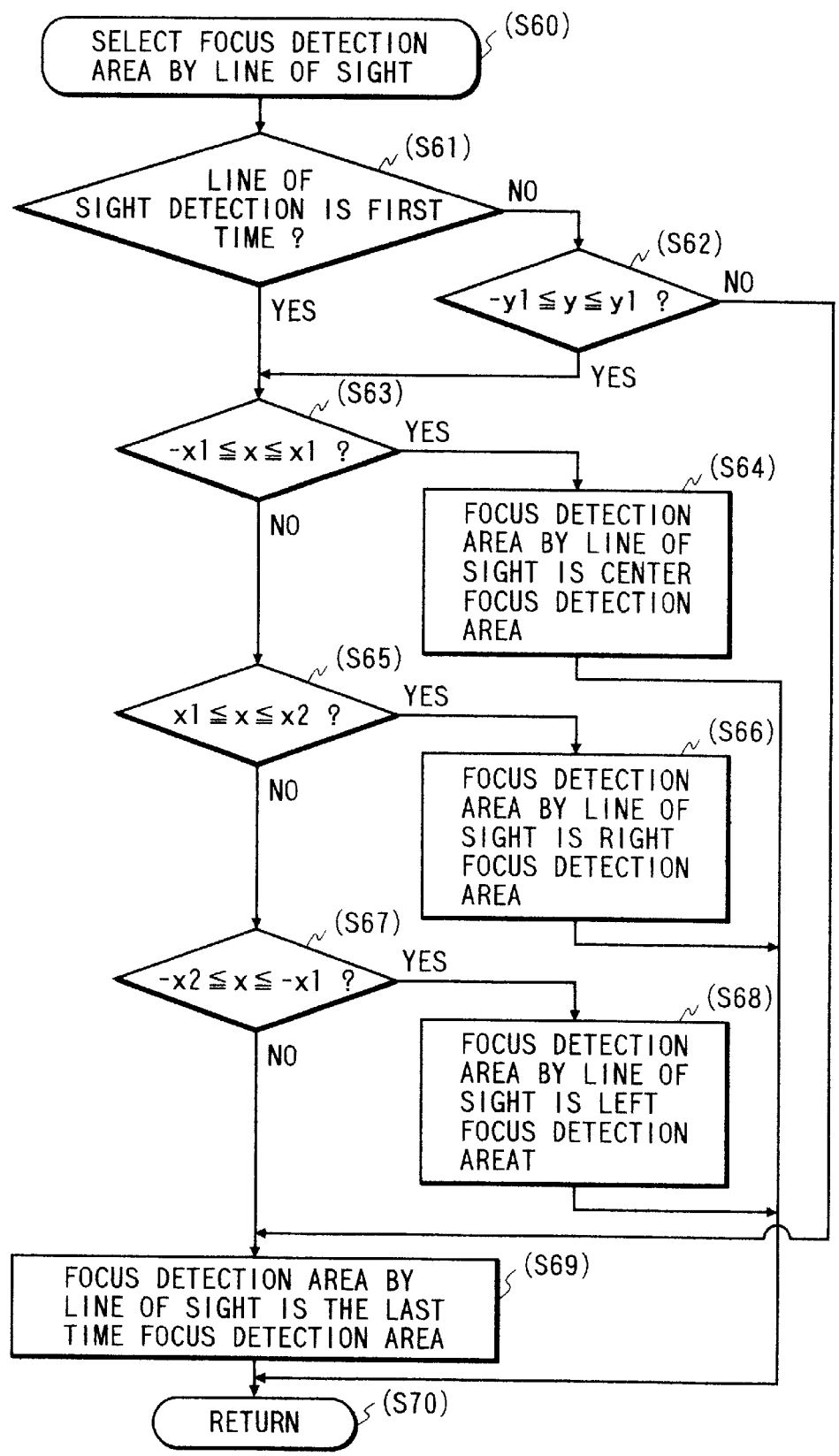
FIG. 26 is a flowchart of the camera in FIGS. 13 and 14.

A flowchart of the "focus detection area selection by a line of sight" subroutine is shown in FIG. 26, for selecting a focus detection area as described above. After processing in step S60, it is determined whether or not the line of sight detection is the first detection in step S61. If it is not the first detection, coordinate y in the vertical direction is checked in step S62. If the absolute value in the y coordinate exceeds coordinate y1, it is considered that the observer is not gazing at a focus detection area and a focus detection area is not newly changed on the basis of the current result of the line of sight. Then, processing proceeds to step S69 to select the last time focus detection area as the current focus detection area and this subroutine is returned in the next step S70.

If the absolute value in the y coordinate of the line of sight is within coordinate y1 in step S62, it is considered that the observer is gazing at a focus detection area and the x coordinate is checked in steps S63, S65, and S67. If the x coordinate is within a predetermined range, a focus detection area is selected in steps S64, S66, and S68 and this subroutine is returned in step S70. If the x coordinate is not within any range, it is considered that the observer is not gazing at a focus detection area and a focus detection area is not newly changed on the basis of the current result of the line of sight. Then, processing proceeds to step S69 to select the last time focus detection area as the current focus detection area and this subroutine is returned in the next step S70.

Figure 27:
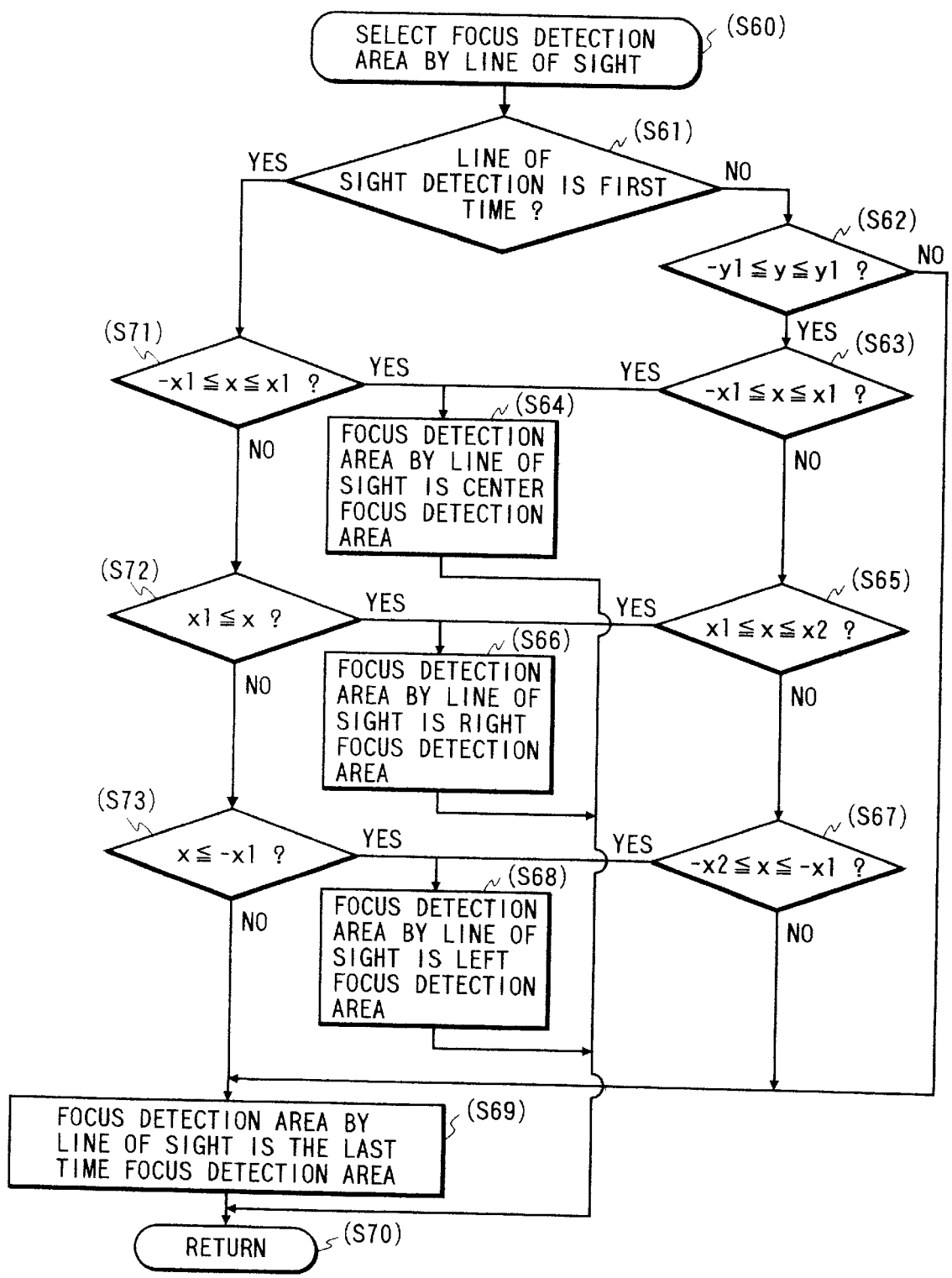
FIG. 27 is a flowchart of the camera in FIGS. 13 and 14.

In addition, an explanation is made for a flowchart of processing in which there is no range where a focus detection area cannot be selected at the first line of sight detection in FIG. 27. In FIG. 27, the same reference characters designate corresponding steps as for the flowchart of FIG. 26, and their description is omitted. It is determined whether or not the line of sight detection is the first detection in step S61. If it is the first detection, the x coordinate is checked in steps S71, S72, and S73. If the x coordinate is within a predetermined range, a focus detection area is selected in steps S64, S66, and S68. If it is not the first detection, x and y coordinates are checked and a focus detection area is selected in the same manner as for the flowchart in FIG. 26.

As described above, if a focus detection area is selected based on the result of the line of sight, the control returns to the flowchart in FIG. 25 to determine a focus detection state of a focus detection area X currently selected by a line of sight in the next step S52. This focus detection area X is a focus detection area closest to the coordinates of a user's line of sight position on the viewfinder. If the current focus detection is OK at a focus detection area X, the continuity of the moving amount of an image plane at the focus detection area X is determined in the next step S53 in the same manner as for the step S42 of the "focus detection area selection in the anticipation mode" subroutine.

If it is determined that the movement at the focus detection area X is continuous, the focus detection area X is selected as the current focus detection area. If it is determined that a focus cannot be detected at the focus detection area X in the step S52 or that the movement at the focus detection area X is not continuous in the step S53, processing proceeds to step S55. In the step S55, the "gazing count" of the focus detection area X is incremented by one. At the same time, the "gazing count" of the focus detection areas other than the focus detection area X is cleared. The "gazing count" prepared for each focus detection area indicates how many times the user has gazed at the focus detection area continuously.

Then, it is examined whether or not the gazing count at focus detection area X reaches a predetermined value or greater in the next step. If it is the predetermined value or greater, processing proceeds to step S57 to consider the anticipation mode disabled and then a focus detection area X is selected in step S54. Although the focus detection area X cannot be selected currently by a determination based on the focus detection information, the focus detection area is selected even by treating the anticipation mode to be disabled, with respecting a fact that the user is gazing at the focus detection area at many times.

In step S56, if the gazing count at the focus detection area X is less than the predetermined value, the control branches to step S44 of the "focus detection area selection in the anticipation mode" subroutine through a terminal B to execute a focus detection area selection which is not based on a line of sight.

The above focus detection area selection in the line of sight anticipation mode can be summarized briefly as follows:

(1) A "focus detection area by a line of sight" is selected based on a result of a line of sight.

If it is determined that a user is not gazing at a focus detection area from his or her line of sight, the last time focus detection area is considered as a selected focus detection area. The determination of gazing at a focus detection area is different between the first line of sight detection and the second or after line of sight detection; a severer standard is used for the second or after line of sight detection.

(2) If the current focus detection is OK at a focus detection area by a line of sight and the moving amount of an image plane is continuous, the focus detection area is currently selected, too.

(3) If a focus detection area by a line of sight cannot be selected currently, a focus detection area where the moving amount of an image plane is selected.

(4) If a user is gazing at an identical focus detection area repeatedly, it is considered that the main object is changed, and therefore, the focus detection area is selected and the anticipation mode is disabled.

Figure 18C:
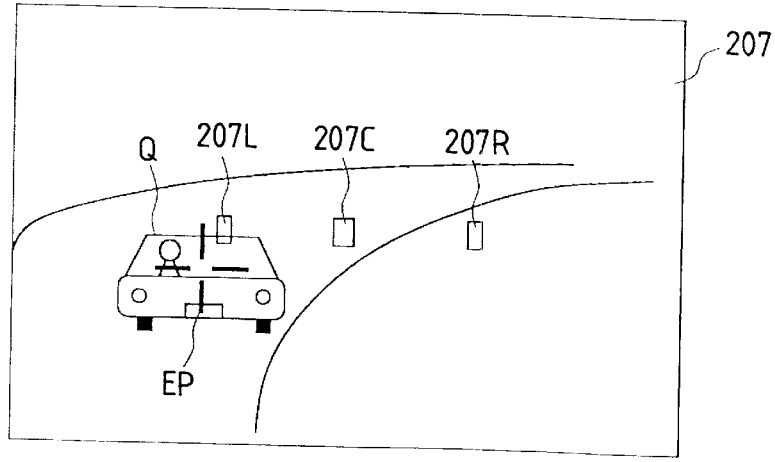

By these controls, a servo AF can be continued by changing a focus detection area for adjusting a focus appropriately even if the main object Q moves on the screen during the servo AF or a user's line of sight shifts significantly on the screen as shown in FIGS. 18A to 18C. Mark EP in FIGS. 18A to 18C represents coordinates of a user's line of sight position on the screen. In FIG. 18A, the user is gazing at an object Q and a right focus detection area is selected based on his or her line of sight to execute a servo AF. Even if the user's line of sight shifts to a range other than the object Q and three focus detection areas as shown in FIG. 18B, the focus detection area is not changed since coordinates in the vertical direction are not appropriate. Assuming that the object Q moves to the left on the screen in FIG. 18C, if the moving amount of an image plane changes smoothly as shown in FIG. 19, the focus detection area can be changed to the left focus detection area only with focus information as described in the explanation of "the focus detection area selection in the anticipation servo" subroutine, but an actually observed moving amount of an image plane includes an error considerably, so that it is often changed incorrectly.

In this case, if the user is gazing at the main object with his or her line of sight as shown by the mark EP in FIG. 18C, the focus detection area can be switched to the left focus detection area following the above control. Although the focus detection system of this embodiment is an example of a phase difference detection method in which it is possible to detect focuses of three areas in the screen shown in FIG. 15, it is apparent that this invention is not limited to this focus detection method and an essence of this invention is the same also in a form having three or more focus detecting areas in both sides, a form having focus detecting areas also in the vertical direction on the screen, or a contrast detection method used as a focus detection method.

Figure 28:
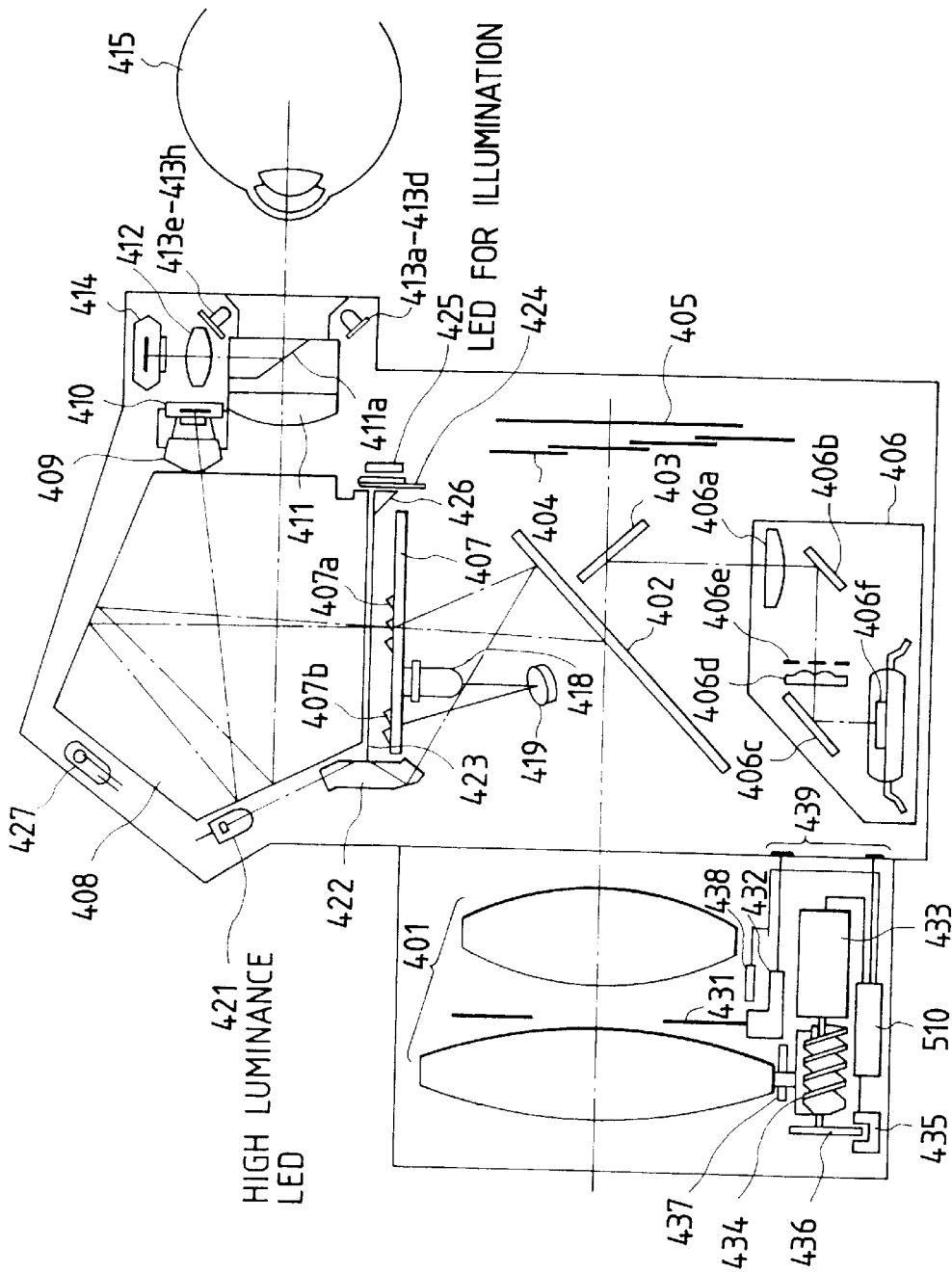
FIG. 28 is a configuration diagram of a main portion illustrating the first embodiment when this invention is applied to a single lens reflex camera.
Figure 29:
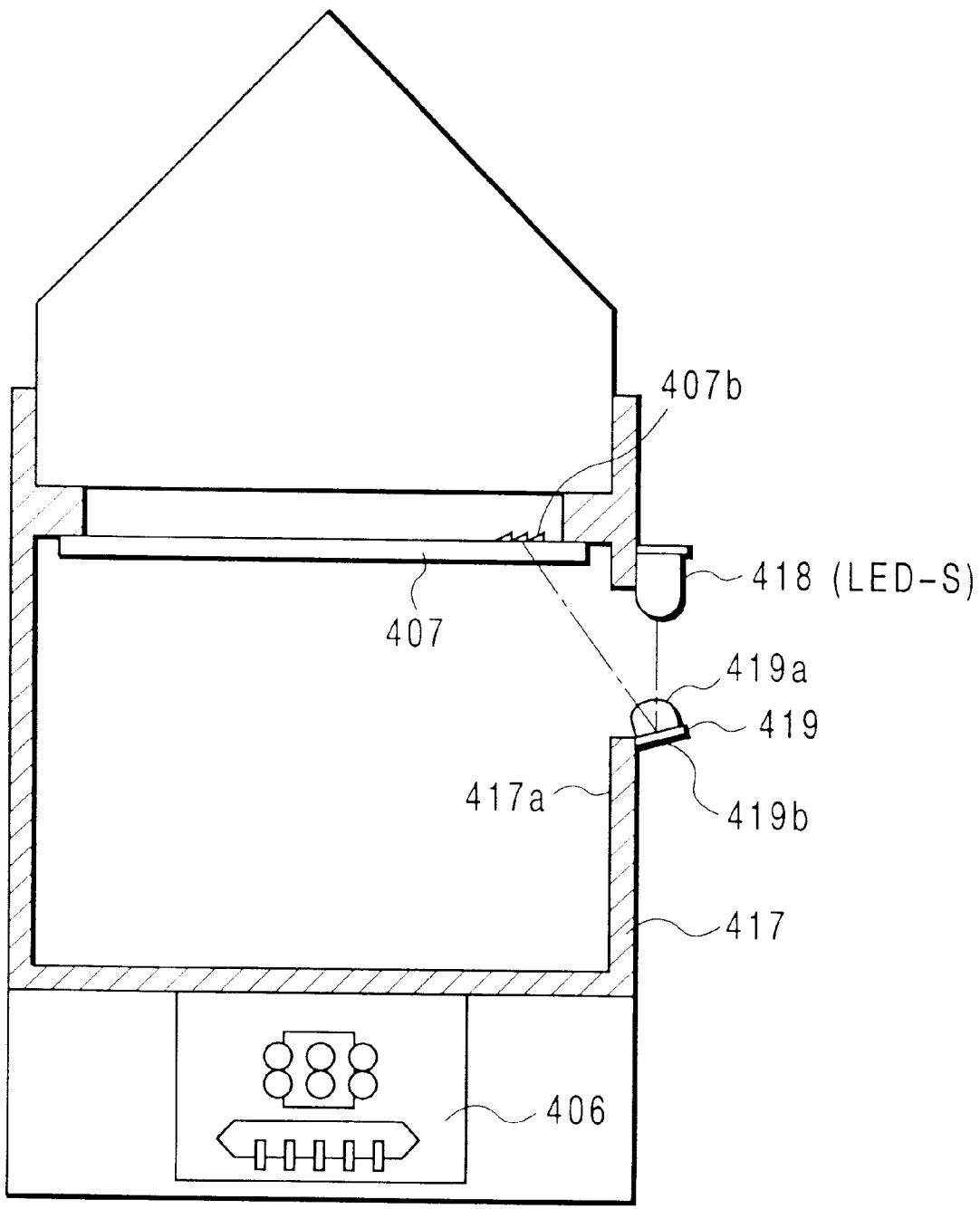
FIG. 29 is a section diagram viewed from behind of the camera in FIG. 28.
Figure 30:
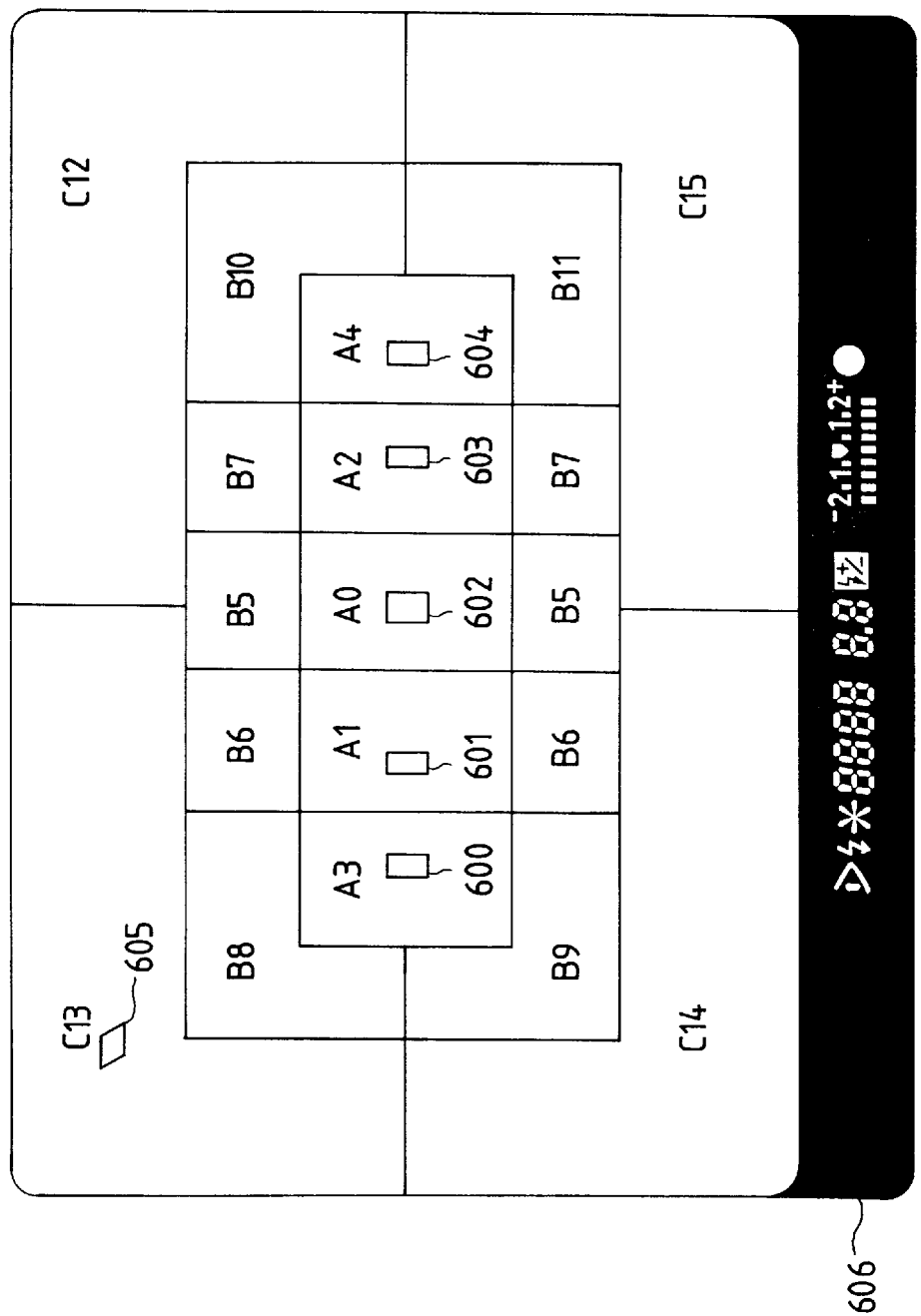
FIG. 30 is a diagram illustrating a visual field of a viewfinder of the camera in FIG. 28.

FIG. 28 is a main portion configuration diagram illustrating the fifth embodiment to which this invention is applied to a single lens reflex camera, FIG. 29 is a section diagram viewed from behind of the camera in FIG. 28, and FIG. 30 is a description diagram of an inside range of a viewfinder of the single lens reflex camera in FIG. 28.

In these drawings, photo taking lens 401 is illustrated by using two pieces of lens for convenience, though it actually comprises more pieces. A main mirror 402 is used to switch a state of a object image through a viewfinder system between an observed state and a photographed state by being in contact slantingly with a photographing optical path or being withdrawn from it. A submirror 403 is used to reflect a flux transmitted through the main mirror 402 back into a focus detection unit 406 at the bottom of the camera body.

There are provided a shutter 404 and a photosensitive member 405 comprising silver halide or a CCD- or MOS-typed solid camera component or a camera tube such as a vidicon.

A focus detection device 406 comprises a field lens 406a arranged in neighborhood of an image formation plate, reflection mirrors 406b and 406c, a secondary image formation system 406d, an aperture 406e, and a line sensor 406f.

The focus detection device 406 of this embodiment uses a known phase difference detection method to detect a focus and has a configuration in which a focus can be detected by using a plurality of areas (five places; 600 to 604) in an observed screen (within a viewfinder field) as focus detection points as shown in FIG. 30.

A focusing plate 407 is arranged on an anticipated image formation plane of the photo taking lens 401 and a pentaprism 408 is used for changing an optical path of the viewfinder. An image formation lens 409 and a photometric sensor 410 are used to measure the luminance of the object in the observed screen. The image formation lens 409 associates the focusing plate 407 with the photometric sensor 410 in conjugation via a reflection optical path in the pentaprism 408.

An eyepiece lens 411, which has an optical divider 411a is arranged backward of an exit plane of the pentaprism 408, is used for observing the focusing plate 407 by a user's eye 415. The optical divider 411a is formed by, for example, a dichroic mirror which transmits visible light and reflects infrared light.

A viewfinder optical system comprises the above main mirror 402, the focusing plate 407, the pentaprism 408, and the eyepiece lens 411.

Then, the configuration of the line of sight detection device is described below.

There are an image formation lens 412 and an image sensor 414 in which CCD or other photoelectric conversion elements are arranged two-dimensionally. The image formation lens 412 is arranged so that it is associated with the neighborhood of a pupil of a photographer's eye 415 at a predetermined position in conjugation. Infrared emitting diodes (hereinafter, IREDs) 413a to 413f are light sources for illumination arranged around the eyepiece lens 411 as shown in FIG. 31B.

The line of sight detection device is formed by these components and the above dichroic mirror 412.

As for the line of sight detection method, an eyeball of the photographer is illuminated by any IRED selected out of the IREDs 413a to 413f, first. Then, a reflected flux on the eyeball passes through the eyepiece lens 411, is reflected on the dichroic mirror 411a, an image is formed on the image sensor 414 by the image formation lens 412, and an eyeball image is formed. Next, a rotation angle of the eyeball is obtained by detecting a relative deviation amount between the center of the pupil of this eyeball image and the IRED reflected image reflected on a surface of the cornea to detect where the photographer is watching, in other words, his or her line of sight position.

A technique required for obtaining the line of sight position from an output of the image sensor 414 is disclosed in Japanese Patent Application Laid-Open No. 3-109029, and therefore it can be used as concrete processing method and its detailed explanation is omitted here.

An high luminance LED for superimposing 421 can be recognized visually in a bright object. A light emitted from the LED is reflected on the main mirror 402 via prism for projection 422 and is bent at a microprism array 407a set in a display portion of the focusing plate 407 perpendicularly, and then it reaches the photographer's eye 415 passing through the pentaprism 408 and the eyepiece lens 411.

Then, the microprism array 407a is formed in frames at a plurality of positions corresponding to detecting areas on the focusing plate 407, and they are illuminated by five LEDs 421 for superimposing corresponding each (LED-L1, LED-L2, LED-C, LED-R1, and LED-R2).

Accordingly, a flash is made at each focus detection area (marked) 600, 601, 602, 603, or 604 in the viewfinder field, so that each focus detecting area can be indicated (hereinafter, it is called a superimposing display.) as shown in the viewfinder field in FIG. 30.

A front panel 417 in FIG. 29, which holds these viewfinder components and the focus detection device, comprises a mirror box. On the side 417a of the front panel 417, a high luminance LED 418 (LED-S) like the LED 421 is installed with its light exit surface being downward. Light emitted from the LED 418 is incident on a mirror lens 419 made of transparent resin installed on the same side of the mirror box. The mirror lens 419 has a convex top 419a and a flat bottom 419b with a flat surface; the flat surface is a reflection plane coated with aluminum. The flux reflected here is led by the focusing plate 407 to reach the photographer's eye 415 via the microprism 407b set in the same manner as above.

A frame in a form of a parallelogram within the viewfinder field at the upper left of the drawing in FIG. 30 is a line of sight input index 605. It is set to activate a predetermined function of the camera, for example, a line of sight input function for stopping down the aperture of the photo taking lens 401 up to an actually set caliber to check the depth-of-field when the above line of sight detection device detects the photographer's line of sight on the line of sight input index 605 or in its neighborhood, and it turns on the above LED 418 for a predetermined time to inform the photographer of the input to display the line of sight input index 605 in the viewfinder.

Returning to FIG. 28, it shows a field mask 423 for forming a viewfinder field area and an LCD in the viewfinder 424 for displaying photographing information outside the viewfinder field, which is illuminated by an LED for illumination (F-LED) 425.

Light transmitting through the LCD in the viewfinder 424 is led to the outside of the viewfinder field by a triangular prism 426 (See FIG. 28) as indicated by 606 in FIG. 30, so that the photographer can know various photographing information. A known mercury switch 427 is used to detect the stance of the camera.

There are shown an aperture 431 arranged in the photographing lens 401, an aperture driving unit 432 including an aperture driving circuit 511 described later, a lens driving motor 433, and a lens driving member 434 comprising a driving gear. A photo coupler 435 detects a rotation of a pulse plate 436 linked with the above lens driving member 434 and transmits it to a focus adjusting circuit 510, and the focus adjusting circuit 510 drives the above lens driving motor 433 by a predetermined amount on the basis of this information and the lens driving amount from the camera to move the photo taking lens 401 to an in-focus position.

A distance information code plate 437 is set to detect the position of the photo taking lens 401 to obtain distance information from the camera to an object. It has about 4 bits of code patterns from the closest position to an infinite position so that the distance to the object can be detected at an in-focus position by using a brush contact, which is not shown. A focus distance information code plate 438 is used to detect a focus distance of the photo taking lens 401 and it can detect focus distance information meeting a movement of a lens which zooms by using the brush contact which is not shown. Both of the distance information code plate 437 and the focus distance information code plate 438 are connected to the lens focus adjusting circuit 510. A mount contact 439 is an interface between a known camera and a lens.

Figure 31A:
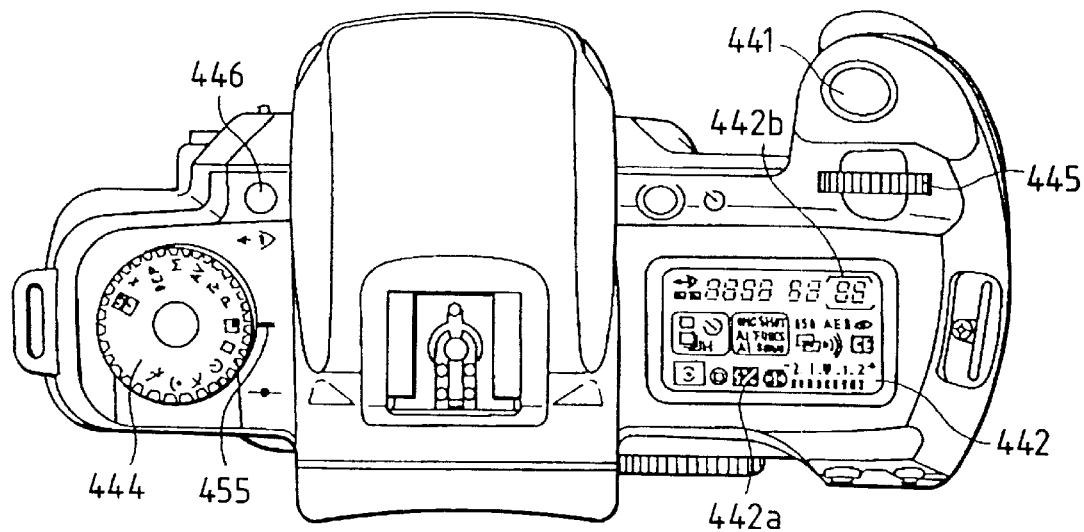
FIGS. 31A and 31B are diagrams illustrating a top view and a rear elevation of the camera in FIG. 28.
Figure 31B:
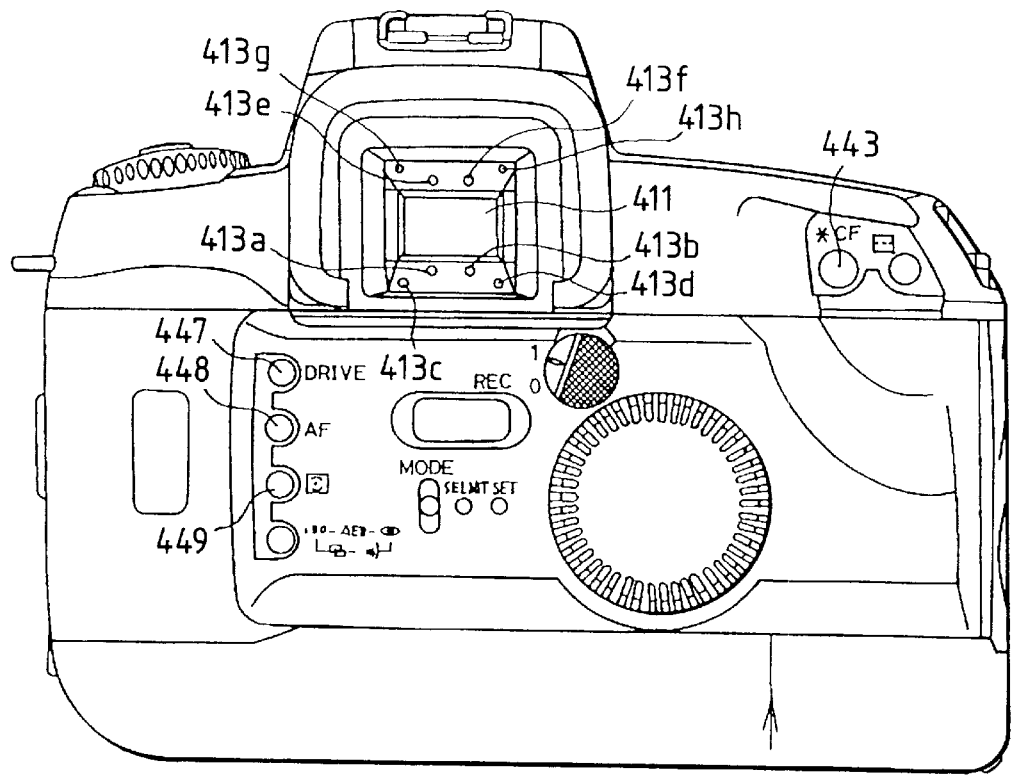

FIGS. 31A and 31B are schematic diagrams of a top and a rear side of the single lens reflex camera in the above configuration.

In FIG. 31A, a release button 441 is shown. An LCD for monitoring 442 serves as an external monitor display unit, which comprises a fixed segment display portion 442a for displaying predetermined patterns and a 7-segment display portion 442b for displaying variable numerals. An AE locking/CF setting button 443 has an AE locking function of holding a photometric value and a function of setting a custom function described later, and a mode dial 444 is used to select a photographing mode.

Then, the details of the above mode dial 444 are described below by using FIG. 32.

A lock position 444a is used to lock the camera, an automatic photographing mode position 444b is used to control the camera by a previously set photographing program or operating function, and a full-automatic mode position 444c places the camera in an automatic photographing mode including a function of resetting photographing contents which has been already set arbitrarily without the above line of sight detection. An image zone position 444d place the camera in a mode in which photographing programs are set suitably for scenes as indicated by pictorial symbols, including a portrait mode suitable for portrait photographing, a landscape mode suitable for photographing a landscape or a souvenir picture, a close-up mode suitable for photographing at a close distance, and a sport mode suitable for photographing a body in motion.

A manual photographing mode position 444e represents a mode in which a photographer can set photographing contents, including a program AE mode, a shutter-priority AE mode, an aperture-priority AE mode, a manual exposure mode, a depth-priority AE mode, and a synchro photographing mode. In addition, an index 455 indicates a selected position. A mode position 444f is used to set a so-called a custom function, and a photographer can select a function to be used among the functions previously set in the camera in this mode position. A calibration mode 444g is used to obtain individual difference correction data used to correct individual differences of the line of sight at calculation for line of sight detection.

Returning to FIG. 31A, an electronic dial 445 is used to select a set value which can be further selected in the mode selected in the above mode dial 444 by being turned to generate click pulses. For example, if a shutter-priority photographing mode is selected by the mode dial 444, a currently set shutter speed is displayed on the LCD 424 in the viewfinder and the LCD for monitoring 442. If the photographer turns the electronic dial 445 looking at this display, the currently set shutter speed is sequentially changed in the rotation direction.

A line of sight input button 446 is used to turn on or off the function of the line of sight input device. When it is set on, it can switch operations between "selecting a line of sight input focus detection point" to determine a single focus detection point out of a plurality of focus detection points by detecting a line of sight position of the photographer as already known and "selecting an automatic focus detection point" based on an automatic selection algorithm which is also known.

In FIG. 31B, switching buttons 447 to 449 arranged on a rear cover are used to switch the operation modes of the camera. Pressing one of them sets a state ready for switching operation modes, so that a desired operation mode can be set by an electronic dial.

The switching button 447 is a feeding mode button for setting an operation mode for film feeding, and it can set three modes, such as a one shot mode in which only a single film frame can be fed by pressing its release 441 once, a high speed continuous shot mode for feeding five film frames at a high speed semi-continuously while the release key is pressed, and a low speed continuous shot mode for feeding two film frames at a low speed in the same manner.

An AF mode button 448 is used to set an AF operation mode, and it can set two modes such as a one shot AF for locking a focus adjusting function if an in-focus state is set once by AF and a servo AF mode for continuing a focus detecting operation while the release button is pressed.

A photometry mode 449 is used to set a photometric operation mode for measuring the luminance of an object, and it can set three modes such as an evaluation photometry mode for a determination of the most suitable exposure value according to an output of the photometric sensor having 16 segments described later, an average photometry mode, which uses an average value of all sensor outputs, and a partial photometry mode, which uses a single sensor output in the 16 segments.

An explanation of other operation members in FIGS. 31A and 31B is omitted here since they are not particularly related to this invention.

Figure 33B:
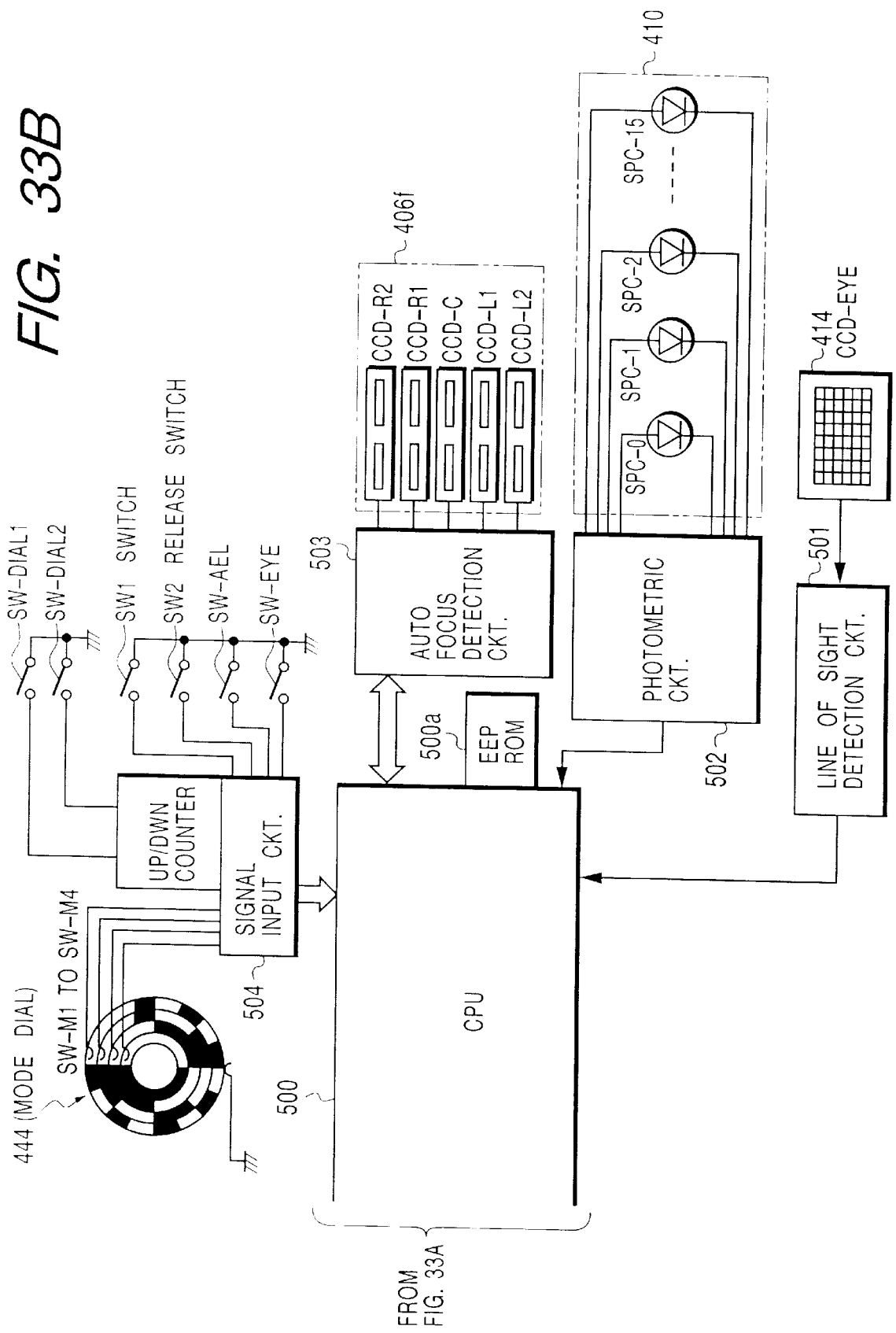
FIG. 33 is comprised of FIGS. 33A and 33B showing block diagrams illustrating a main portion of an electric configuration of the camera in FIG. 28.

FIGS. 33A and 33B are block diagrams illustrating an electrical configuration built in a single lens reflex camera having the above configuration. The same reference characters designate the same elements as for in FIG. 28.

A central processing unit (hereinafter, CPU) 500 of a microcomputer built in the camera body is connected to a line of sight detection circuit 501, a photometric circuit 502, an automatic focus detection 503, a signal input circuit 504, an LCD driving circuit 505, an LED driving circuit 506, a shutter control circuit 508, and a motor control circuit 509. In addition, it transmits or to receive signals from a focus adjusting circuit 510 arranged in a photo taking lens 401 and an aperture driving circuit 511 via the mount contact 439 in FIG. 28.

An EEPROM 500a attached to the CPU 500 has the function of storing information arbitrarily set by a photographer as a storing means. In addition, it has the function of storing individual difference correction data used for correcting individual differences of a line of sight.

The above line of sight detection circuit 501 converts signals of an eyeball image from the image sensor 414 (CCD-EYE) in an A-D conversion to send the image information to the CPU 500. The CPU 500 extracts characteristics of the eyeball image required for the line of sight detection based on a predetermined algorithm and calculates the photographer's line of sight from positions of the characteristics.

The above photometric circuit 502 amplifies signals from the photometric sensor 410, logarithmically compresses them and converts them in an A-D conversion, and then sends them as luminance information of each sensor to the CPU 500. The photometric sensor 410 comprises photodiodes having 16 segments, SPC-0 to SPC-15, to perform a luminance photometric operation of an object in an area divided into 16 areas, A0 to C15 in the observed screen as shown in FIG. 30.

In FIG. 30, the photometric operation is performed for an area A3 including the leftmost focus detection point 600 with SPC3, an area A1 including the second focus detection point 601 counted from the left with SPC-1, areas A0, A2, and A4 each including focus detection points 602 to 604, respectively with SPC-0, SPC-2, and SPC-4. Furthermore, a photometric operation is performed for the peripheral areas B5 to B11 with SPC-5 to SPC-11 and outer peripheral areas, C12 to C15 with SPC-12 to SPC-15.

A line sensor 406f is a known CCD line sensor comprising five pairs of line sensors CCD-L2, CCD-L1, CCD-C, CCD-R1, and CCD-R2 corresponding to five focus detection points 600 to 604 in the screen shown in FIG. 30 in the above.

The automatic focus detection circuit 503 converts a voltage obtained from the above line sensor 406f in an A-D conversion and then sends it to the CPU 500.

Switch SW-1 is set on by a first stroke of a release button 441 to start photometry and AF, and switch SW-2 is a release switch which is set on by a second stroke of the release button 441. Switches SW-AEL and SW-EYE are set on when an AE locking/CF setting key 443 and a line of sight input button 446 are pressed. SW-DIAL1 and SW-DIAL2 are dial switches set in the already described electronic dial 445 with their states entered in an up/down counter of the signal input circuit 504 to count a rotation click amount of the electronic dial 445. SW-M1 to SW-M4 are also dial switches set in the mode dial 444 which is already described.

State signals of these switches are entered into the signal input circuit 504 and transmitted to the CPU 500 via a data bus.

The LCD driving circuit 505 has a known configuration for driving an LCD which is a liquid crystal element for displaying, so that an aperture value, a shutter second time, or set photographing mode can be displayed on both of the LCD for monitoring 442 and the LCD in the viewfinder 424 simultaneously according to signals from the CPU 500.

The LED driving circuit 506 controls turning on or off and blinking of the LED for illumination (F-LED) 425 and the LEDs for superimposing 418 and 421.

The IRED driving circuit 507 turns on infrared emitting diodes (IRED-1 to IRED-8) 413a to 413h according to the conditions selectively.

The shutter control circuit 508 controls a magnet MG-1 for running the forward shutter curtain and a magnet MG-2 for running the rearward shutter curtain when it is energized to expose a photosensitive member by a predetermined light amount. The motor control circuit 509 is used to control a motor M1 for advancing or rewinding a film and a motor M2 for charging the main mirror 402 and the shutter 404. A release sequence operation of the camera is performed by these shutter control circuit 508 and motor control circuit 509.

The following describes an operation in the AF mode which is one of the operation modes of a camera having the above line of sight detection device by using flowcharts in FIGS. 34A to 36.

FIGS. 37 and 38 show data tables of the EEPROM 500a used for this operation.

If a locked camera is set into the photographing mode (for example, set in the program mode) by turning the mode dial 444, the camera is powered on (step S101), and processing proceeds to step S102. In the step S102, variables to be reset are selected out of data stored in the EEPROM 500a and they are reset, and processing proceeds to step S103. In step S103, the CPU 500 reads the operation mode set in the camera. To set the AF mode, press the AF mode button 448 and it is assumed that the AF mode is previously set by the electronic dial 444.

In the next step S104, it is checked whether or not the switch SW1 is set on by pressing the release button 441. If it is off, this detection is repeated until it is set on. If the switch SW1 becomes on, the CPU 500 sends a signal to a photometric circuit 502 first, performs a photometric operation for luminance of the object corresponding to 16 areas in the viewfinder, and then calculates photometric values based on a predetermined algorithm in the next step S105, and displays a shutter second time and an aperture value based on these photometric values on the LCD in the viewfinder 424 and the LED for monitoring 442 in the next step S106.

Then, processing proceeds to step S107 to determine a state of the AF mode which is set (one shot AF, first time servo AF, second or after servo AF). In the next step S108, the CPU 500 reads a detection count Xi of executing a line of sight detection according to the set AF mode and the same position and a gazing count Yi of gazing at an area continuously from the data table of the EEPROM 500a as shown in FIG. 37.

In this embodiment, a line of sight detection count and a gazing count are not identical between the one shot AF mode and the servo AF mode. In addition, the same operation is performed as for the one shot AF mode until an in-focus state is detected once in the servo AF mode. Therefore, the servo mode can be divided into two modes of the first time operation up to the first in-focus state and the second or after operation after the in-focus state.

In the next step S109, a detection count is determined to check that a line of sight detection is performed by the already set detection count Xi. If the detection count is smaller than the set detection count Xi, processing proceeds to step S110 to detect the photographer's line of sight position based on a known line of sight detection method by using the line of sight detection circuit 501. The line of sight detection is performed here to select a single focus detection point out of all the focus detection points. Then, processing proceeds to step S111 to determine whether or not the above line of sight detection is successful. If it is successful, processing proceeds to step S112. Otherwise, the control returns to the step S109.

In step S112, a focus detection point closest to the detected line of sight position is considered as a gazing focus detection point. In the next step S113, a gazing count of this gazing focus detection point is incremented by one, and then each gazing count of other gazing focus detection points is cleared to zero.

Then, processing proceeds to step S115 to determine whether or not the number of gazing times reaches the set gazing count Yi. If it does not reach Yi processing proceeds to step S116 to determine whether or not the focus detecting operation is the first time, in other words, whether a focus detection point is already selected or it is not selected at all, that is, the first time.

If it is not the first time, processing proceeds to step S117 to determine the last time focus detection point since it cannot be determined whether or not the photographer is gazing at the focus detection point with an intention of switching the focus detection point because the number of gazing times does not reach the gazing count Yi set in the step S108.

If the focus detection is the first time in the step S116, the gazing focus detection point in the step S118 is determined since any focus detection point is not selected yet.

If the gazing count in the step S115 reaches the set gazing count Yi, processing proceeds to step S119 to determine that the photographer has an intention of switching the focus detection point and to switch the focus detection point to the gazing focus detection point.

If a focus detection point at which a focus should be adjusted in the steps S117, S118, and S119 is determined, a focus detecting operation is performed in step S120.

Subsequently it is determined whether or not a focus is detected in step S121. If it can be detected, processing proceeds to step S122. Otherwise, it proceeds to step S124 in FIGS. 35A and 35B.

In step S124, an impossible in-focus is indicated by blinking the LCD in the viewfinder 424. In the next step S125, it is checked that the one shot AF mode is set. If the one shot AF mode is set, in the next step S126, a state of the switch SW1 is detected until the switch SW1 becomes off with a hand becoming off the release button 441, and the control returns to the step S102 of the initial state if it is set off.

If the servo AF mode is set in the above step S125, processing proceeds to step S127 to return to the step S109 so as to continue the focus detecting operation always when the release button 441 is being pressed or to return to the step S102 if the switch SW1 is off.

Returning to the step S109, if the line of sight detection count reaches the set detection count Xi, processing proceeds to step S128. In this step S128, it is determined whether or not the operation is the second or after detection in the previously described servo AF mode. If it is so, processing proceeds to step S129 to detect a state of the switch SW1 until the switch SW1 becomes off with a hand becoming off the release button 441, and the control returns to the step S102 of the initial state if it is set off.

In this embodiment, a detection count Xi which actually will not occur is entered in the EEPROM 500a in the second or after operation in the servo AF mode. Therefore, the step S129 will not be executed practically, but it is provided to limit the line of sight detection count for energy saving.

If the operation is not the second or after detection in the servo AF mode in the above step S128, in other words, if it is in the one shot AF mode or the first time detection in the servo AF mode, processing proceeds to step S130. Progressing to this step S130 means that a focus detection point cannot be specified due to an impossible line of sight detection after a line of sight detecting operation by the set number of times. Therefore, in this embodiment, it is prevented that an AF operation can be performed during an impossible line of sight detection for a long time. Then, defocus amounts at all focus detection points are detected, and it is determined whether or not a focus can be detected in the next step S131. If even a single point can be detected, processing proceeds to step S132. Otherwise, it proceeds to step S124.

In step S132, a known "selecting auto focus detection point" is executed by selecting one focus detection point where the main object is supposed to exist by considering the detected defocus amount and absolute distance information. And then, processing proceeds to step S122.

In step S122, it is determined whether or not the photo taking lens 401 is in an in-focus state based on the defocus amount of the focus detection point. If it is not in the in-focus state, processing proceeds to step S123, and the CPU 500 sends a signal to the focus adjusting circuit 510 to drive the photo taking lens 401 by a predetermined amount according to the defocus amount. After driving the photo taking lens 401, the control returns to step S120 to perform the above series of focus detecting operations, and processing proceeds to step S133 if it is determined that the lens is in an in-focus state in the step S122.

In step S133, a photometric operation is performed in the same manner as for the above step S105 and an exposure control value is calculated. After that, processing proceeds to the next step S134 to drive the LED for superimposing 421 at a focus detection point in an in-focus state of the focus detection point marks 600 to 604 so that an appropriate brightness is obtained for the object on the basis of the photometric value for in-focus point displaying.

In the next step S135, an exposure control value is displayed on the LCD in the viewfinder 424 and the LCD for monitoring 442. In the next step S136, it is determined whether or not the operation is in the servo AF mode. If it is in the servo AF mode, processing proceeds to step S137 to discriminate the switch SW1 state to determine whether or not the servo AF operation is continued. If the switch SW1 is off, the control returns to step S102. If it is on, the release switch SW2 state is checked to determine whether or not an exposure operation is performed under the conditions in the next step S138. If the release switch SW2 is on, processing proceeds to step S139, in which the CPU 500 transmits a signal to the shutter control circuit 508, the motor control circuit 509, and the aperture driving circuit 511 to perform a series of release sequence operations.

In detail, the CPU 500 energizes the motor M2 to raise the main mirror 402, adjusts the aperture 431 based on an exposure value described above, and energizes the magnet MG1 to release a forward curtain of the shutter 404. Subsequently, after an elapse of a shutter second time of the exposure value, the CPU energizes the magnet MG2 for mirror down and shutter charging operations and also energizes the motor M1 to advance a film and then completes the series of the release sequence.

If the release switch SW2 is not on in the step S138, processing proceeds to step S140 to set a flag of "the second or after servo AF mode". Then, the control returns to the step S107 in FIGS. 34A to 34C.

Returning to the above step S136, if the operation is in the one shot AF mode, processing proceeds to step S141 to lock the focus position of the photo taking lens and the above described photometric value. Then, processing proceeds to step S142 to enter the status of an operation of starting a line of sight input function for operating a predetermined function when a photographer gazes at a line of sight input index so as to read a line of sight detection count Xi and a gazing count Yi at a starting operation and at a terminating operation from the data table of the EEPROM 500a as shown in FIG. 38. In this embodiment, an explanation is made for a case that a depth-of-field checking function is set as a line of sight input function.

In the next step S143, the switch SW1 state is discriminated. If the switch SW1 is off, the control returns to step S102. If it is on, the release switch SW2 state is checked in the next step S144. If the release switch SW2 is on, processing proceeds to step S145 to perform the series of a release sequence same as for the step S139. If it is off, processing proceeds to step S146.

In the above sequence, it is understood that the line of sight input function can be used only when the shutter button 441 is half depressed with only the switch SW1 set on after obtaining an AF in-focus state in the one shot AF mode.

In step S146, the detection count is determined to check that the line of sight detection is already executed up to the detection count Xi in the operation for starting the previously read and set line of sight input function. If the number of the detections is smaller than the set detection count Xi, processing proceeds to step S147 to detect the photographer's line of sight position by using the line of sight detection circuit 501 in the same manner as for the above step S110. Unlike the step S110 in this operation, the line of sight detection is performed for a switching operation of whether or not the line of sight input function is operated with gazing at the line of sight input index 605. If the number of the detections reaches the set detection count Xi, the control returns to the step S143.

In step S148, it is determined whether or not the line of sight detection is successful. If it is successful, processing proceeds to step S149. Otherwise, the control returns to step S143 to repeat a series of the line of sight detecting operations up to a set number of detections. In the next step S149, the detected line of sight position is on the line of sight input index 605 or in its neighborhood and it is determined whether or not the photographer is gazing at the line of sight input index 605. If it is determined that the photographer is gazing at the index, processing proceeds to step S150 to increment the gazing count in the line of sight input function operation by one. If the photographer is not gazing at the index, the gazing count in the line of sight input function operation is cleared to zero in step S151 and then the control returns to the step S143.

Subsequently, in step S152, it is determined whether or not the number of gazing times reaches the set gazing count Yi. If it does not reach it, the control returns to the step S143. Otherwise, processing proceeds to step S153.

In step S153, the CPU transmits a signal to the LED driving circuit 506, to illuminate the line of sight input index for a predetermined time by using the LED 418 (LED-S), and performs an indication with a lamp so that the photographer can confirm that the line of sight input function is accepted. For this indication, the LED 418 is emitted with a known luminance modulation control corresponding to a photometric value of the photometry area C13 obtained in the step S133.

After the above displaying is completed, processing proceeds to step S154, in which the CPU 500 generates a control signal based on an aperture value previously set in the photographing mode or an aperture value calculated in the step S133 and transmits it to the aperture driving circuit 511 to drive the aperture 431 up to a predetermined opening (If the value is displayed as shown in FIG. 30, the aperture is adjusted to F11).

By this operation, it becomes possible to form an object image through a flux under the same conditions as for the exposure on the viewfinder screen 407, so that the depth-of-field can be checked.

Figure 36:
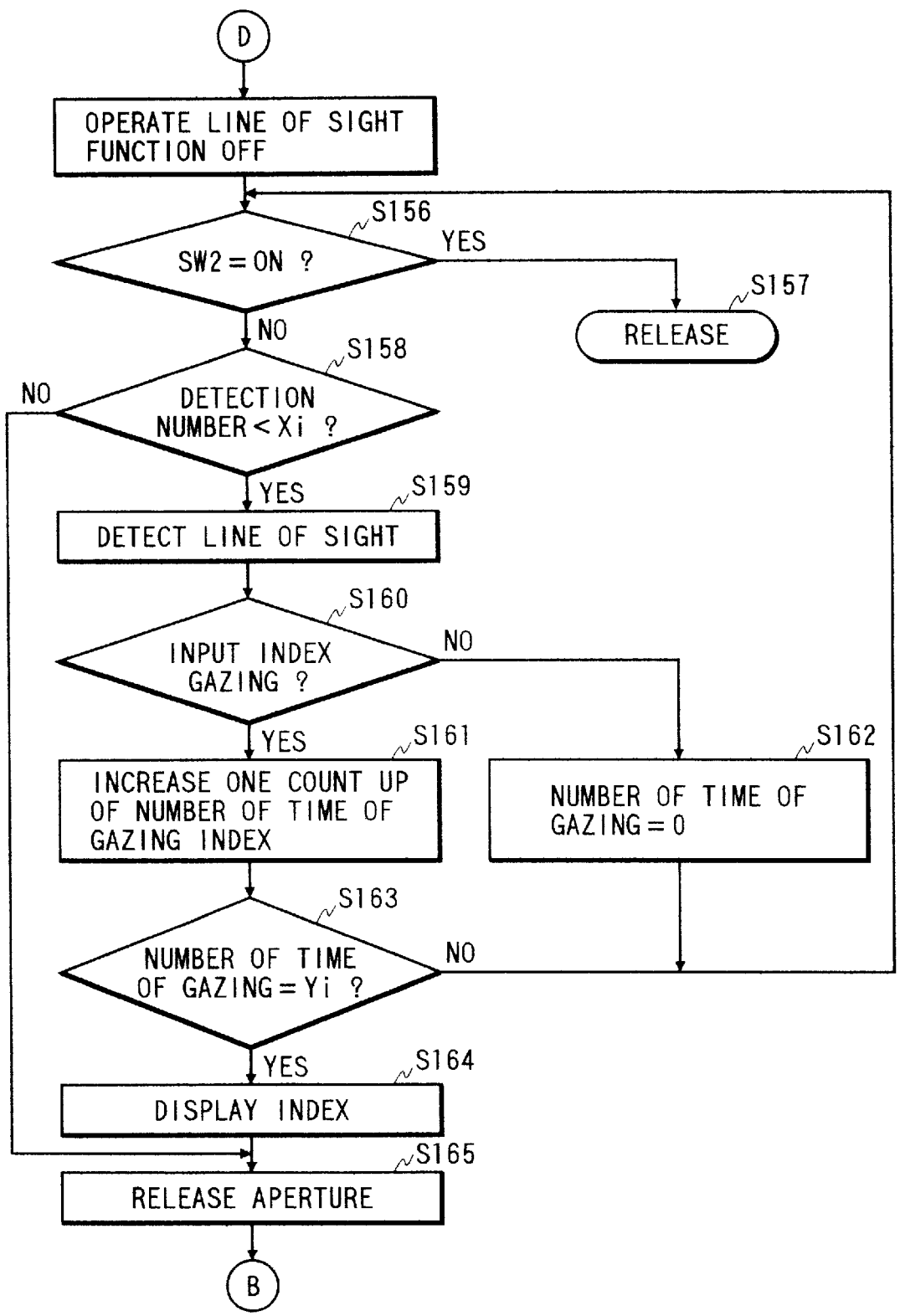
FIG. 36 is a flowchart illustrating an operation continued from the operation in FIGS. 35A and 35B.

After an aperture operation is completed, processing proceeds to step S155 in FIG. 36 to change the status to a status of an operation of terminating the line of sight input function, and then the release switch SW2 state is checked in the next step S156. If the release switch SW2 is on, processing proceeds to step S157 to perform a series of a release sequence operations the same as for the step S139. If it is off, processing proceeds to step S158.

In step S158, the detection count is determined to check that the line of sight detection is already executed up to the detection count Xi in the operation for terminating the previously read and set line of sight input function. If the number of the detections is smaller than the set detection count Xi, processing proceeds to step S159 to detect the photographer's line of sight position by using the line of sight detection circuit 501 in the same manner as for the above step S110. This line of sight detection is performed for a switching operation of whether or not the line of sight input function is terminated with gazing at the line of sight input index 605.

In step S160, the detected line of sight position is on the line of sight input index 605 or in its neighborhood and it is determined whether or not the photographer is gazing at the line of sight input index 605. If it is determined that the photographer is gazing at the index, processing proceeds to step S161 to increment the gazing count in termination of the line of sight input function operation by one and then proceeds to step S163. If the photographer is not gazing at the index, the gazing count in termination of the line of sight input function operation is cleared to zero in step S162 and then the control returns to the step S156.

In step S163, it is determined whether or not the number of gazing times reaches the set gazing count Yi. If it does not reach it the control returns to the step S156. Otherwise, processing proceeds to step S164.

In step S164, the CPU illuminates the line of sight input index 605 for a predetermined time and performs an indication with a lamp so that the photographer can confirm that the line of sight input function is released in the same manner as for the step S153. Unlike the indication in the step S153, however, it is more effective to illuminate it for a longer time or to blink it several times. After the above indication is terminated, processing proceeds to step S165, in which the CPU 500 generates a control signal and transmits it to the aperture driving circuit 511 to drive the aperture so as to release the aperture 431.

If the number of the detections reaches the set detection count Xi in the step S158, processing proceeds to step S165 to release the aperture 431.

In this embodiment, the set count Xi at the termination operation is set to 64, which means that the operation is set to approximately 10 sec assuming that a single-time line of detection takes approximately 150 ms or so. Therefore, the aperture is automatically returned to a release state after an elapse of 10 sec without any operation after the aperture adjusting operation is started in the step S154. After the aperture is released, processing proceeds to the step S102, which is a termination of a series of the sequence operations.

In the first embodiment, if the line of sight detecting operation is used to select a focus detection point, a different gazing count is used for the gazing count of the photographer's line of sight to determine a focus detection point according to the AF mode. While a focus detection point is determined by gazing once or twice by using the characteristics of a photographer watching an object to be photographed when the release button is pressed in an initial state in the one shot AF mode or in the servo AF mode, a focus detection point is determined by the set gazing count greater than the former after a focus detection point is determined once in the servo AF mode so that a change of the focus detection point is not permitted when the photographer casts a glance or directs his line of sight unconsciously.

In addition, when the line of sight input function is operated, the gazing count is different between starting the operation and termination of the operation. For example, the gazing count set for terminating the operation is greater than the gazing count set for starting the operation so that data can be entered quickly at the start of the operation and that the operation will not terminate unconsciously at the termination of the operation.

In the first embodiment, the line of sight detection count Xi and the gazing count Yi are set according to the AF mode. This invention, however, is not limited to this, and as another application, for example, as shown in the data table of the EEPROM 500a in FIG. 39, the line of sight detection count Xi and the gazing count Yi of the second operation in the servo AF mode can be set according to the photographing mode selected by the mode dial 444.

In addition, in the Tv-priority mode, a focus detection point can be changed easily since an object is often a moving body. In photographing in the sport mode, it is required that a focus detection point can be changed even for a movement of a line of sight in a short time to follow an object since the object moves rather quickly and frequently and a photographer often continues to be gazing at the main object. Therefore, a focus detection point can be changed most easily in the setting in this mode.

The Av-priority mode has a setting in which it is the most difficult to change a focus detection point since an object is often motionless and generally a line of sight moves to determine a composition, though the servo AF mode is not set so often in the Av-priority mode.

In other modes, the same gazing count is set as for the above described embodiment. As for the line of sight input function, a gazing count need not be set according to the photographing mode, and the line of sight detection count Xi is set according to the photographing mode as shown in FIG. 39 in the above embodiment. In other words, it is possible to execute it only in the Av-priority mode and the manual exposure mode of the photographing mode in which generally the depth-of-field is checked frequently without executing it in other modes according to the setting.

Furthermore, as shown in the data table of the EEPROM in FIG. 40, it is also possible to set a gazing count Yi according to the film feeding mode set by the feeding mode button 447. Considering that a high-speed continuous shot is used more frequently for an object moving rapidly, a focus detection point can be changed easily in the high-speed continuous mode and it cannot be easily changed in the one shot/self mode in this setting.

Although the gazing count is different between the start and termination of the operation as a control method of the presence or absence of an input in the line of sight input function, a line of sight position area where the line of sight is determined to be entered, that is, an input area, can be changed. In other words, it is possible to set a larger input area at the start of the operation so that the line of sight can be easily entered and to set a smaller input area at the termination of the operation so that the line of sight cannot be easily entered.

Next, an explanation is made for a case that this invention is applied to a photometry mode which is one of other operation modes of a camera having the line of sight detection device as the sixth embodiment of this invention.

Figure 41B:
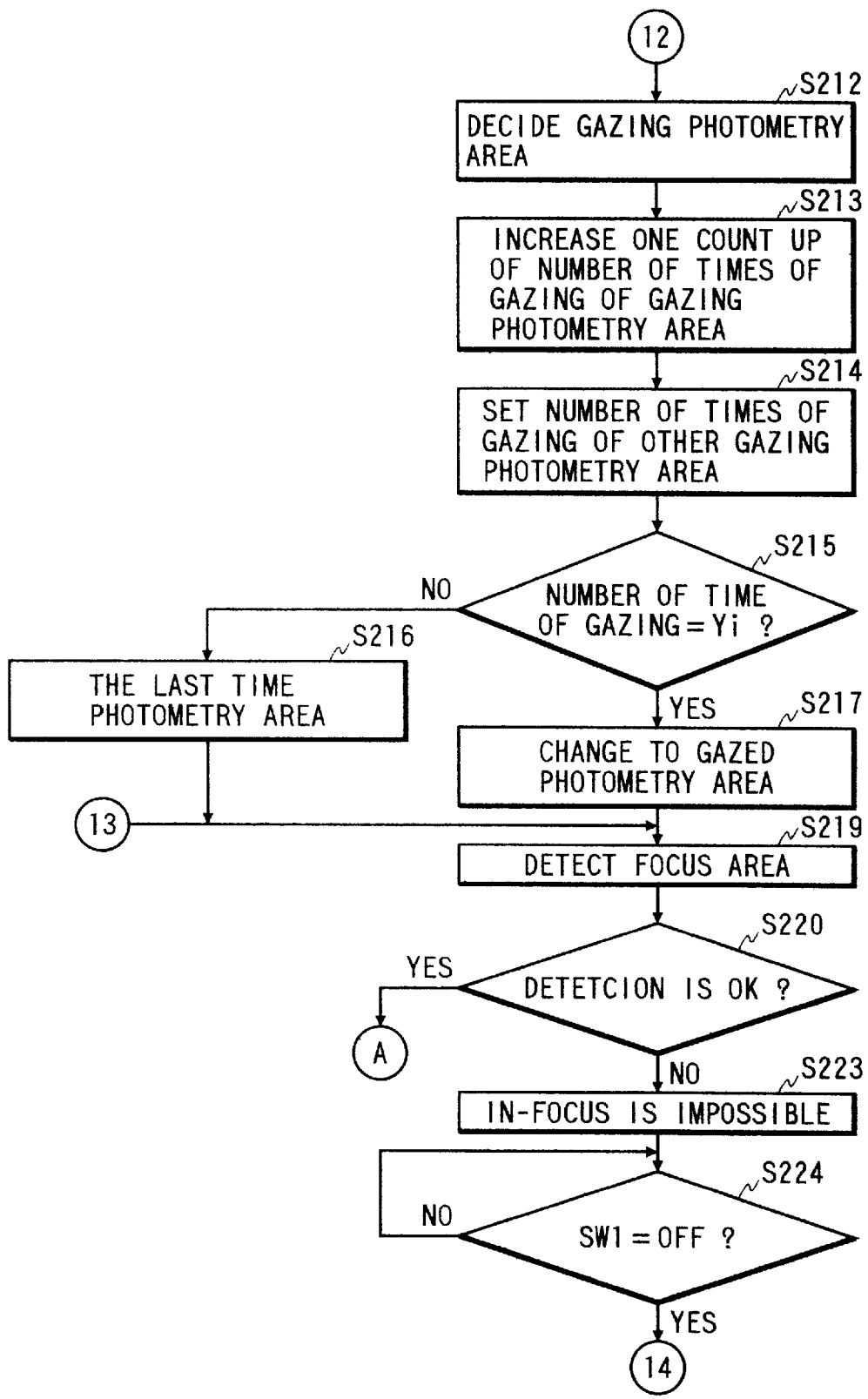
FIG. 41 is comprised of FIGS. 41A and 41B showing flowcharts illustrating a part of an operation of a camera according to a sixth embodiment of this invention.

FIGS. 41A, 41B and 42 are flowcharts of operations in the above case. FIG. 43 is an EEPROM 500a data table used for this application.

In FIGS. 41A, 41B and 42, an explanation is omitted for the same flow as for the above fifth embodiment, and only characteristic flows are described.

Figure 34A:
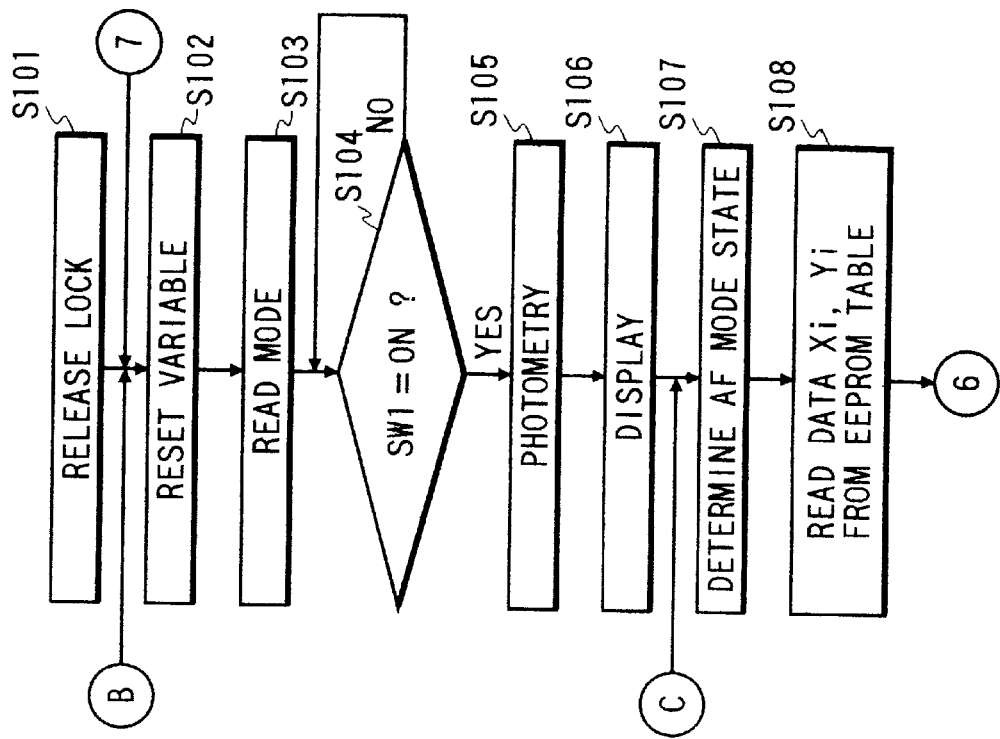
FIG. 34 is comprised of FIGS. 34A to 34C showing flowcharts illustrating a part of an operation of a camera according to a fifth embodiment of this invention.
Figure 34:
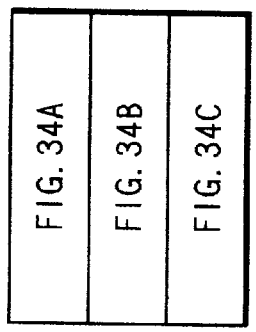
Figure 34B:
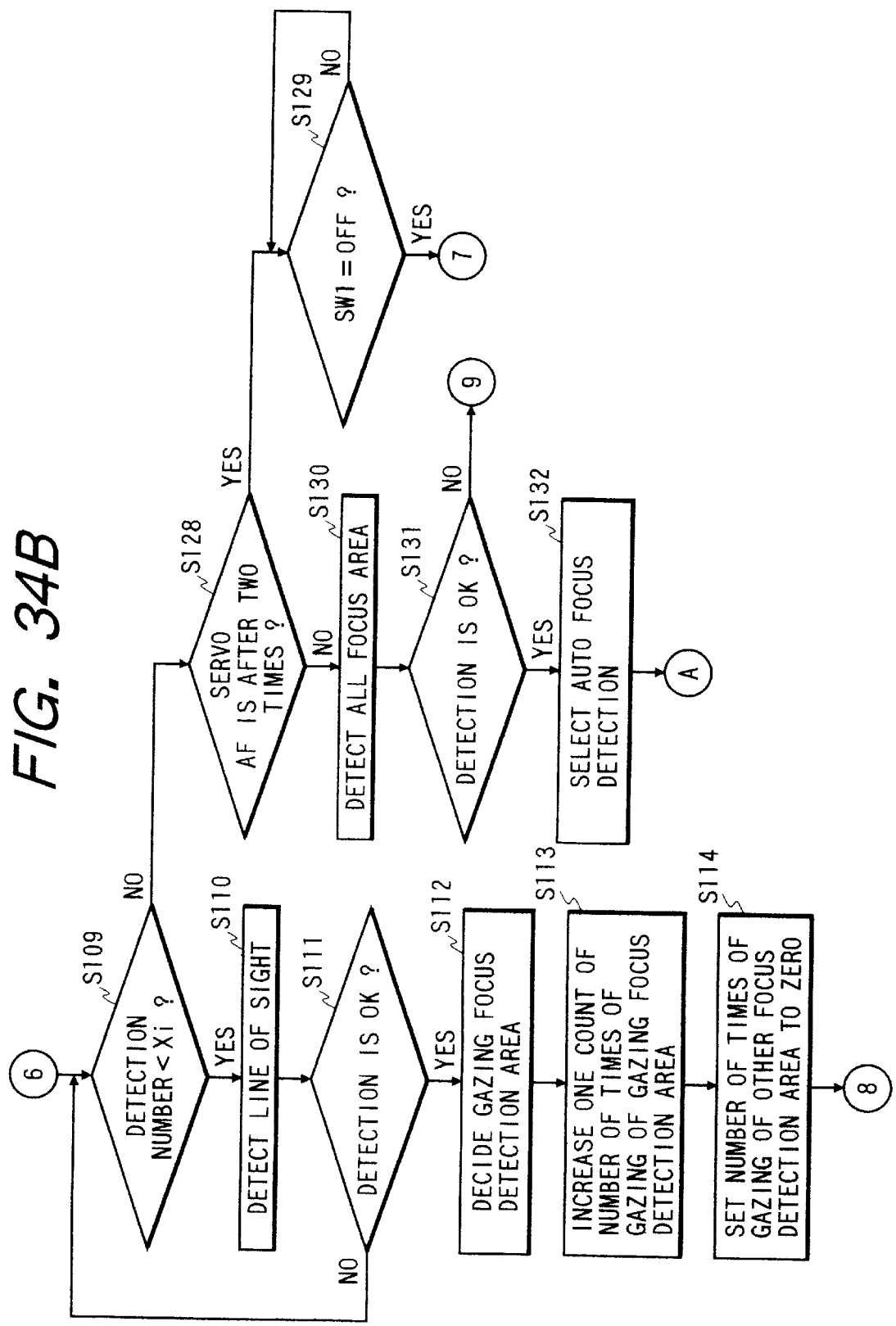

A description of steps S201 to S204 in FIGS. 41A and 41B is omitted since they are completely the same as for the steps S101 to S104 in FIGS. 34A to 34C.

If the switch SW101 becomes on in step S204, processing proceeds to step S205, in which the CPU 500 transmits a signal to the photometric circuit 502 to perform a photometric operation for luminance of an object corresponding to 16 segment areas of the viewfinder according to the set photometry mode. In this operation, an exposure value is calculated based on an algorithm in which a center area A0 is weighted in an evaluation photometry mode, an average photometry mode, and a partial photometry mode.

For example, in the evaluation photometry mode, the exposure value is determined based on the following arithmetic expression:

$$Be=[A0\times3+\{(A1+A2+B5+B6+B7)/5\}\times2+\{(A3+A4+B8+B9+B10+B11+C12+C13+C14+C15)/10\}\times1]\div6$$

In the above expression, A0 to A4, B5 to B11, and C12 to C15 designate photometric values in the photometry areas shown in FIG. 30.

In the next step S206, exposure control values, a shutter second time and an aperture value are displayed on the LCD in the viewfinder 424 and the OCD for monitoring 442. Then, processing proceeds to step S207 to determine a state of the set photometry mode. In the next step S208, the CPU 500 reads the line of sight detection count Xi and the gazing count Yi according to the photometry mode set as shown in FIG. 43 from the EEPROM 500a data table. In this embodiment, a line of sight detection count and a gazing count are set differently according to the evaluation photometry mode, the partial photometry mode, and the average photometry mode.

In the next step S209, the detection count is determined to check that the line of detection is executed up to the already set count. If the number of the detections is smaller than the set detection count Xi, processing proceeds to step S210 to detect a photographer's line of sight position based on a known line of sight detection method through the line of sight detection circuit 501. This line of sight detection is performed to select a single photometry area which should be weighted most significantly in the above photometric calculation out of the photometry areas A0 to A4 corresponding to the focus detection points.

Then, processing proceeds to step S211 to determine whether or not the above line of sight detection is successful. If it is successful, processing proceeds to step S212. Otherwise, the control returns to the step S209.

In step S212, a photometry area closest to the detected line of sight position is considered as a gazing photometry area. In the next step S213, the gazing count of this gazing photometry area is incremented by one. Then, in step S214, gazing counts of other gazing photometry areas are cleared to zero.

Then, in the next step S215, it is determined whether or not the number of gazing times reaches the set gazing count Yi. If it does not reach it, processing proceeds to step S216 to determine the last time weighted photometry area since it cannot be determined whether or not the photographer is gazing at the photometry area with an intention of changing the photometry area because the number of gazing times does not reach the gazing count Yi which has been set.

If the number of the gazing times reaches the set gazing count Yi in the above step S215, processing proceeds to step S217 to change the photometry area to the photometry area at which the photographer has gazed as a photometry area to be weighted, considering that the photographer has an intention of changing the photometry area.

Returning to the step S209, if the number of the detection reaches the set count, processing proceeds to step S218 to decide a center photometry area A0 as a weighted area. If the average photometry mode is set, weighting is not changed for photometry areas other than the center photometry area according to the line of sight position since the line of sight detection count is set to zero as shown in the data table in FIG. 43.

After deciding the photometry areas to be weighted in the above steps S216, S217, and S218, a focus detecting operation is performed in step S219, and it is determined whether or not a focus can be detected in the next step S220. If it can be detected, processing proceeds to step S221 in FIG. 42. Otherwise, it proceeds to step S223.

In step S223, an impossible in-focus state is indicated by blinking the LCD in the viewfinder 424. In the next step S224, the switch SW1 state is detected until the switch SW1 becomes off with a hand leaving the release button 441, and the control returns to the step S202 of the initial state if it is set off.

Figure 35B:
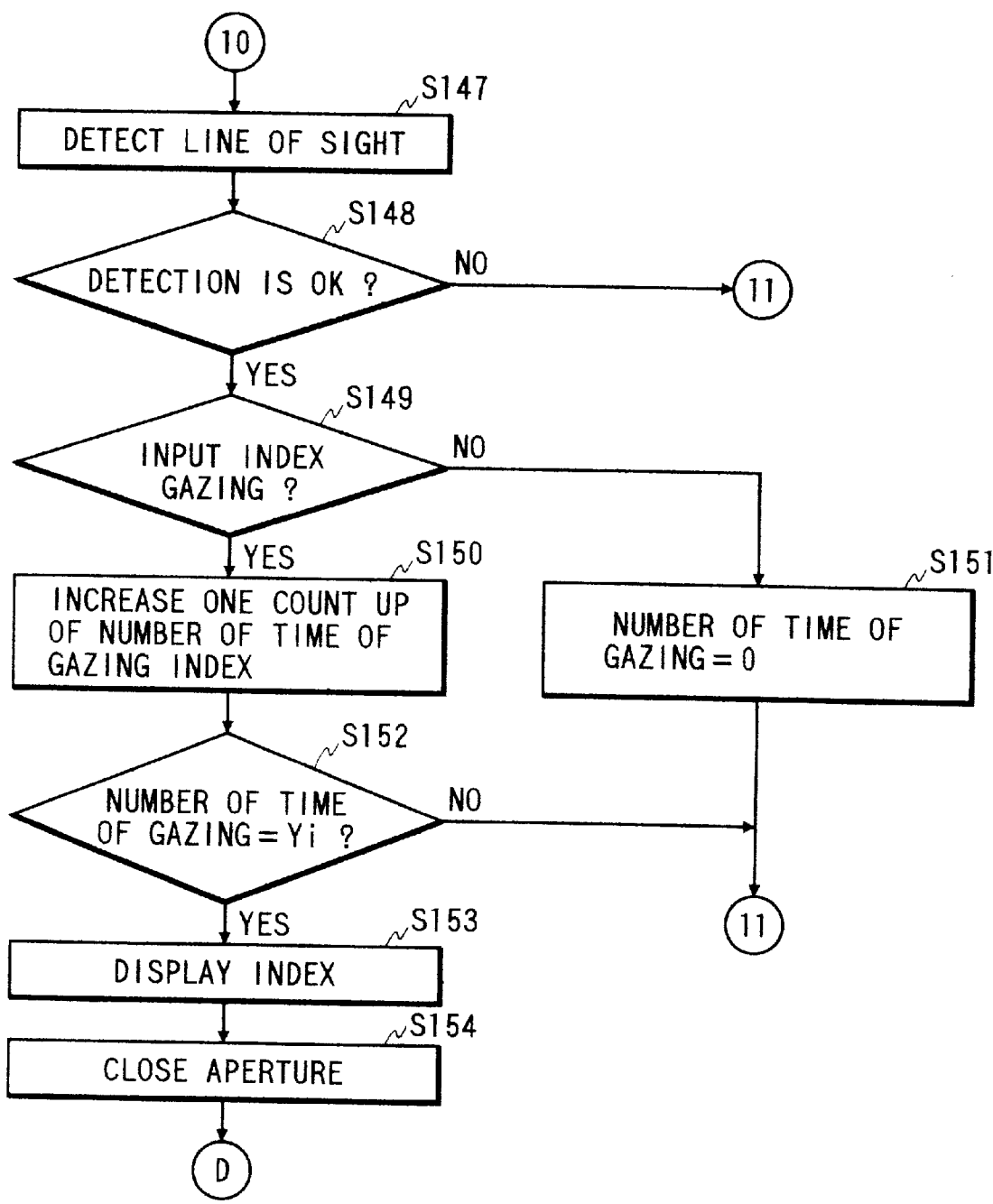
FIG. 35 is comprised of FIGS. 35A and 35B showing flowcharts illustrating an operation continued from the operation in FIGS. 34A to 34C.

A description of steps S221 and S222 in FIGS. 41A and 41B is omitted since they are the same as the steps S122 and S123 in FIGS. 35A and 35B.

If it is judged as an in-focus state in the step S222, processing proceeds to step S225. In the step S225, is performed a photometric operation corresponding to a segment area in the same manner as for the above step S105, and then processing proceeds to the next step S226 to calculate an exposure control value according to a previously set photometry mode on the basis of the photometry area to be weighted as decided.

As an example, arithmetic expressions of respective photometry modes are shown in a case that the A3 photometry area in the left on the viewfinder is decided to be a photometry area to be weighted.

1) Evaluation photometry mode $$Be=[A3\times3+\{(A1+B6+B8+B9)/4\}\times2+\{(A0+A2+A4+B5+B7+B10+B11+C12+C13+C14+C15)/11\}\times1]\div6$$

2) Partial photometry mode $$Be=[A3\times2+\{(A1+B6+B8+B9)/4\}\times1\div3$$

3) Average photometry mode $$Be=[\{(A0+A1+A2+B5)/4\}\times2+\{(A3+A4+B6+B8+B9+B10+B11+C12+C13+C14+C15)/12\}\times1]\div3$$

After one of the above is calculated, an exposure control value is displayed on the LCD in the viewfinder 424 and the LCD for monitoring 442 in the next step S227. Then, in step S228, the switch SW1 state is discriminated. If the switch SW1 is off, the control returns to the step S202. If it is on, the switch SW2 state is checked to judge whether or not an exposure operation is performed under the conditions in step S229. If the release switch SW2 is on, processing proceeds to step S230 to perform a series of release sequence operations in the same manner as for the step S139.

In the sixth embodiment, if the line of sight detecting operation is used to select a photometry area to be weighted based on an algorithm for deciding the photometric value, a different gazing count is used for the gazing count of the line of sight to determine or change a photometry area according to the photometry mode. While a gazing count is set so as not to permit a change in the weighted photometry area when the photographer cast a glance or directs the line of sight unconsciously in the evaluation photometry mode, a gazing count smaller than the former so that the photometry area can be changed quickly in the partial photometry mode so that the photometry area can be changed quickly since it is used to know the partial luminance of respective places on an object.

Then, the seventh embodiment is described below.

While a control method based on line of sight information (gazing count, detection count) is changed according to the AF mode and the photometry mode in the fifth and the sixth embodiments and the camera is controlled within a range of previously set contents in these embodiments, a photographer can change the control method arbitrarily by external operation means in the seventh embodiment.

Concretely, the control method can be changed in a so-called custom function mode in which a photographer can arbitrarily select a gazing count, which is used as a control method for controlling based on the line of sight information in the fifth and sixth embodiments, according to preferences or conditions out of the functions previously set in the camera.

FIGS. 44A to 44F are diagrams illustrating display states of the LCD for monitoring 442 in the custom function selection mode.

Figure 32:
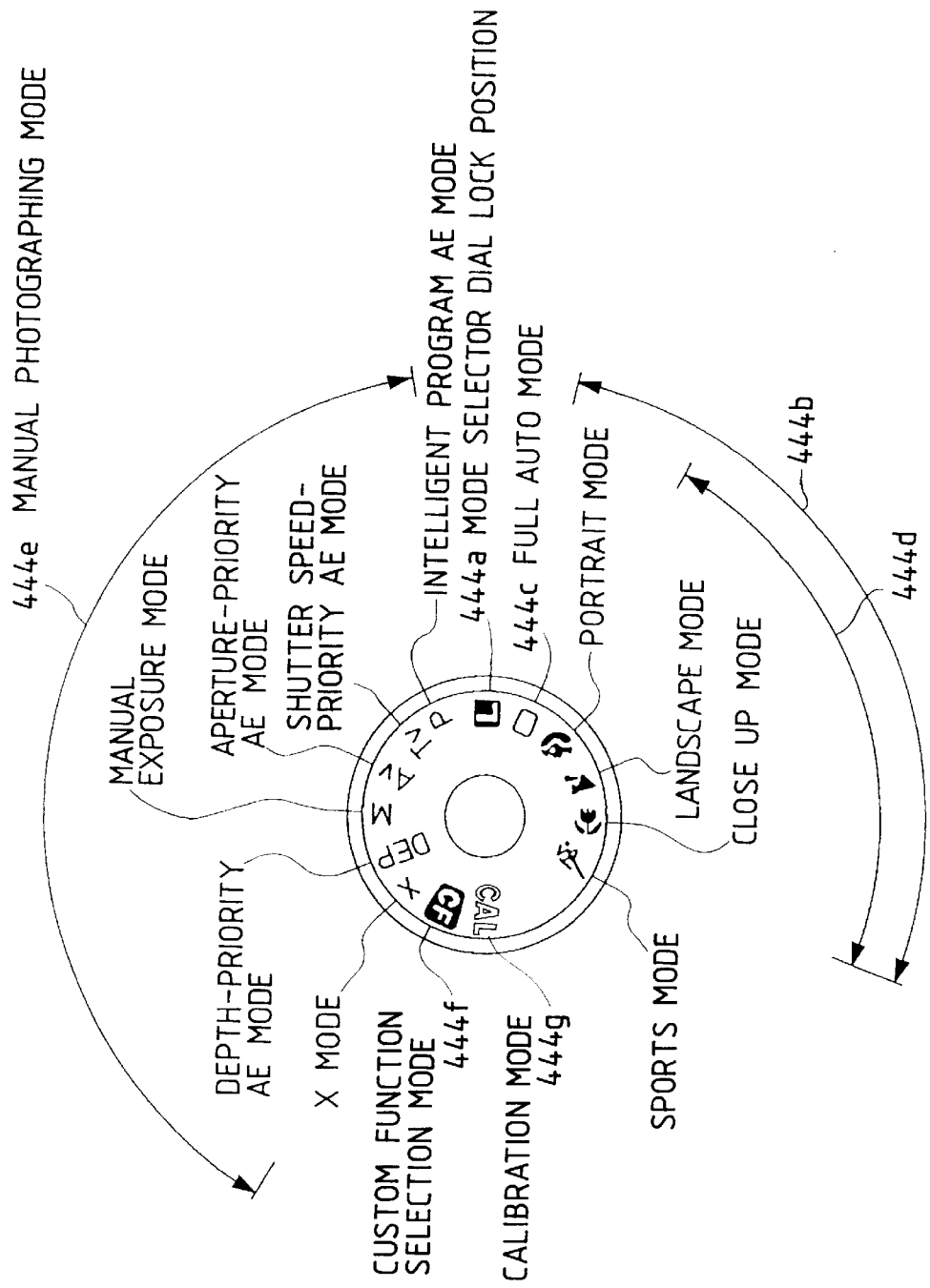
FIG. 32 is a plan view illustrating a mode dial of the camera in FIG. 28.

If a mode dial 444 in FIG. 32 is turned so as to be out of the lock position and a mark 444f of the custom function selection mode 444f is fit to an index 455, a custom function number "CFNo" for indicating a type of a custom function and its setting status on the right of a hyphen are displayed on a segment display section 442b of the LCD for monitoring 442.

For example, if "CF1-0" is displayed as shown in FIG. 44A, it indicates that a "custom function No. 1" function is "0", that is, a default setting state. If it is a numeral other than "0," any of the functions operates. If an electronic dial 45 is turned, "CFNo" and its setting status are displayed in an order of FIGS. 44A, 44B, 44C, 44D, 44E, 44F, and 44A.

In this embodiment, it is possible to select "operative" or "inoperative" of the CF1 to CF6 functions or one of a plurality of options of the six functions.

For example, a gazing count can be selected as a control method for controlling based on line of sight information according to this invention in the CF1, and either "reeling" or "not reeling" a leader into a cartridge can be selected at film rewinding in CF2.

Therefore, in the seventh embodiment, an operation is explained for selecting a gazing count for setting in a second or after detection in the servo AF mode described in the fifth embodiment by using a custom function 1.

Figure 45A:
FIGS. 45A to 45F are diagrams illustrating display states of LCD for monitoring when a selection is set in a custom function selection mode of the camera according to the seventh embodiment of this invention.

FIGS. 45A to 45F are diagrams illustrating display states of the LCD for monitoring D42 when a gazing count is selected to be set by a custom function. FIG. 45A is the same as FIG. 44A and setting status "0" is displayed, therefore, a gazing count in the servo AF mode is set to 4 as a default. In other words, unless a photographer sets any custom function, a gazing count in the servo AF mode is fixed to 4.

Figure 45B:
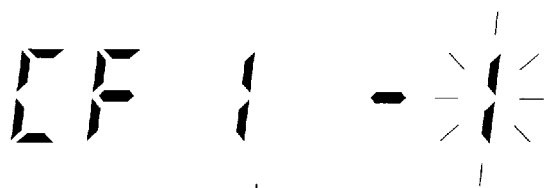
Figure 45C:
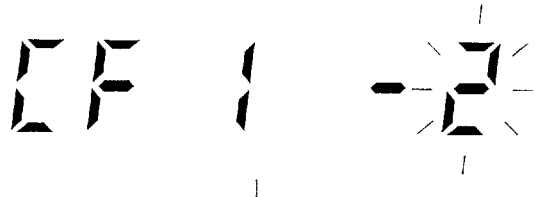
Figure 45D:
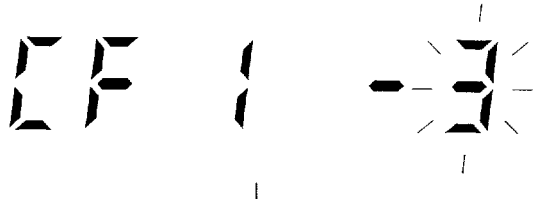
Figure 45E:
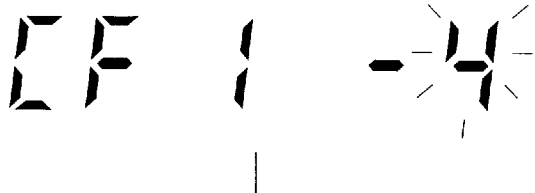
Figure 45F:
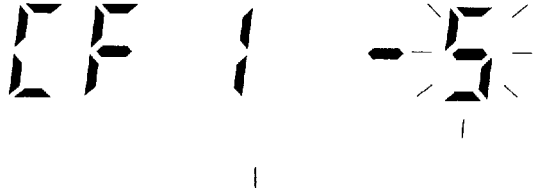

If an AE locking/CF setting button 443 (SW-AEL) is depressed, then a setting status is changed to 1 as shown in FIG. 45B and it blinks. In this condition, the gazing count is changed to 1. If the AE locking/CF setting button 443 is depressed further, the setting status is changed to 2 as shown in FIG. 45C and the gazing count is also changed to 2. By depressing the AE locking button sequentially in this manner, the gazing count can be changed to a count equal to a numeral indicating the setting status. The gazing count can be changed up to five times in this embodiment. If the AE locking/CF setting button 443 is depressed further, the setting status is changed to default 0.

In addition, the setting status 4 corresponds to 4 times which is the same as the default. By releasing the mode dial 444 from the custom function selection mode in any state shown in FIGS. 45A to 45F to return the control to the photographing mode, a change of a focus detection point in the servo AF mode is set to be controlled with the gazing count indicated by any of FIGS. 45A to 45F.

Each operation in the setting of each gazing count is shown in each flowchart in FIGS. 34A to 36.

Although the gazing count is limited to 5 in this embodiment, it is apparent that this invention is not limited to this, and the gazing count can be increased by the required number of times as far as the capacity of the EEPROM 500a is permitted. In addition, it is possible to limit the setting to the odd number of times or to the even number of times or also it is possible to set a setting count unequal to a numeral indicating the setting status, such as 1 for five times, 2 for 10 times, or the like, if the correspondence is previously defined.

These settings, however, must be changed inconveniently whenever another photographer starts to use the camera, though optimum control can be performed independently of a photographer's individual character or characteristics of movements of his or her eye since a gazing count can be arbitrarily set.

Accordingly, the previous gazing count is automatically changed to a gazing count set by the custom function when the photographer starts a line of sight detecting operation, by storing the gazing count set by the custom function so as to match a calibration number which corresponds to a data ID with associating the gazing count to individual difference correction data required for the line of sight detection.

Figure 46B:
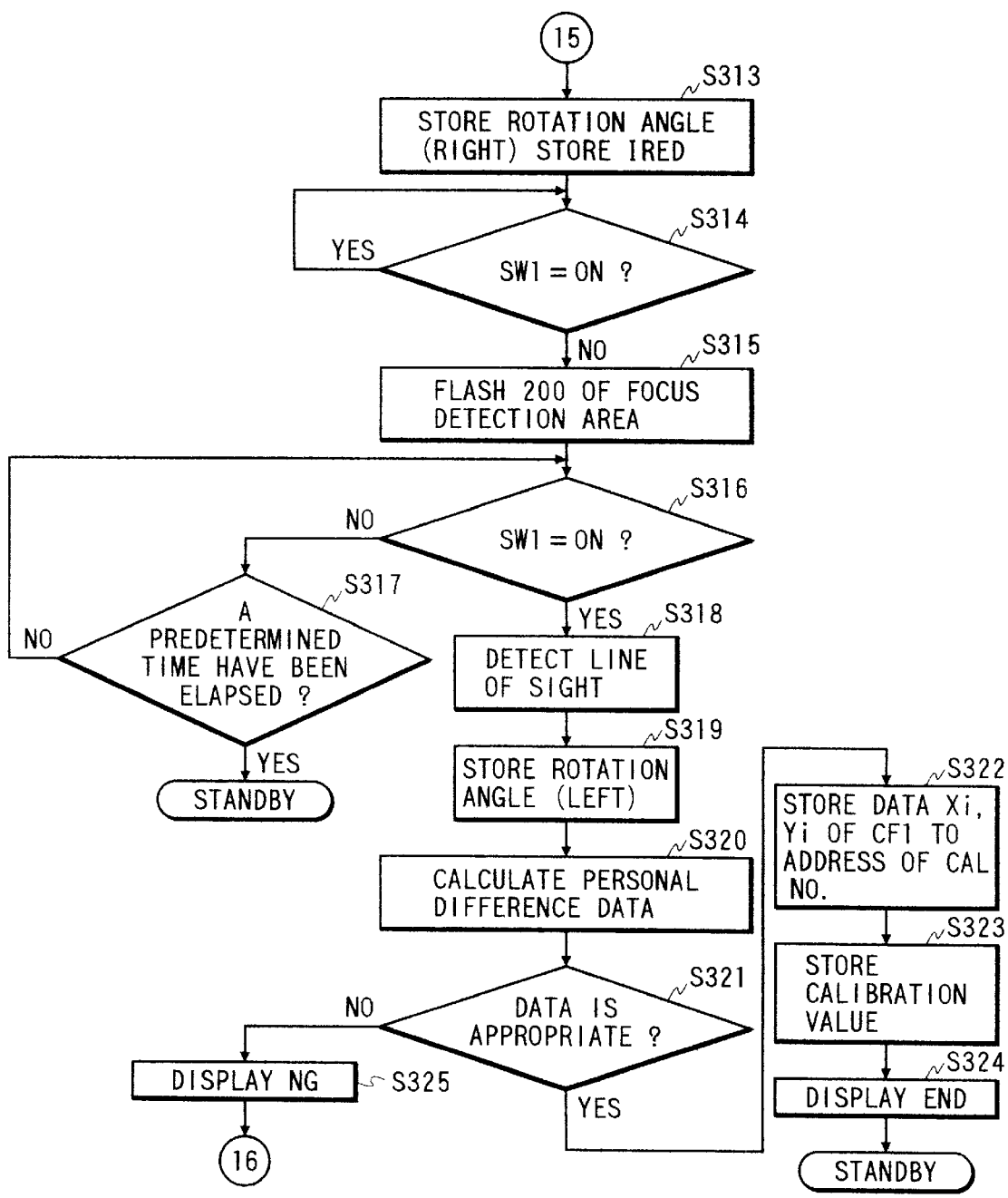
FIG. 46 is comprised of FIGS. 46A and 46B showing flowcharts illustrating an operation of a main portion of the camera according to the seventh embodiment of this invention.
Figure 47:
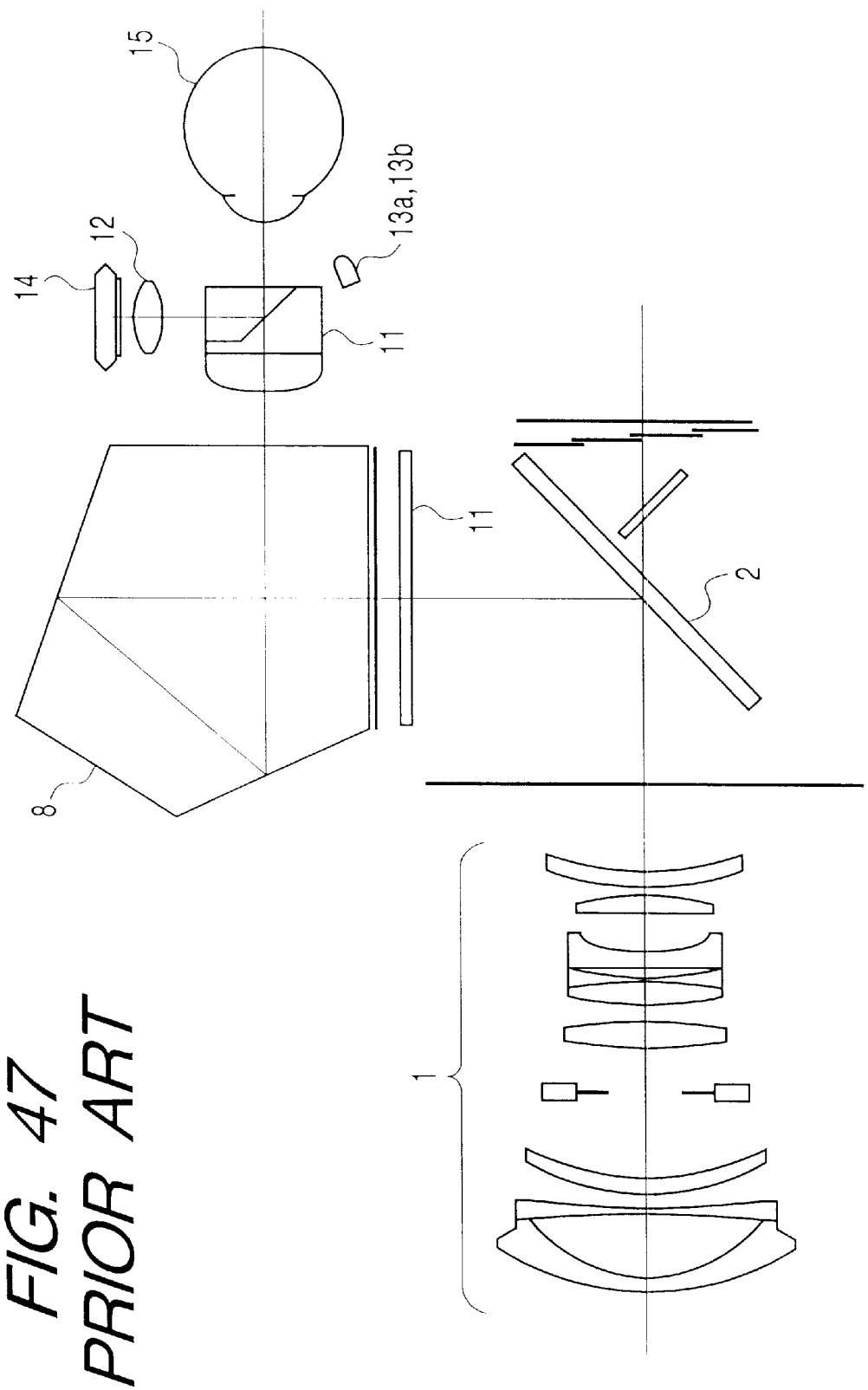
FIG. 47 is a schematic diagram of a line of sight detecting optical system.

This operation of storing the gazing count set by the custom function is performed in a calibration operation for obtaining the individual difference correction data. The flowchart is shown in FIGS. 46A and 46B.

After turning the mode dial 444 to fit the CAL position 444g to an index 455, a timer for executing the calibration is started in step S301 and then processing proceeds to step S302. In step S302, a calibration number corresponding to an ID of individual difference correction data is displayed on the LCD in the viewfinder 424 and the LCD for monitoring 442 as "CAL-No" to indicate the calibration mode. The calibration number is prepared by the number of persons supposed to be required to be registered as individual difference correction data.

Then, processing proceeds to step S303 to check that the electronic dial 445 is operated. If it is operated, processing proceeds to step S304 to change the calibration number CAL-No, and then the control returns to the step S302. If it is not operated, a calibration number is set and processing proceeds to step S306. In step S306, the LED driving circuit 506 blinks the LED for superimposing 421 (LED-R2) and also blinks a focus detection point 604 at the right end in the viewfinder field.

Then in the next step S307, it is checked that the AE locking/CF setting button 443 (SW-AEL) is depressed. If it is depressed, processing proceeds to step S308 to display the setting state of the gazing count which is line of sight information as the CF1 function described above. In other words, one of the states in FIGS. 45A to 45F is displayed.

In the next step S309, a standby state is set by storing gazing count data Yi set in CF1 at an address of the EEPROM 500a of the set calibration number, and the state is held until the mode dial 444 is operated. Unless the AE locking/CF setting button 443 (SW-AEL) is depressed in the above step S307, processing proceeds to step S310 to judge whether or not the switch SW1 is on. If it is off, processing proceeds to step S311 to check that a predetermined time has passed on the calibration timer started in the step S301. If it has passed, the control enters a standby state. Otherwise, the control returns to step S307.

If the switch SW1 is on in the step S310, processing proceeds to step S312 to detect a line of sight. In this condition, it is defined that a photographer is gazing at a blinking focus detection point when the switch SW1 is depressed in the calibration. Therefore, after the line of sight detection is performed based on a judgment that the photographer is gazing at the focus detection point 604 at this point, the CPU stores a rotation angle of an eye at gazing at the focus detection point 604 in the step S313 and an IRED which is turned on in the conditions.

Then, processing proceeds to step S314 to continue to check the switch SW1 state until the switch SW1 is set off. If the switch SW1 is turned off, processing proceeds to step S315, in which the LED driving circuit 506 blinks the LED for superimposing 421 (LED-L2) and blinks the focus detection point 600 at the left end in the viewfinder field for indication, and it proceeds to step S316. Like the rotation angle at gazing at the focus detection point 604 stored as described above, a rotation angle (left) at gazing at the focus detection point 600 is detected and stored in steps S316 to S319.

Then, processing proceeds to step S320 to calculate a deviation amount between a detected eyeball optical axis and a visual axis which is an actual line of sight direction and a movement amount of a visual axis per unit rotation angle as individual difference correction data required for a line of sight detection from two stored rotation angles. Next, processing proceeds to step S321 to judge a reliability of the calculated individual difference correction data. If it is proper, processing proceeds to step S322 to store the gazing count data Yi set to CF1 at an address of the set calibration number in the same manner as for the step S309. By this operation, the above gazing count is stored with being associated with a calibration number in the calibration mode not only by depressing the AE locking/CF setting button, but also by automatic setting at obtaining individual difference correction data after a calibration.

In the next step S323, a combination of the IRED 413 turned on at a detection and individual difference correction data are stored into the EEPROM 500a as a calibration value. Then, processing proceeds to step S324 to display an "END indication" for indicating that the calibration is terminated for a predetermined time and the control enters a standby state. If data is inappropriate in the step S321, processing proceeds to step S325 to display an "NG indication" for indicating that the calibration is unsuccessful for a predetermined time, and then processing proceeds to the step S301 to repeat the calibration.

As described above, in the seventh embodiment, a gazing count at controlling a change of a focus detection point in the servo AF mode can be changed in a so-called custom function mode in which it can be arbitrarily selected to be used according to a photographer's preference out of the functions previously set in the camera, and therefore, a finer control can be performed in more various cases than the fifth embodiment.

In addition, a gazing count corresponding to each photographer is set in this embodiment though movements of a line of sight depend on individuals, and therefore, the servo AF mode operation can be made optimal for the photographer.

Although a new operating member of the body need not be added since changes can be made by the custom function in this embodiment, it is apparent that a switch or a button can be added as an exclusive member for a change.

According to the above embodiments, since a camera can be optimally controlled for a photographic scene assumed in each operation mode by changing a gazing count of a line of sight which is a control method for functions controlled based on the line of sight information, such as deciding/changing a focus detection point or a photometry area according to operation modes of the camera such as an AF mode, a photometry mode, a feeding mode, and a photographic mode in the camera whose photographic functions are controlled based on line of sight information, there is an effect that there can be provided an AF system which can follow an object well as a photographer's intention and an AE system suitable for each photographic scene.

In addition, since a photographer himself can arbitrarily set a gazing count of a line of sight for deciding/changing a focus detection point or a photometry area in a camera whose photographic functions are controlled based on line of sight information, optimal control can be performed suitably for the photographer's individual character or characteristics of his or her eyeball movements there can be provided an AF system which can follow an object well as a photographer's intention and an AE system, and also there is no inconvenience that a gazing count must be re-set even if the photographer changes, since the set gazing count is associated with individual difference correction data.

Furthermore, there is an effect that an efficient line of sight detecting operation can be performed by also changing a line of sight detection count of a line of sight for which a focus detection point or a photometry area is decided or changed according to an operation mode of the camera.

Still furthermore, in a line of sight input function for operating a predetermined function when it is detected that a photographer's line of sight position exists in neighborhood of a line of sight input index set in the viewfinder, there is an effect that operability of line of sight input function can be enhanced according to functional characteristics such as a line of sight input function with a quick input at starting the operation and with a relatively conscious input at terminating the operation by setting a different gazing count for accepting an input of a line of sight between starting the operation and terminating the operation.

Although a gazing count is used as a control method of functions controlled based on line of sight position information in the fifth to seventh embodiments, the functions can be controlled by using a gazing time, in other words, by judging whether or not a photographer has been gazing at an input area for a predetermined time.

What is claimed is:

1. An apparatus having a line of sight detection device, comprising:
   (a) a viewfinder for observing a target object;
   (b) a line of sight detection means for detecting a position of a line of sight in said viewfinder of a user;
   (c) focus detection means being for selecting a first operation mode for performing a first focus detecting operation or a second operation mode for performing a second focus detecting operation, and for performing a focus detection operation for each of a plurality of focus detecting areas arranged in said viewfinder;
   (d) range setting means for setting a plurality of determination ranges including said focus detecting areas, and for changing a size of the determination range to be set in accordance with the selection of said operation mode of said focus detecting means;
   (e) selecting means for determining which determination range includes the position of line of sight detected by said line of sight detecting means, and for selecting at least one focus detecting area among said plurality of focus detecting areas; and
   (f) focus adjusting means for adjusting a focus of an optical system based on a focus detecting result of the selected focus detecting area.

2. An apparatus having a line of sight detection device according to claim 1, wherein
   said first operation mode of said focus detection means is used to omit the focus detecting operation once a focus is detected and said second operation mode of said focus detection means is used to continue the focus detecting operation also after a focus is detected.

3. An apparatus having a line of sight detection device according to claim 1, wherein
   said range setting means sets said determination range to a smaller value when said focus detection means operates in said second operation mode in comparison with a value set when said focus detection means operates in said first operation mode.

4. An apparatus having a line of sight detection device, comprising:
   (a) a viewfinder for observing a target object;
   (b) line of sight detection means for detecting a position of a line of sight in said viewfinder of a user;
   (c) focus detection means for performing a focus detection operation for each of a plurality of focus detecting areas arranged in said viewfinder;
   (d) range setting means for setting a plurality of determination ranges including said focus detecting areas, and for changing a size of the determination range to be set in accordance with an operation state of said focus detecting means;
   (e) selecting means for determining which determination range includes the position of line of sight detected by said line of sight detecting means, and for selecting at least one focus detecting area among said plurality of focus detecting areas; and
   (f) focus adjusting means for adjusting a focus of an optical system based on a focus detecting result of the selected focus detecting area.

5. An apparatus having a line of sight detection device according to claim 4, wherein
   said focus detection means operates in an operation mode for continuing the focus detecting operation also after an in-focus state is detected and said range setting means change the size of determination ranges to be set between a first focus detecting operation in said operation mode and a second or later focus detecting operation.

6. An apparatus having a line of sight detection device according to claim 5, wherein
   said range setting means sets the size of said determination range at the second or later focus detecting operation in said operation mode smaller than the size of said determination range at the first focus detecting operation in said operation mode.

7. An apparatus having a line of sight detection device according to claim 5, wherein, said determination range set for the first focus detecting operation in said operation mode in set in either a horizontal direction or a vertical direction.

8. An apparatus having a line of sight detection device according to claim 7, wherein said determination range set for the second or later focus detecting operation in said operation mode is set in both of the horizontal and vertical directions.

9. An apparatus having a line of sight detection device according to claim 5, wherein, said selecting means selects a last time focus detecting area for the second or later focus detecting operation in said operation mode if the position of line of sight detected by said line of sight detection means is not included in any determination range.

10. An apparatus having a line of sight detection device comprising:

(a) a viewfinder for observing a target object;

(b) line of sight detection means for detecting a position of a line of sight in said viewfinder of a user;

(c) focus detection means for performing a focus detection operation for each of a plurality of focus detecting areas arranged in said viewfinder;

(d) range setting means for setting a plurality of determination ranges including said focus detecting areas, and for changing a size of the determination range to be set based on the focus detection result of said focus detecting means;

(e) selecting means for determining which determination range includes the position of line of sight detected by said line of sight detecting means, and for selecting at least one focus detecting area among said plurality of focus detecting areas; and (f) focus adjusting means for adjusting a focus of an optical system based on a focus detecting result of the selected focus detecting area.

11. An apparatus having a line of sight detection device according to claim 10, wherein said range setting means changes a size of the determination range to be set according to a distance to an object obtained based on said focus detection result.

12. An apparatus having a line of sight detection device according to claim 10, wherein said range setting means sets a size of the determination range to be set to a greater value if the distance to an object is shorter than a predetermined distance, in comparison with a value set when said distance to an object is longer than the predetermined distance.

13. An apparatus having a line of sight detection device, comprising:

(a) a viewfinder for observing a target object;

(b) line of sight detection means for detecting a position of line of sight in said viewfinder of a user;

(c) focus detection means for performing a focus detection operation for each of a plurality of focus detecting areas arranged in said viewfinder;

(d) photographing control means for performing a photographing operation in a first photographing mode for performing a first photographing operation and in a second photographing mode for performing a second photographing operation;

(e) range setting means for setting a plurality of determination ranges including said focus detecting areas, and for changing a size of the determination range to be set between the first photographing mode and the second photographing mode; and (f) selecting means for determining which determination range includes the position of line of sight detected by said line of sight detecting means, and for selecting at least one focus detecting area among said plurality of focus detecting areas.

14. An apparatus having a line of sight detection device according to claim 13, wherein said first photographing mode is used to perform the photographing operation only once with a single operation of a release button and said second photographing mode is used to repeat the photographing operation continuously while the release button is operated.

15. An apparatus having a line of sight detection device according to claim 14, wherein said range setting means sets the size of said determination range for the photographing operation in said second photographing mode to a smaller value than the size of said determination range for the photographing operation in said first photographing mode.

16. An apparatus having a line of sight detection device, comprising:

(a) a viewfinder for observing a target object;

(b) line of sight detection means for detecting a position of a line of sight in said viewfinder of a user;

(c) determination means for determining whether the detected result of said line of sight detection means is located within a predetermined range which is set in said viewfinder;

(d) operation means for selecting a first operation mode for performing a first operation or a second operation mode for performing a second operation, and for performing an operation based on the mode selected by using the detected result of said line of sight detection means when said determination means determines that the detected result is located within said predetermined range; and (e) changing means for changing a size of said predetermined range in accordance with the operation mode selected by said operation means.

17. An apparatus having a line of sight detection device according to claim 16, wherein said operation means is a focus adjusting means for adjusting a focus of an optical focus, the focus of said optical system being adjusted by using the detected result of said line of sight detection means when said determination means determines that the detected result is located within said predetermined range.

18. An apparatus having a line of sight detection device according to claim 16, wherein said operation means is a luminance detection means for detecting a luminance of said target object, the luminance of said target object being weighted by using the detected result of said line of sight detection means when said determination means determines that said detected result is located within said predetermined range.

19. An apparatus having a line of sight detection device, comprising:

(a) a viewfinder for observing a target object;

(b) line of sight detection means for detecting a position of a line of sight in said viewfinder of a user;

(c) determination means for determining whether the detected result of said line of sight detection means is located, more than or equal to a predetermined number of times, within a predetermined range which is set in said viewfinder;

(d) operation means for selecting a first operation mode for performing a first operation or a second operation mode for performing a second operation, and for performing an operation based on the mode selected by using the detected result of said line of sight detection means when said determination means determines that the detected result is located within said predetermined range more than or equal to the predetermined number of times; and (e) changing means for changing said predetermined number of times in accordance with the operation mode selected by said operation means.

20. An apparatus having a line of sight detection device according to claim 19, wherein said operation means is a focus adjusting means for adjusting a focus of an optical focus, the focus of said optical system being adjusted by using the detected result of said line of sight detection means when said determination means determines that the detected result is located within said predetermined range.

21. An apparatus having a line of sight detection device according to claim 19, wherein said operation means is a luminance detection means for detecting a luminance of said target object, the luminance of said target object being weighted by using the detected result of said line of sight detection means when said determination means determines that said detected result is located within said predetermined range.

22. An apparatus having a line of sight detection device according to claim 19, wherein said predetermined number of times is arbitrarily set by said user.

23. An apparatus having a line of sight detection device, comprising:

(a) a viewfinder for observing a target object;

(b) line of sight detection means for detecting a position of a line of sight in said viewfinder of a user;

(c) determination means for determining whether the detected result of said line of sight detection means is located, for more than or equal to a predetermined time period, within a predetermined range which is set in said viewfinder;

(d) operation means for selecting a first operation mode for performing a first operation or a second operation mode for performing a second operation, and for performing an operation based on the mode selected by using the detected result of said line of sight detection means when said determination means determines that the detected result is located within said predetermined range or more than or equal to the predetermined time period; and (e) changing means for changing said predetermined time period in accordance with the operation mode selected by said operation means.

24. An apparatus having a line of sight detection device according to claim 23, wherein said operation means is a focus adjusting means for adjusting a focus of an optical focus, the focus of said optical system being adjusted by using the detected result of said line of sight detection means when said determination means determines that the detected result is located within said predetermined range.

25. An apparatus having a line of sight detection device according to claim 23, wherein said operation means is a luminance detection means for detecting a luminance of said target object, the luminance of said target object being detected by using the detected result of said line of sight detection means when said determination means determines that said detected result is located within said predetermined range.

26. An apparatus having a line of sight detection device, comprising:

(a) a viewfinder for observing a target object;

(b) line of sight detection means for detecting a position of a line of sight in said viewfinder of a user;

(c) determination means for determining whether said detected result of said line of sight detection means is located, at a predetermined frequency, within a predetermined range which is set in said viewfinder;

(d) operation means for selecting a first operation mode for performing a first operation or a second operation mode or performing a second operation, and for performing an operation based on the mode selected by using the detected result of said line of sight detection means when said determination means determines that the detected result is located within said predetermined range at the predetermined frequency; and (e) changing means for changing the predetermined frequency in accordance with the operation mode selected by said operation means.

27. An apparatus having a line of sight detection device according to claim 26, wherein said predetermined frequency is defined as a predetermined number of times that the detected result of said line of sight detection means is located within the predetermined range set in said viewfinder with respect to a total number of detection times of said line of sight detection means.

28. An apparatus having a line of sight detection device according to claim 26, wherein said operation means is a focus adjusting means for adjusting a focus of an optical focus, the focus of said optical system being adjusted by using the detected result of said line of sight detection means when said determination means determines that the detected result is located within said predetermined range.

29. An apparatus having a line of sight detection device according to claim 26, wherein said operation means is a luminance detection means for detecting a luminance of said target object, the luminance of said target object being weighted by using the detected result of said line of sight detection means when said determination means determines that said detected result is located within said predetermined range.

30. An apparatus having a line of sight detection device according to claim 27, wherein said predetermined number of times is arbitrarily set by said user.

* * * * *

UNITED STATES PATENT AND TRADEMARK OFFICE
CERTIFICATE OF CORRECTION

PATENT NO. : 5,913,079

DATED : June 15, 1999

INVENTOR(S): KEISUKE AOYAMA, ET AL.                     Page 1 of 7

It is certified that error appears in the above-identified patent and that said Letters Patent is hereby corrected as shown below:

SHEET 23 OF THE DRAWINGS, IN FIGURE 23:
At step S36, "MOST" should be deleted.

SHEET 24 OF THE DRAWINGS, IN FIGURE 24:
At step S44, "MOST" should be deleted.

SHEET 45 OF THE DRAWINGS, IN FIGURE 41B:
At step S220, "DETETCION" should read --DETECTION--.

SHEET 50 OF THE DRAWINGS, IN FIGURE 46A:
At step s311, "HAVE BEEN" should read --HAS--.

SHEET 51 OF THE DRAWINGS, IN FIGURE 46B
At step S317, "HAVE BEEN" should read --HAS--.

UNITED STATES PATENT AND TRADEMARK OFFICE
CERTIFICATE OF CORRECTION

PATENT NO. : 5,913,079

DATED : June 15, 1999

INVENTOR(S): KEISUKE AOYAMA, ET AL.

It is certified that error appears in the above-identified patent and that said Letters Patent is hereby corrected as shown below:

COLUMN 1:
Line 32, "diode" should read --diode,--.
Line 57, "An infrared" should read --Infrared--.

COLUMN 6:
Line 11, "of" should be deleted.

COLUMN 10:

Line 58, "is in" should read is, and "is the" should read
--is in the--.

COLUMN 12:
Line 55, "with" should read --by--.

COLUMN 14:
Line 21, "signal" should read --a signal--.
Line 22, "a line" should read --line--.

COLUMN 17:
Line 1, "the line" should read --a line--, and "a line" should
read --the line--.

UNITED STATES PATENT AND TRADEMARK OFFICE
CERTIFICATE OF CORRECTION

PATENT NO. : 5,913,079

DATED : June 15, 1999

INVENTOR(S): KEISUKE AOYAMA, ET AL.

It is certified that error appears in the above-identified patent and that said Letters Patent is hereby corrected as shown below:

COLUMN 17
Line 13, "avoided" should read --provided--.
Line 27, "is" should read --are--.
Line 59, "#4150" should read --#4105--.

COLUMN 19:
Line 12, "its both" should read --both its--.
Line 33, "on the" should read --of the--.
Line 38, "the the" should read --the--.
Line 39, "peripheral" should read --the peripheral--.
Line 58, "the" should be deleted.

COLUMN 21:
Line 20, "includes" should read --include--.
Line 38, "S1," should read --S12,--.

UNITED STATES PATENT AND TRADEMARK OFFICE
CERTIFICATE OF CORRECTION

PATENT NO. : 5,913,079

DATED : June 15, 1999

INVENTOR(S): KEISUKE AOYAMA, ET AL.

It is certified that error appears in the above-identified patent and that said Letters Patent is hereby corrected as shown below:

COLUMN 22
Line 52, "the steps" should read --in the steps--.

COLUMN 23
Line 3, "contrast" should read --a contrast--, and "of a" should read --of--.

COLUMN 24
Line 44, "satisfied," should read --is satisfied,--.

COLUMN 25
Line 7, "area step" should read --area in step--.

COLUMN 26
Line 7, "cannot" should read --cannot always conveniently--.
Line 9, "always" should be deleted.
Line 10, "conveniently" should be deleted.
Line 28, "is coordinates" should read --are coordinates--.

UNITED STATES PATENT AND TRADEMARK OFFICE
CERTIFICATE OF CORRECTION

PATENT NO. : 5,913,079

DATED : June 15, 1999

INVENTOR(S): KEISUKE AOYAMA, ET AL.  Page 5 of 7

It is certified that error appears in the above-identified patent and that said Letters Patent is hereby corrected as shown below:

COLUMN 28
Line 10, "respecting a" should read --respect to the--.
Line 60, "an" should read --considerable--.
Line 61, "considerably" should be deleted.

COLUMN 29
Line 16, "a object" should read --an object--.
Line 24, "typed" should read --type--.
Line 27, "neighborhood" should read --the neighborhood--.

COLUMN 30
Line 33, "display.)" should read --display)--.

COLUMN 31
Line 24, "Both of" should read --Both--.
Line 51, "place" should read --places--.
Line 54, "photographing" should read --photography--.
Line 64, "so-called a" should read --so called--.
Line 67, "position" should be deleted, and "mode" (second occurrence) should read --mode position--.

UNITED STATES PATENT AND TRADEMARK OFFICE
CERTIFICATE OF CORRECTION

PATENT NO. : 5,913,079

DATED : June 15, 1999

INVENTOR(S) : KEISUKE AOYAMA, ET AL.

It is certified that error appears in the above-identified patent and that said Letters Patent is hereby corrected as shown below:

COLUMN 32
Line 55, "for" should be deleted.
Line 62, "or to" should read --to or--, and "receive" should read --receives--.

COLUMN 37
Line 61, "opening" should read --opening.--.
Line 63, "F11)" should read --F11.)--.

COLUMN 41
Line 42, "decided" should read --chosen--.

UNITED STATES PATENT AND TRADEMARK OFFICE
CERTIFICATE OF CORRECTION

PATENT NO.: 5,913,079

DATED : June 15, 1999

INVENTORS: KEISUKE AOYAMA, ET AL.

It is certified that error appears in the above-identified patent and that said Letters Patent is hereby corrected as shown below:

COLUMN 45:
Line 32, "movements" should read --movements, and--.
Line 33, "well" should read --as well--.
Line 47, "line" should read --the line--.

COLUMN 47
Line 7, "in set" should read --is set--.

Signed and Sealed this

Third Day of October, 2000

Attest:

Q. TODD DICKINSON

*Attesting Officer*    *Director of Patents and Trademarks*